(12) United States Patent
Xu et al.

(10) Patent No.: US 12,484,016 B2
(45) Date of Patent: Nov. 25, 2025

(54) COMMUNICATION METHOD AND APPARATUS

(71) Applicant: Huawei Technologies Co., Ltd., Shenzhen (CN)

(72) Inventors: Xiaoying Xu, Shenzhen (CN); Qinghai Zeng, Shanghai (CN); Qufang Huang, Shenzhen (CN); Chunhua You, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 609 days.

(21) Appl. No.: 17/738,973

(22) Filed: May 6, 2022

(65) Prior Publication Data
US 2022/0264520 A1 Aug. 18, 2022

Related U.S. Application Data

(63) Continuation of application No. PCT/CN2019/116821, filed on Nov. 8, 2019.

(51) Int. Cl.
H04W 68/00 (2009.01)
H04W 74/08 (2024.01)
(Continued)

(52) U.S. Cl.
CPC ..... *H04W 68/005* (2013.01); *H04W 74/0841* (2013.01); *H04W 76/19* (2018.02)

(58) Field of Classification Search
CPC ............ H04W 68/005; H04W 76/19; H04W 74/0841
See application file for complete search history.

(56) References Cited

U.S. PATENT DOCUMENTS 8,830,927 B2 * 9/2014 Lunttila .............. H04L 1/08 370/329
11,218,277 B2 * 1/2022 Li .................... H04L 5/0007
(Continued)

FOREIGN PATENT DOCUMENTS

CN 107155221 A 9/2017
CN 109600831 A 4/2019
(Continued)

OTHER PUBLICATIONS

"Further Analysis of Paging based options," 3GPP TSG RAN WG2 Meeting #106, Reno, USA, R2-1906623, Total 3 pages, 3rd Generation Partnership Project, Valbonne, France (May 13-17, 2019).
(Continued)

*Primary Examiner* — Brian D Nguyen
(74) *Attorney, Agent, or Firm* — Leydig, Voit & Mayer, Ltd.

(57) ABSTRACT

A communication method and an apparatus are provided, to resolve a problem of low data transmission efficiency. The method includes: in response to receiving a paging message from a terminal device, a terminal device determines, based on a preconfiguration and/or the paging message, a first physical uplink shared channel (PUSCH) resource used to transmit a paging response, and sends the paging response to the access network device on the first PUSCH resource, where the paging response carries identity authentication information of the terminal device. After the access network device or a core network successfully performs identity authentication on the terminal device, downlink data transmission can be performed. Compared with a manner in which downlink data transmission can be performed only after a radio resource control (RRC) connection is set up or resumed, this manner can improve data transmission efficiency.

23 Claims, 21 Drawing Sheets

(51) Int. Cl.
*H04W 74/0833* (2024.01)
*H04W 76/19* (2018.01)

(56) References Cited

U.S. PATENT DOCUMENTS

| | | |
|---|---|---|
| 2015/0049824 A1 | 2/2015 | Kim et al. |
| 2015/0296481 A1 | 10/2015 | Yu et al. |
| 2018/0376422 A1 | 12/2018 | Shu et al. |
| 2019/0059072 A1* | 2/2019 | Zhang ................. H04W 68/005 |
| 2019/0207662 A1* | 7/2019 | Zhou ................. H04W 72/0453 |
| 2019/0253986 A1* | 8/2019 | Jeon ...................... H04L 5/0048 |
| 2019/0289513 A1* | 9/2019 | Jeon ................. H04W 72/0453 |
| 2021/0014900 A1* | 1/2021 | Lei ........................ H04W 52/42 |
| 2021/0100024 A1* | 4/2021 | Bang ..................... H04L 1/1861 |
| 2022/0104267 A1* | 3/2022 | Gao ................. H04W 74/0833 |
| 2022/0124804 A1* | 4/2022 | Lee ..................... H04W 68/005 |

FOREIGN PATENT DOCUMENTS

| | | | | |
|---|---|---|---|---|
| CN | 110168945 A | | 8/2019 | |
| EP | 2903313 A1 | * | 8/2015 | ............ H04W 68/02 |
| EP | 3751880 A1 | * | 12/2020 | ............ H04L 1/1812 |
| WO | WO-2021050045 A1 | * | 3/2021 | ............. H04B 7/022 |

OTHER PUBLICATIONS

"3rd Generation Partnership Project; Technical Specification Group Radio Access Network; NR; Physical layer procedures for control (Release 15)," 3GPP TS 38.213 V15.7.0, pp. 1-108, 3rd Generation Partnership Project, Valbonne, France (Sep. 2019).

"3rd Generation Partnership Project; Technical Specification Group Radio Access Network; NR; NR and NG-RAN Overall Description; Stage 2 (Release 15)," 3GPP TS 38.300 V15.7.0, pp. 1-99, 3rd Generation Partnership Project, Valbonne, France (Sep. 2019).

"3rd Generation Partnership Project; Technical Specification Group Radio Access Network; NR; Medium Access Control (MAC) protocol specification (Release 15)," 3GPP TS 38.321 V15.7.0, pp. 1-78, 3rd Generation Partnership Project, Valbonne, France (Sep. 2019).

"3rd Generation Partnership Project; Technical Specification Group Radio Access Network; NR; Radio Resource Control (RRC) protocol specification (Release 15)," 3GPP TS 38.331 V15.7.0, pp. 1-527, 3rd Generation Partnership Project, Valbonne, France (Sep. 2019).

"Downlink Data Transfer Initiation," 3GPP TSG-RAN WG2 #55, Seoul, Korea, R2-062780, XP050132309, Total 7 pages, 3rd Generation Partnership Project, Valbonne, France (Oct. 9-13, 2006).

* cited by examiner

COMMUNICATION METHOD AND APPARATUS

CROSS-REFERENCE TO RELATED APPLICATIONS

This application is a continuation of International Application No. PCT/CN2019/116821, filed on Nov. 8, 2019, the disclosure of which is hereby incorporated by reference in its entirety.

TECHNICAL FIELD

Embodiments of this application relate to the field of communication technologies, and in particular, to a communication method and an apparatus.

BACKGROUND

In a 5th generation mobile communication system, a terminal device has three radio resource control (RRC) states: an RRC connected state, an RRC idle state, and an inactive state. Only a terminal device in the RRC connected state can perform data transmission with a network device. A terminal device in the RRC idle state or a terminal device in the inactive state can perform data transmission with a network device only after an RRC connection is set up or an RRC connection is resumed.

For an application with a small data volume, in this manner, most resources are used to set up or resume the RRC connection, and data transmission efficiency is low.

SUMMARY

Embodiments of this application provide a communication method and an apparatus, to improve data transmission efficiency.

According to a first aspect, a communication method is provided. The method includes: When receiving a paging message from a terminal device, a terminal device determines, based on a preconfiguration and/or the paging message, a first PUSCH resource used to transmit a paging response, and sends the paging response to the access network device on the first PUSCH resource.

In the foregoing method, the terminal device determines the first PUSCH resource based on the preconfiguration and/or the paging message. Compared with a method in which the access network device sends indication information of the first PUSCH resource to the terminal device after sending the paging message, this method enables the paging response to be transmitted as soon as possible. In addition, the paging response carries identity authentication information of the terminal device, so that identity authentication can be performed on the terminal device as soon as possible, and a downlink data transmission latency can be reduced.

In a possible design, the first PUSCH resource is preconfigured, and the first PUSCH resource may be preconfigured in the following manner. Specifically, the terminal device receives first configuration information from the access network device, where the first configuration information is used to configure the first PUSCH resource; and the terminal device determines the first PUSCH resource based on the first configuration information.

In the foregoing method, the first configuration information may be a broadcast message, and when the first configuration information is the broadcast message, the first PUSCH resource is shared by all terminal devices. When a cell of the terminal device is changed, the first PUSCH resource is still available, and the first PUSCH resource does not need to be frequently configured for the terminal device.

In a possible design, the first PUSCH resource is determined based on the paging message, the terminal device may determine the first PUSCH resource based on the configuration information of the first PUSCH resource carried in the paging message.

In the foregoing method, because the paging message is signaling existing in an existing random access procedure, the terminal device can be notified, without additional signaling overheads, to transmit the paging response by using the first PUSCH resource, to reduce signaling overheads.

In a possible design, the first PUSCH resource is determined based on the preconfiguration and the paging message. For example, the terminal device receives second configuration information from the access network device, where the second configuration information is used to configure at least one PUSCH resource; and the terminal device determines the first PUSCH resource based on the paging message.

In the foregoing method, the paging message may carry only a part of the configuration information of the first PUSCH resource, or may not carry the configuration information of the first PUSCH resource. Compared with a method in which the paging message carries all of the configuration information of the first PUSCH resource, this method can reduce overheads of the paging message.

In a possible design, each of the at least one PUSCH resource corresponds to an index, the paging message carries a first index, and that the terminal device determines the first PUSCH resource based on the paging message includes: The terminal device selects the first PUSCH resource from the at least one PUSCH resource based on the first index, where the first PUSCH resource corresponds to the first index.

In a possible design, each of the at least one PUSCH resource corresponds to an identifier of one terminal device, the paging message carries an identifier of a paged terminal device, and that the terminal device determines the first PUSCH resource based on the paging message includes: The terminal device selects the first PUSCH resource from the at least one PUSCH resource based on the identifier of the paged terminal device carried in the paging message, where the first PUSCH resource corresponds to the identifier of the paged terminal device.

In the foregoing method, because in an existing random access procedure, the paging message carries the identifier of the paged terminal device, overheads of the paging message are not increased in the foregoing method.

In a possible design, each of the at least one PUSCH resource corresponds to a random access preamble identifier, the paging message carries a first random access preamble identifier, and that the terminal device determines the first PUSCH resource based on the paging message includes: The terminal device selects the first PUSCH resource from the at least one PUSCH resource based on the first random access preamble identifier, where the first PUSCH resource corresponds to the first random access preamble identifier.

In a possible design, that the first PUSCH resource is determined based on the preconfiguration and the paging message further includes:

The terminal device receives third configuration information from the access network device, where the third configuration information is used to configure a part of time-frequency domain resources in the first PUSCH resource, and the paging message carries a remaining part of the time-frequency domain resources in the first PUSCH resource; the terminal device determines the remaining part of the time-frequency domain resources in the first PUSCH resource based on the paging message; and the terminal device determines the first PUSCH resource based on the part of the time-frequency domain resources in the first PUSCH resource and the remaining part of the time-frequency domain resources in the first PUSCH resource.

In the foregoing method, the paging message carries only the part of the time-frequency domain resources in the first PUSCH resource. Compared with a method in which the paging message carries all of the first PUSCH resource, this method can reduce overheads of the paging message.

In a possible design, the first PUSCH resource is preconfigured, and the first PUSCH resource may be preconfigured in the following manner. Specifically, the terminal device receives fourth configuration information from the access network device, where the fourth configuration information is used to configure a random access preamble, time-frequency domain resources of the random access preamble, and the first PUSCH resource; and the terminal device determines the first PUSCH resource based on the fourth configuration information.

In the foregoing method, the fourth configuration information may also be referred to as a random access configuration, a two-step RACH configuration, or a message A configuration. The foregoing configuration is an existing random access configuration. Therefore, in this embodiment of this application, a PUSCH resource in the existing random access configuration may be referred to, to transmit the paging response, and reduce signaling overheads.

In a possible design, the first PUSCH resource is determined based on the paging message, the paging message carries fifth configuration information, the fifth configuration information is used to configure a random access preamble, time-frequency domain resources of the random access preamble, and the first PUSCH resource, and the terminal device determines the first PUSCH resource based on the fifth configuration information carried in the paging message.

In a possible design, that the first PUSCH resource is determined based on the preconfiguration and the paging message may be implemented in the following manner: The terminal device receives sixth configuration information from the access network device, where the sixth configuration information is used to configure a random access preamble, time-frequency domain resources of the random access preamble, and a part of time-frequency domain resources in the first PUSCH resource, and the paging message carries a remaining part of the time-frequency domain resources in the first PUSCH resource; the terminal device determines the remaining part of the time-frequency domain resources in the first PUSCH resource based on the paging message; and the terminal device determines the first PUSCH resource based on the part of the time-frequency domain resources in the first PUSCH resource and the remaining part of the time-frequency domain resources in the first PUSCH resource.

In a possible design, that the first PUSCH resource is determined based on the preconfiguration and the paging message may be implemented in the following manner: The terminal device receives seventh configuration information from the access network device, where the seventh configuration information is used to configure at least one random access configuration, and each random access configuration includes a random access preamble, time-frequency domain resources of the random access preamble, and time-frequency domain resources of the PUSCH; the terminal device determines a first random access configuration from the at least one random access configuration based on the paging message, where the first random access configuration includes the first PUSCH resource; and the terminal device determines the first PUSCH resource based on the first random access configuration.

In a possible design, each of the at least one random access configuration corresponds to an index, the paging message carries a first index, and that the terminal device determines the first random access configuration from the at least one random access configuration based on the paging message includes: The terminal device selects the first random access configuration from the at least one random access configuration based on the first index, where the first random access configuration corresponds to the first index.

In a possible design, each of the at least one random access configuration corresponds to an identifier of one terminal device, the paging message carries an identifier of a paged terminal device, and that the terminal device determines the first random access configuration from the at least one random access configuration based on the identifier of the paged terminal device includes: The terminal device selects the first random access configuration from the at least one random access configuration based on the identifier of the paged terminal device, where the first random access configuration corresponds to the identifier of the paged terminal device.

In a possible design, each of the at least one random access configuration corresponds to a random access preamble identifier, the paging message carries a first random access preamble identifier, and that the terminal device determines the first random access configuration from the at least one random access configuration based on the paging message includes: The terminal device selects the first random access configuration from the at least one random access configuration based on the first random access preamble identifier, where the first random access configuration corresponds to the first random access preamble identifier.

In a possible design, the terminal device sends the random access preamble to the access network device by using the time-frequency domain resources of the random access preamble; or when a timing advance TA is invalid, the terminal device sends the random access preamble to the access network device by using the time-frequency domain resources of the random access preamble.

In the foregoing method, because the TA is valid, synchronization between the terminal device and the network device can be maintained. However, in this application, the terminal device sends the random access preamble to the access network device only when the TA is invalid. That is, when the TA is valid, the terminal device does not send the random access preamble to the access network device, so that signaling overheads can be reduced.

In a possible design, the terminal device receives a response message of the random access preamble from the access network device, and the response message of the random access preamble includes downlink data.

In the foregoing method, the downlink data is carried in the response of the random access preamble, so that early downlink data transmission can be implemented, and a latency of the downlink data can be reduced.

In a possible design, the paging message includes an early downlink data transmission indication or a random access preamble identifier, and that the terminal device sends a paging response to the access network device by using the first PUSCH resource includes: The terminal device sends the paging response to the access network device on the first PUSCH resource based on the early downlink data transmission indication or the random access preamble identifier.

In a possible design, the paging response is a non-access stratum NAS message, and the identity authentication information of the terminal device is generated based on a NAS security key of the terminal device.

In the foregoing method, the access network device can perform identity authentication on the terminal device, to avoid sending the downlink data to a forged terminal device.

In a possible design, the paging response is a radio resource control RRC message, and the identity authentication information of the terminal device is generated based on one or more of the following parameters: an access stratum key of the terminal device, a physical cell identifier of a source cell of the terminal device, a physical cell identifier of a target cell of the terminal device, and a source cell radio network temporary identifier C-RNTI.

In the foregoing method, a core network device can perform identity authentication on the terminal device, to avoid sending the downlink data to a forged terminal device.

According to a second aspect, a communication method is provided, including: An access network device sends a paging message to a terminal device; and the access network device receives a paging response from the terminal device on a first physical uplink shared channel PUSCH resource, where the first PUSCH resource is determined based on a preconfiguration and/or the paging message.

In the foregoing method, the access network device can indicate the first PUSCH resource to the terminal device based on the preconfiguration and/or the paging message. Compared with a method in which the access network device sends configuration information of the first PUSCH resource to the terminal device after sending the paging message to the terminal device, this method can reduce signaling overheads. In addition, the paging message carries identity authentication information of the terminal device, so that identity authentication can be performed on the terminal device as soon as possible, and downlink data transmission can further be performed sooner, to reduce a downlink data transmission latency.

In a possible design, the first PUSCH resource is preconfigured, and the access network device may be preconfigured in the following manner: The access network device sends first configuration information to the terminal device, where the first configuration information is used to configure the first PUSCH resource.

In the foregoing method, the first configuration information may be a broadcast message. In addition, when the first PUSCH resource is configured by using the broadcast message, the first PUSCH resource is shared by all terminal devices, and there is no need to separately configure the first PUSCH resource for the different terminal devices, so that signaling overheads are reduced.

In a possible design, the first PUSCH resource is determined based on the paging message, the access network device can indicate the first PUSCH resource to the terminal device by carrying the configuration information of the first PUSCH resource in the paging message.

In the foregoing method, because the paging message is signaling in an existing random access process, the access network device side can indicate the first PUSCH resource to the terminal device without additional signaling overheads, so that signaling overheads are reduced.

In a possible design, the first PUSCH resource is determined based on the preconfiguration and the paging message. The access network device may indicate the first PUSCH resource to the terminal device in the following manner: The access network device sends second configuration information to the terminal device, where the second configuration information is used to configure at least one PUSCH resource.

In a possible design, each of the at least one PUSCH resource corresponds to an index, the paging message carries a first index, and the first index corresponds to the first PUSCH resource.

In a possible design, each of the at least one PUSCH resource corresponds to an identifier of one terminal device, the paging message carries an identifier of a paged terminal device, and the identifier of the paged terminal device corresponds to the first PUSCH resource.

In a possible design, each of the at least one PUSCH resource corresponds to a random access preamble identifier, the paging message carries a first random access preamble identifier, and the first random access preamble identifier corresponds to the first PUSCH resource.

In a possible design, the first PUSCH resource is determined based on the preconfiguration and the paging message. The access network device may indicate the first PUSCH resource to the terminal device in the following manner: The access network device sends third configuration information to the terminal device, where the third configuration information is used to configure a part of time-frequency domain resources in the first PUSCH resource.

The paging message carries a remaining part of the time-frequency domain resources in the first PUSCH resource, and the first PUSCH resource includes the part of the time-frequency domain resources in the first PUSCH resource and the remaining part of the time-frequency domain resources in the first PUSCH resource.

In a possible design, the first PUSCH resource is preconfigured, the access network device sends fourth configuration information to the terminal device, where the fourth configuration information is used to configure a random access preamble, time-frequency domain resources of the random access preamble, and the first PUSCH resource.

In a possible design, the first PUSCH resource is determined based on the paging message, the paging message carries fifth configuration information, and the fifth configuration information is used to configure a random access preamble, time-frequency domain resources of the random access preamble, and the first PUSCH resource.

In a possible design, the first PUSCH resource is determined based on the preconfiguration and the paging message. The access network device sends sixth configuration information to the terminal device, where the sixth configuration information is used to configure a random access preamble, time-frequency domain resources of the random access preamble, and a part of time-frequency domain resources of the first PUSCH resource.

The paging message carries a remaining part of the time-frequency domain resources in the first PUSCH resource, and the first PUSCH resource includes the part of the time-frequency domain resources in the first PUSCH resource and the remaining part of the time-frequency domain resources in the first PUSCH resource.

In a possible design, the first PUSCH resource is determined based on the preconfiguration and the paging message. The access network device sends seventh configuration information to the terminal device, where the seventh configuration information is used to configure at least one random access configuration, and each random access configuration includes a random access preamble, time-frequency domain resources of the random access preamble, and time-frequency domain resources of the PUSCH.

In a possible design, each of the at least one random access configuration corresponds to an index, the paging message carries a first index, the first index corresponds to the first random access configuration, and the first random access configuration includes the first PUSCH resource.

In a possible design, each of the at least one random access configuration corresponds to an identifier of one terminal device, the paging message carries an identifier of a paged terminal device, the identifier of the paged terminal device corresponds to the first random access configuration, and the first random access configuration includes the first PUSCH resource.

In a possible design, each of the at least one random access configuration corresponds to a random access preamble identifier, the paging message carries a first random access preamble identifier, the first random access preamble identifier corresponds to the first random access configuration, and the first random access configuration includes the first PUSCH resource.

In a possible design, the access network device receives the random access preamble from the terminal device by using the time-frequency domain resources of the random access preamble.

In a possible design, the access network device sends a response message of the random access preamble to the terminal device, where the response message of the random access preamble includes downlink data.

In the foregoing method, the access network device may transmit the downlink data in the response message of the random access preamble, so that early downlink data transmission can be implemented, and a transmission latency can be reduced.

In a possible design, the paging message includes an early downlink data transmission indication or a random access preamble identifier, and that the access network device receives a paging response from the terminal device by using the first PUSCH resource includes:

The access network device receives the paging response from the terminal device on the first PUSCH resource based on the early downlink data transmission indication or the random access preamble identifier.

In a possible design, the paging response is a non-access stratum NAS message, and the identity authentication information of the terminal device is generated based on a NAS security key of the terminal device.

In the foregoing method, a core network device can perform identity authentication on the terminal device, to avoid sending the downlink data to a forged terminal device, and to improve data security.

In a possible design, the paging response is a radio resource control RRC message, and the identity authentication information of the terminal device is generated based on one or more of the following parameters: an access stratum key of the terminal device, a physical cell identifier of a source cell of the terminal device, a physical cell identifier of a target cell of the terminal device, and a source cell radio network temporary identifier C-RNTI.

In the foregoing method, the access network device can perform identity authentication on the terminal device, to avoid sending the downlink data to a forged terminal device, and to improve data security.

According to a third aspect, an unlicensed channel access method is provided, including: A terminal device receives a paging message from an access network device, where the paging message includes indication information; and the terminal device performs unlicensed channel access based on the indication information.

In the foregoing method, the terminal device may perform unlicensed access of a first channel access type, or may perform unlicensed access of a second channel access type. Compared with a manner in which the terminal device can perform only the unlicensed access of the first channel access type, this method can improve flexibility of the unlicensed access of the terminal device. In addition, because a latency of the second channel access type is less than that of the first channel access type, an access speed of the terminal device can also be indirectly increased.

In a feasible design, the indication information is used to indicate an unlicensed channel access type, and that the terminal device performs unlicensed channel access based on the indication information includes: When the indication information is used to indicate the first channel access type, the terminal device performs unlicensed channel access of the first channel access type; or when the indication information is used to indicate the second channel access type, the terminal device performs unlicensed channel access of the second channel access type.

In a feasible design, the indication information is used to indicate occupiable duration of the unlicensed channel, and that the terminal device performs unlicensed channel access based on the indication information includes: When the occupiable duration of the unlicensed channel is greater than or equal to first duration, the terminal device performs unlicensed channel access of the second channel access type; or when the occupiable duration of the unlicensed channel is less than the first duration, the terminal device performs unlicensed channel access of the first channel access type.

According to a fourth aspect, an unlicensed channel access method is provided, including: An access network device determines occupiable duration of an unlicensed channel; the access network device determines indication information based on the occupiable duration of the unlicensed channel; and the access network device sends a paging message to a terminal device, where the paging message carries the indication information.

In the foregoing method, the access network device may indicate, based on different occupiable duration, the terminal device to perform channel access of different types, to reduce the channel access duration of the terminal device.

In a feasible design, that the access network device determines indication information based on the occupiable duration of the unlicensed channel includes: When the occupiable duration of the unlicensed channel is greater than or equal to second duration, the access network device determines that the indication information is a second channel access type; or when the occupiable duration of the unlicensed channel is less than the second duration, the access network device determines that the indication information is a first channel access type.

In a feasible design, the indication information is used to indicate the occupiable duration of the unlicensed channel.

According to a fifth aspect, a communication method is provided, including: A terminal device sends uplink data to an access network device by using a first physical uplink shared channel PUSCH resource; the terminal device determines a first SSB corresponding to the first PUSCH resource based on a correspondence between a PUSCH resource and a synchronization signal block SSB; and the terminal device monitors a physical downlink control channel PDCCH on the first SSB.

In a feasible design, the method further includes: The terminal device receives configuration information from the access network device, where the configuration information is used to configure a correspondence between the PUSCH resource and the SSB.

According to a sixth aspect, a communication method is provided, and the method includes: An access network device receives uplink data from a terminal device by using a first physical uplink shared channel PUSCH resource; the access network device determines a first SSB corresponding to the first PUSCH resource based on a correspondence between a PUSCH resource and a synchronization signal block SSB; and the access network device sends a physical downlink control channel PDCCH on the first SSB.

In a feasible design, the method further includes: The access network device sends configuration information to the terminal device, where the configuration information is used to configure a correspondence between the PUSCH resource and the SSB.

According to a seventh aspect, a communication method is provided, including: A terminal device determines a first synchronization signal block SSB; and the terminal device sends uplink data and an identifier of the first SSB to an access network device by using a first physical uplink shared channel PUSCH resource; and the terminal device monitors a physical downlink control channel PDCCH on the first SSB.

In a feasible design, the terminal device receives indication information from the access network device, where the indication information is used to indicate that the terminal device needs to report an identifier of an SSB.

According to a sixth aspect, a communication method is provided, including: An access network device receives uplink data and an identifier of a first synchronization signal block SSB from a terminal device by using a first physical uplink shared channel PUSCH; and the access network device sends a physical downlink control channel PDCCH to the terminal device on the first SSB.

In a feasible design, the access network device sends indication information to the terminal device, where the indication information is used to indicate that the terminal device needs to report an identifier of the SSB.

According to a ninth aspect, an embodiment of this application provides an apparatus. The apparatus includes units or means configured to perform the steps included in any design of the first aspect to the eighth aspect.

According to a tenth aspect, an embodiment of this application provides an apparatus. The apparatus includes at least one processor and a memory, and the at least one processor is configured to perform the method provided in any design of the first aspect to the eighth aspect.

According to an eleventh aspect, an embodiment of this application provides an apparatus. The apparatus includes at least one processor and an interface circuit, and the at least one processor is configured to perform the method provided in any design of the first aspect to the eighth aspect.

According to a twelfth aspect, an embodiment of this application provides a program. The program is used to perform the method provided in any design of the first aspect to the eighth aspect when being executed by a processor.

According to a thirteenth aspect, an embodiment of this application provides a program product, for example, a computer readable storage medium. When a computer reads and executes the computer program product, the computer is enabled to perform the method provided in any design of the first aspect to the eighth aspect.

The foregoing apparatus may be a chip. The processor may be implemented by hardware, or may be implemented by software. When the processor is implemented by hardware, the processor may be a logic circuit, an integrated circuit, or the like. When the processor is implemented by software, the processor may be a general purpose processor, implemented by reading software code stored in a memory. The memory may be integrated into the processor, or may be located outside the processor and exist independently.

There are one or more processors, and there are one or more memories.

The memory may be integrated with the processor, or the memory and the processor are disposed separately. In a specific implementation process, the memory and the processor may be integrated into one chip, or may be disposed on different chips. A type of the memory and a manner in which the memory and the processor are disposed are not limited in embodiments of this application.

DESCRIPTION OF EMBODIMENTS

Figure 1:
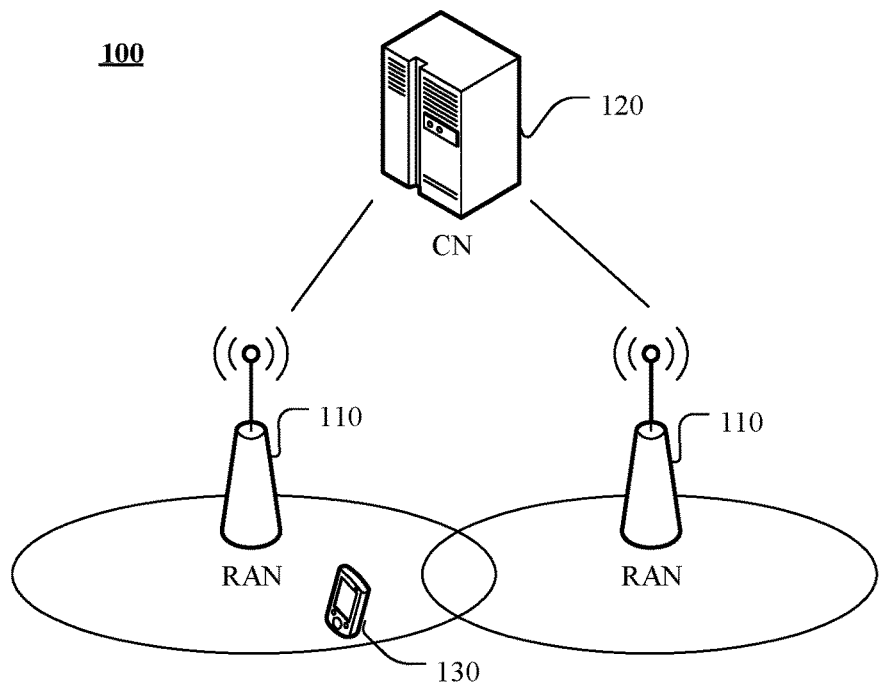
FIG. 1 is a schematic diagram of a communication system to which an embodiment of this application is applicable.

FIG. 1 shows a communication system 100 to which an embodiment of this application is applicable. The communication system 100 includes a radio access network (RAN) device 110, a core network (CN) device 120, and a terminal device 130.

The terminal device 130 may access a wireless network, and the wireless network includes the RAN device 110 and the CN device 120. The RAN device 110 is configured to connect the terminal device 130 to the wireless network, and the CN device 120 is configured to manage the terminal device 130 and provide a gateway for communicating with an external network.

The terminal device 130, also referred to as a user equipment (UE), a mobile station (MS), a mobile terminal (MT), or the like, is a device that provides voice/data connectivity to a user, for example, a handheld device or a vehicle-mounted device having a wireless connection function. Currently, some examples of the terminal are: a mobile phone, a tablet computer, a notebook computer, a palmtop computer, a mobile internet device (MID), a wearable device, a virtual reality (VR) device, an augmented reality (AR) device, a wireless terminal in industrial control, a wireless terminal in self driving, a wireless terminal in a remote medical surgery, a wireless terminal in a smart grid, a wireless terminal in transportation safety, a wireless terminal in a smart city, or a wireless terminal in a smart home.

The network device is a device in a wireless network, such as a radio access network (RAN) node through which the terminal device accesses the wireless network. Currently, some examples of the RAN node are: a gNB, a transmission reception point (TRP), an evolved NodeB (eNB), a radio network controller (RNC), a NodeB (NB), a base station controller (BSC), a base transceiver station (BTS), a home base station (for example, a home evolved NodeB or a home NodeB, HNB), a baseband unit (BBU), and a wireless fidelity (Wi-Fi) access point (AP). In a network structure, the network device may include a central unit (CU) node, or a distributed unit (DU) node, or a RAN device including a CU node and a DU node.

In the communication system 100 shown in FIG. 1, the RAN device 110 and the terminal device 130 may transmit data by using an air interface resource. The air interface resource may include at least one of a time domain resource, a frequency domain resource, or a code domain resource. Specifically, when the RAN device 110 and the terminal device 130 perform data transmission, the RAN device 110 may send control information to the terminal device 130 through a control channel, for example, a physical downlink control channel (PDCCH), to allocate resources of a data channel, for example, a physical downlink shared channel (PDSCH) or a physical uplink shared channel (PUSCH), to the terminal device. For example, the control information may indicate a symbol and/or a subcarrier to which the data channel is mapped. The RAN device 110 and the terminal device 130 transmit data on the allocated time-frequency resources through a data channel. The foregoing data transmission may include uplink data transmission and/or downlink data transmission. The downlink data (for example, data carried on the PDSCH) transmission may mean that the RAN device 110 sends data to the terminal device 130, and the uplink data (for example, data carried on the PUSCH) may mean that the terminal device 130 sends data to the RAN device 110. The data may be data in a broad sense, for example, may be user data, or may be system information, broadcast information, or other information. This is not limited.

For example, FIG. 1 shows two RAN devices 110, one terminal device 130, and one core network device 120. Optionally, the communication system 100 may include a quantity, other than two, of RAN devices, and may include a quantity, other than one, of terminal devices within coverage of each RAN. This is not limited in embodiments of this application.

Figure 2:
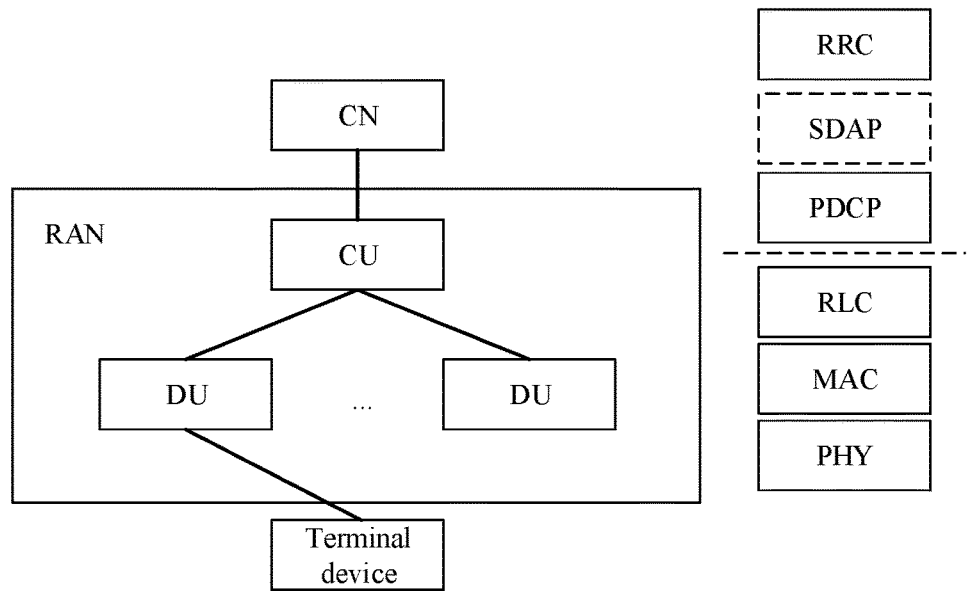
FIG. 2 is a schematic diagram of a network architecture to which an embodiment of this application is applicable.

FIG. 2 shows an architecture of a network device to which an embodiment of this application is applicable. The network device includes a CN device and a RAN device.

The RAN device includes a baseband apparatus and a radio frequency apparatus. The baseband apparatus may be implemented by one node, or may be implemented by a plurality of nodes. The radio frequency apparatus may be independently implemented remotely from the baseband apparatus, or may be integrated into the baseband apparatus, or some remote parts are integrated into the baseband apparatus. For example, in an LTE system, the RAN includes a baseband apparatus and a radio frequency apparatus. The radio frequency apparatus may be disposed remotely from the baseband apparatus. For example, a remote radio unit (RRU) is disposed remotely from a BBU.

Communication between the RAN device and the terminal device complies with a specific protocol layer structure. For example, a control plane protocol layer structure may include functions of protocol layers such as a radio resource control (RRC) layer, a packet data convergence protocol (PDCP) layer, a radio link control (RLC) layer, a media access control (MAC) layer, and a physical layer. A user plane protocol layer structure may include the functions of the protocol layers such as the PDCP layer, the RLC layer, the MAC layer, and the physical layer. In a possible implementation, a service data adaptation protocol (SDAP) layer may be further included above the PDCP layer.

The RAN device may implement functions of protocol layers such as RRC, SDAP, PDCP, RLC, and MAC by using one node or a plurality of nodes. For example, in an evolved structure, the RAN device may include a CU and a DU, and a plurality of DUs may be all controlled by one CU. For example, an interface between the CU and the DU may be referred to as an F1-U interface. As shown in FIG. 2, the CU and the DU may be divided based on a protocol layer of a wireless network. For example, functions of the PDCP layer and a layer above the PDCP layer are set in the CU, and functions of protocol layers below the PDCP layer, such as the RLC layer and the MAC layer, are set in the DU.

Division based on the protocol layer is merely an example, and division may alternatively be performed based on another protocol layer such as the RLC layer. Functions of the RLC layer and a protocol layer above the RLC layer are set on the CU, and a function of a protocol layer below the RLC layer is set on the DU. Alternatively, division is performed at a protocol layer. For example, some functions of the RLC layer and a function of a protocol layer above the RLC layer are set on the CU, and a remaining function of the RLC layer and a function of a protocol layer below the RLC layer are set on the DU. In addition, division may alternatively be performed in another manner, for example, division is performed based on a latency. A function whose processing time needs to meet a latency requirement is set on the DU, and a function whose processing time does not need to meet the latency requirement is set on the CU.

In addition, the radio frequency apparatus may be not placed in the DU but is placed remotely from the DU, or may be integrated into the DU, or a part is placed remotely from the DU and a remaining part is integrated into the DU. This is not limited herein.

Figure 3:
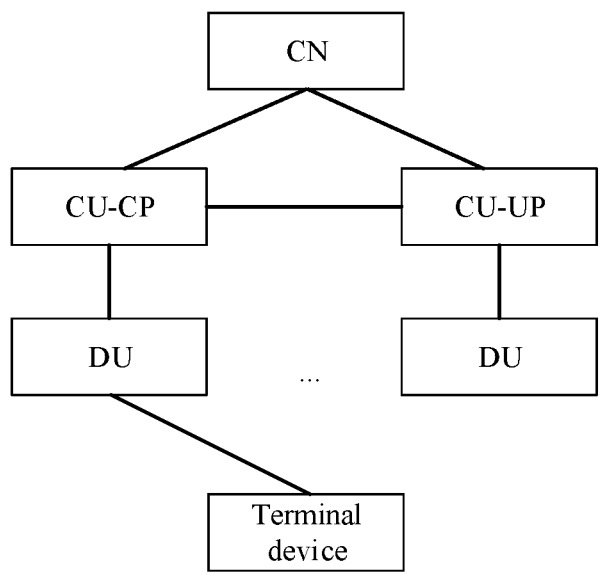
FIG. 3 is another schematic diagram of a network architecture to which an embodiment of this application is applicable.

FIG. 3 shows another network architecture to which an embodiment of this application is applicable. Compared with the architecture shown in FIG. 2, a control plane (CP) and a user plane (UP) of a CU may alternatively be separated into different entities for implementation, and the different entities are a control plane CU entity (CU-CP entity) and a user plane CU entity (CU-UP entity).

In the network architecture shown in FIG. 3, signaling generated by the CU may be sent to a terminal device by using the DU, or signaling generated by a terminal device may be sent to the CU by using the DU. The DU may transparently transmit the signaling to the terminal device or the CU by directly encapsulating the signaling at a protocol layer without parsing the signaling. In the following embodiments, if transmission of the signaling between the DU and the terminal device is described, sending or receiving the signaling by the DU is applicable to the scenario. For example, signaling of an RRC layer or a PDCP layer is finally processed as signaling of a PHY layer and sent to the terminal, or signaling of an RRC layer or a PDCP layer is converted from received signaling of a PHY layer. In this architecture, the signaling of the RRC or the PDCP layer may also be considered to be sent by the DU, or sent by the DU and a radio frequency.

In the foregoing embodiment, the CU is classified into a network device on a RAN side. In addition, the CU may alternatively be classified into a network device on a CN side. This is not limited herein. The apparatus in the following embodiments of this application may be located in a terminal device or a network device based on a function implemented by the apparatus. When the foregoing CU-DU architecture is used, the network device may be a CU node, a DU node, or a RAN device including a CU node or a DU node.

Based on the communication system shown in FIG. 1 and the network architecture shown in FIG. 2 or FIG. 3, an embodiment of this application provides a scenario as follows: It should be noted that in the following embodiment, use of an access network device and use of a network device are not specifically distinguished. Unless otherwise specified, the network device in the following embodiment is specifically an access network device.

The terminal device may have three radio resource control (RRC) states: an RRC connected state, an RRC idle state, and an inactive state.

Same as the idle state, in the inactive state, when an RRC connection of the terminal device disconnects, the terminal device does not need to receive downlink data, to achieve a power saving effect same as that of the idle state. Different from the idle state, in the inactive state, a terminal device dedicated channel between an access network device and a core network device (for example, an AMF and a UPF) is maintained, and the terminal device and the access network device store a context of the terminal device. After the terminal device receives a paging of the access network device, the terminal device initiates an RRC connection resume process, and enters the connected state based on the stored context of the terminal device.

Currently, only a terminal device in the RRC connected state can perform data transmission with the network device. A terminal device in the RRC idle state or a terminal device in the inactive state can perform data transmission with the network device only after an RRC connection is set up or an RRC connection is resumed.

Figure 4:
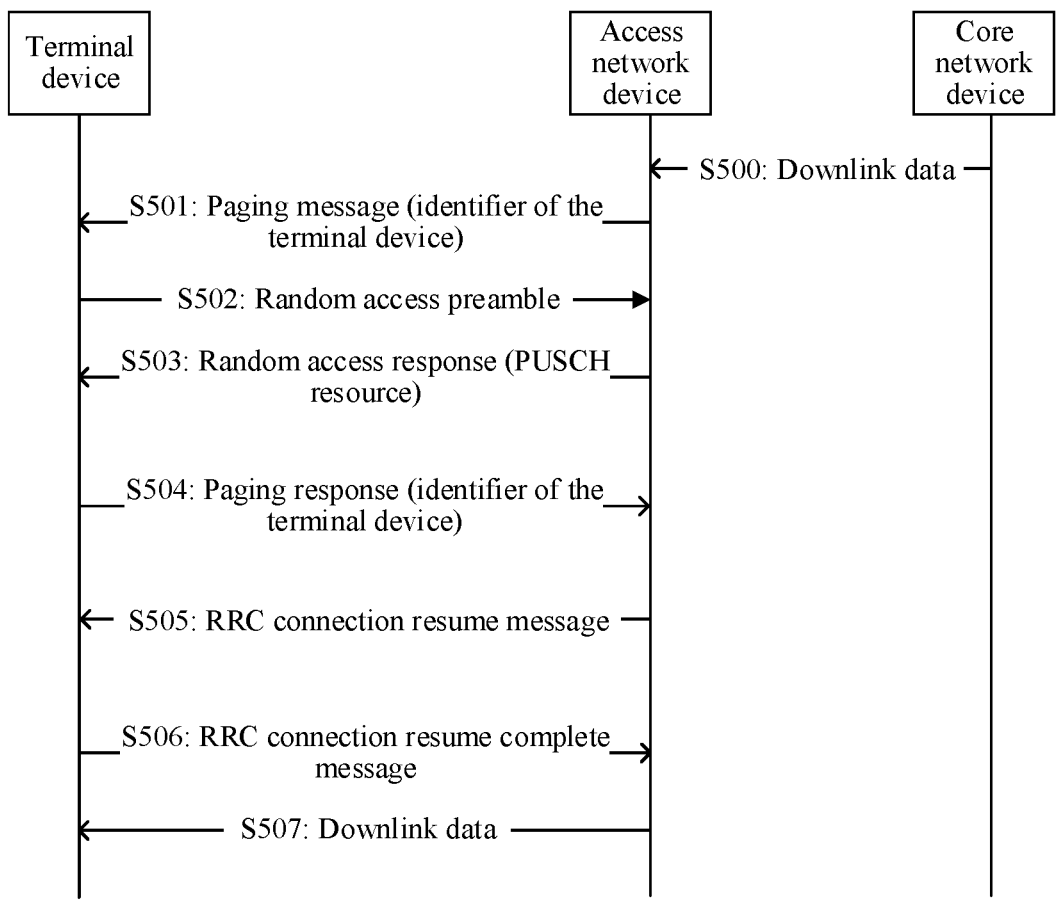
FIG. 4 is a schematic diagram of downlink data transmission according to an embodiment of this application.

As shown in FIG. 4, a procedure of a downlink data transmission method is provided. A principle of the method is that: A terminal device in an RRC idle state or a terminal device in an inactive state first sets up or resumes an RRC connection, and then performs data transmission with a network device after the RRC connection is set up or resumed. The procedure is specifically as follows:

S500: A core network device sends downlink data to an access network device.

S501: The access network device sends a paging message to the terminal device, where the paging message includes an identifier of the terminal device.

S502: After finding that the paging message carries the identifier of the paged terminal device, the paged terminal device sends a random access preamble to the access network device. Specifically, the terminal device may obtain and randomly select a random access preamble from a broadcast message.

S503: The access network device sends a random access response to the terminal device, where the random access response carries a PUSCH resource, and the PUSCH resource is specifically a PUSCH resource used by the terminal device to send a paging response.

S504: The terminal device sends the paging response to the access network device, where the paging response includes the identifier of the terminal device.

After receiving the paging response, the access network device learns of the identifier of the terminal device, and then performs S505, to notify the terminal device to resume the RRC connection.

S505: The access network device sends an RRC connection resume message to the terminal device.

S506: After the terminal device receives the RRC connection resume message, the terminal device enters an RRC connected state, and sends an RRC connection resume complete message to the access network device.

It should be noted that the foregoing descriptions of S505 and S506 are specific to a case in which the paged terminal device is in the inactive state. If the paged terminal device is in the idle state, S505 may be replaced with the following: The access network device sends an RRC connection setup request message to the terminal device. S506 may be replaced with the following: The terminal device sends an RRC connection setup complete message to the access network device.

S507: After receiving the RRC connection resume complete message, the access network device sends the downlink data to the terminal device.

Optionally, for the terminal device in the inactive state, the access network device may further send an RRC connection release message to the terminal device, to notify the terminal device to keep in the inactive state.

It can be learned from the descriptions of the figure that, for the terminal device in the idle state and the terminal device in the inactive state, the RRC connection can be set up or resumed only after the processes in S500 to S506 are performed, and then the downlink data can be transmitted in S507. For an application with a small data volume, in the foregoing method, most resources are used to set up or resume the RRC connection, and data transmission efficiency is low.

Based on the foregoing descriptions, a solution of early downlink data transmission is provided. The early downlink data transmission means that the access network device sends the downlink data to the terminal device before the RRC connection is set up or resumed, or before the terminal device receives an RRC connection setup response or an RRC connection resume response. Based on the early downlink data transmission, the data transmission efficiency can be improved. In this embodiment of this application, the following two solutions are provided: a solution 1 and a solution 2. Solution 1: A non-access stratum (NAS) message in a signaling bearer on a control plane is used to carry a downlink data packet. Solution 2: A data bearer on a user plane is used to send downlink data.

Figure 5:
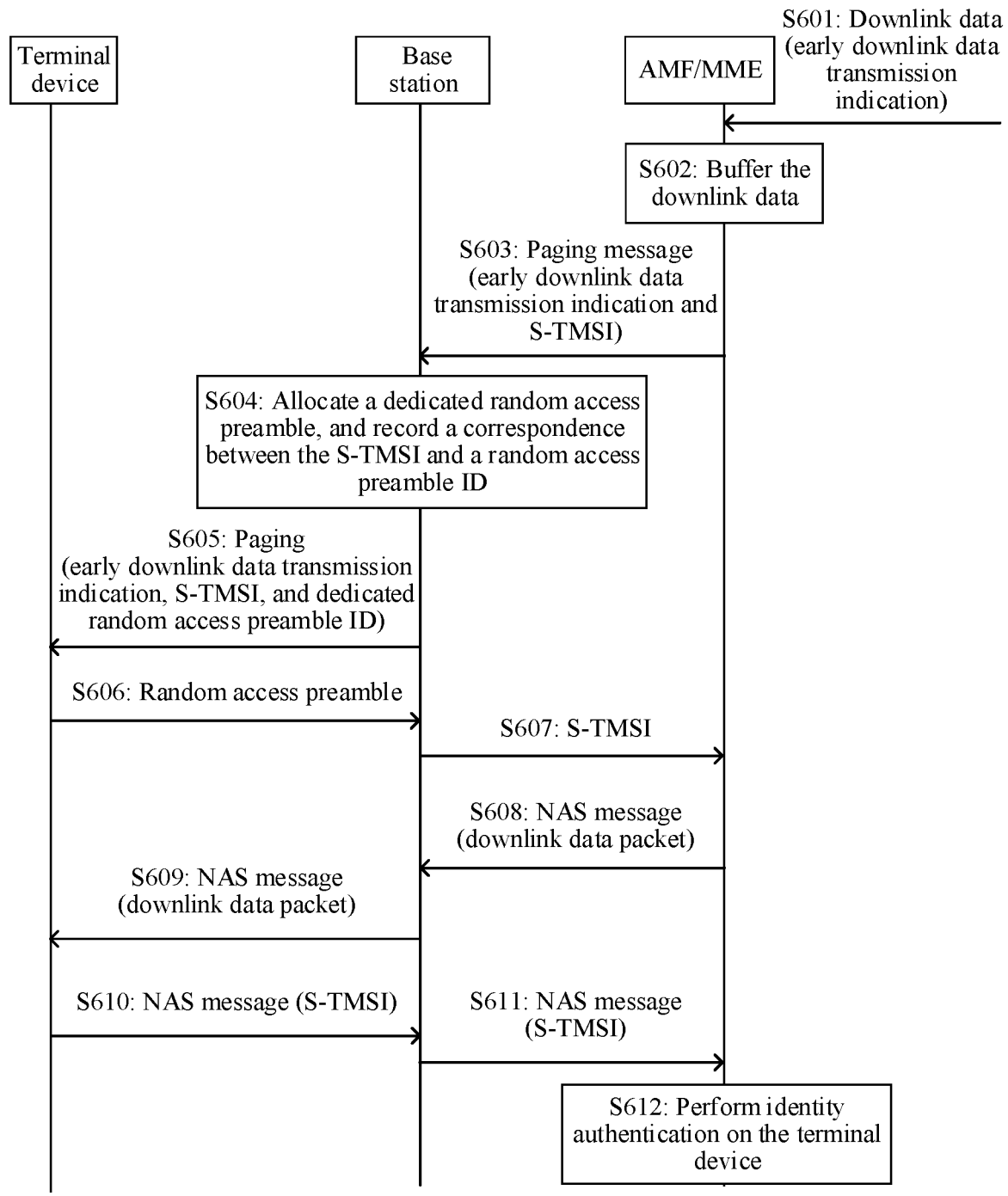
FIG. 5 is a schematic diagram of early downlink data transmission according to an embodiment of this application.

As shown in FIG. 5, a procedure of an early downlink data transmission method is provided. The method may be applied to the foregoing solution 1. In the procedure, an example in which an access network device is a base station and a core network device includes a mobility management entity (MME) or a access and mobility management function (AMF) is used for description. In the procedure, early downlink data transmission of a terminal device in an idle state is used as an example for description. The procedure includes the following steps.

S601: The AMF/MME receives downlink data of the terminal device in the idle state. Optionally, the downlink data may include an early downlink data transmission indication.

S602: The AMF/MME buffers the downlink data.

S603: The AMF/MME sends a paging message to the base station, where the paging message includes the early downlink data transmission indication and a serving-temporary mobile subscriber identity (S-TMSI) of the paged terminal device.

S604: After receiving the paging message, the base station allocates a dedicated random access preamble to the terminal device, and records a correspondence between a ID and an S-TMSI.

S605: The base station sends the paging message to the terminal device, where the paging message includes the early downlink data transmission indication, the S-TMSI of the paged terminal device, and a dedicated preamble ID.

S606: After receiving the paging message, the paged terminal device obtains the dedicated preamble from the paging message, and sends the dedicated preamble to the base station.

S607: After receiving the dedicated preamble, the base station searches the established correspondence for an S-TMSI corresponding to the dedicated preamble, and sends the S-TMSI to the AMF/MME.

S608: The AMF/MME stores the downlink data in a NAS message, and sends the NAS message to the base station.

S609: After receiving the NAS message, the base station sends the NAS message to the terminal device.

S610: If the terminal device correctly receives the downlink data, the terminal device generates a NAS message and sends the NAS message to the base station, where the NAS message carries the S-TMSI.

S611: The base station sends the NAS message to the AMF/MME.

S612: The AMF/MME performs identity authentication on the NAS message, and if the authentication succeeds, the AMF/MME considers the downlink data is sent to the paged terminal device.

Through the foregoing process, the early downlink data transmission is implemented, and data transmission efficiency is improved. However, in the foregoing process, the paging message is transmitted in plaintext, and the dedicated preamble is also in plaintext, so that the dedicated preamble can also be received by a terminal device that is not paged. If the another terminal device forges the paged terminal device to send the dedicated preamble, the base station considers that the preamble is sent by the paged terminal device, and sends the S-TMSI corresponding to the preamble to the MME/AMF. The MME/AMF uses the received S-TMSI as a response to paging the terminal device, that is, sends the downlink data to the terminal device in S608 without performing identity authentication on the terminal device. Consequently, the downlink data may be sent to an incorrect terminal device.

Figure 6:
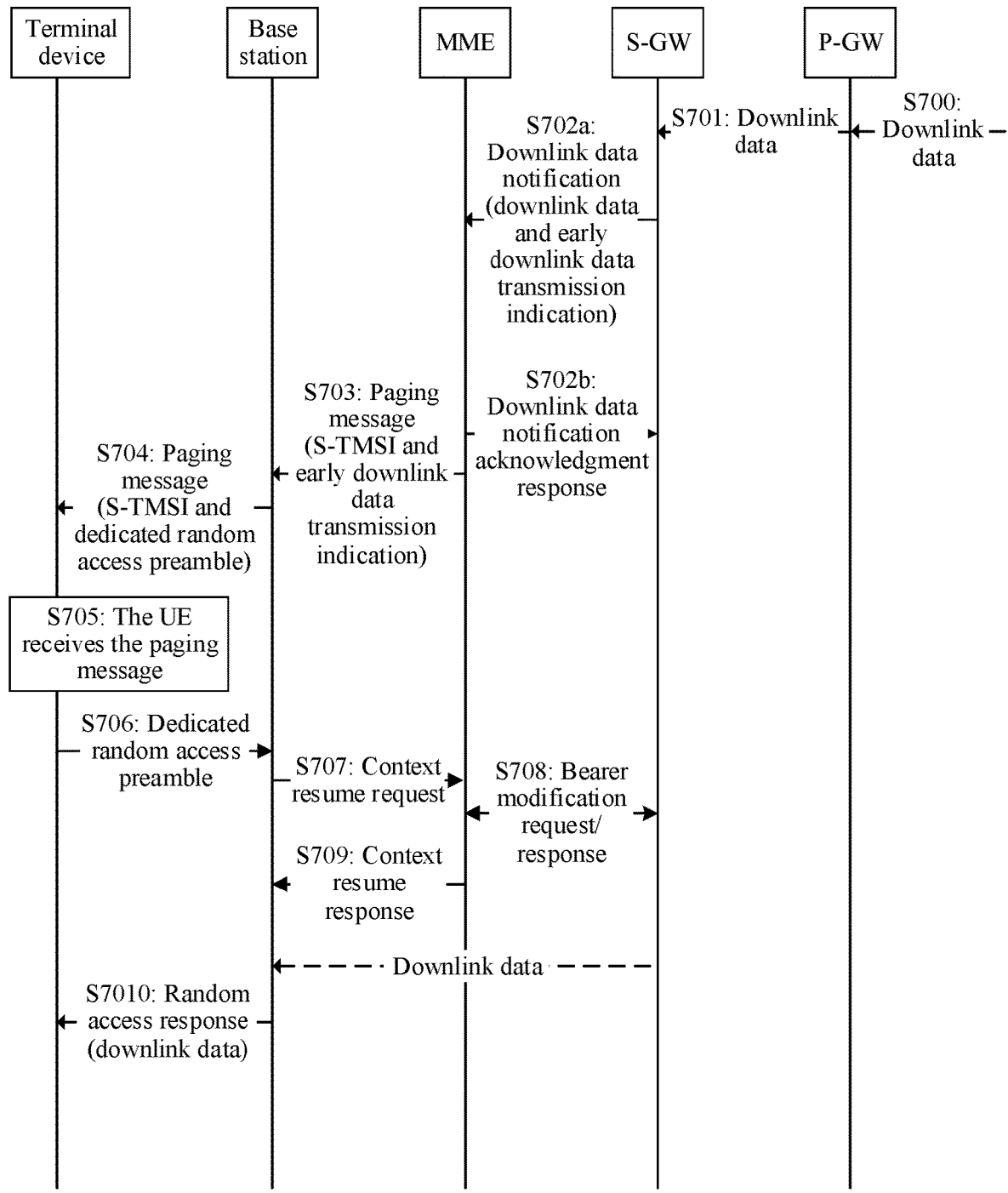
FIG. 6 is another schematic diagram of early downlink data transmission according to an embodiment of this application.

As shown in FIG. 6, a procedure of an early downlink data transmission method is provided. The method may correspond to the foregoing solution 2. In the procedure, a case in which an access network device is used as a base station, and a core network device includes a mobility management entity (MME), a serving gateway (S-GW), and a PDN gateway (P-GW) is used as an example for description. In the procedure, early downlink data transmission of a terminal device in an idle state is used as an example for description. The procedure includes the following steps.

S700: The P-GW receives downlink data of the terminal device in the idle state.

S701: The P-GW sends the downlink data of the terminal device in the idle state to the S-GW by using a dedicated link of the terminal device.

S702a: The S-GW sends a downlink data notification of the terminal device in the idle state to the MME by using the dedicated link of the terminal device, where the downlink data notification includes an early downlink data transmission indication and the downlink data.

S702b: The MME sends a downlink data notification acknowledgment response to the S-GW.

S703: The MME sends a paging message to the base station, where the paging message carries an S-TMSI and the early downlink data transmission indication.

S704: The base station determines a dedicated preamble, sends the paging message to the terminal device, where the paging message carries the S-TMSI and an ID of the dedicated preamble, and records a correspondence between the preamble and the S-TMSI.

S705: The terminal device receives the paging message from the base station.

S706: The terminal device that matches the S-TMSI sends the dedicated preamble to the base station.

S707: After receiving the preamble, the base station finds, from the record, an S-TMSI corresponding to the preamble, and sends a context resume request of the terminal device to the MME. The context resume request may indicate that a suspended RRC connection of the terminal device is resumed or that the terminal device needs to perform access for early data transmission.

Optionally, S708: The MME sends a bearer modification request to the S-GW, where the bearer modification request includes tunnel address information of the base station; and the S-GW sends a bearer modification response to the MME, where the bearer modification response includes address information of the S-GW.

S709: The MME sends a context resume response to the base station.

After the foregoing process, restoration of a dedicated channel between the base station and the S-GW is completed. The S-GW may send the downlink data to the base station by using the established dedicated channel.

S7010: The base station sends a random access response message to the terminal device, where the random access response carries the downlink data.

Through the foregoing process, the early downlink data transmission is implemented, and data transmission efficiency is improved. However, in the foregoing process, the dedicated preamble ID in the paging message is in plaintext, so that the dedicated preamble ID can also be received by a terminal device in addition to a terminal device that is not paged. If the another terminal device forges the paged terminal device to send the dedicated preamble, the base station considers that the dedicated preamble is a preamble sent by the paged terminal device, and notifies the MME to restore the dedicated channel between the base station and the S-GW. The dedicated channel is restored to perform downlink data transmission when security verification is not performed on identity information, namely, the S-TMSI of the terminal device. Consequently, data may be sent to an incorrect terminal device.

It can be learned from the foregoing descriptions of the solutions in FIG. 5 and FIG. 6 that, in the foregoing solutions, the base station transmits the downlink data to the terminal device without performing identity authentication on the terminal device. In this case, the paged terminal device may be forged, and the downlink data may be transmitted to the incorrect terminal device.

Based on the foregoing descriptions, an embodiment of this application further provides an early downlink data transmission method. A principle of the method is that: After identity authentication is performed on the terminal device, downlink data is sent to a terminal device, to resolve a problem that the paged terminal device is forged, and downlink data is transmitted to an incorrect terminal device.

Figure 7:
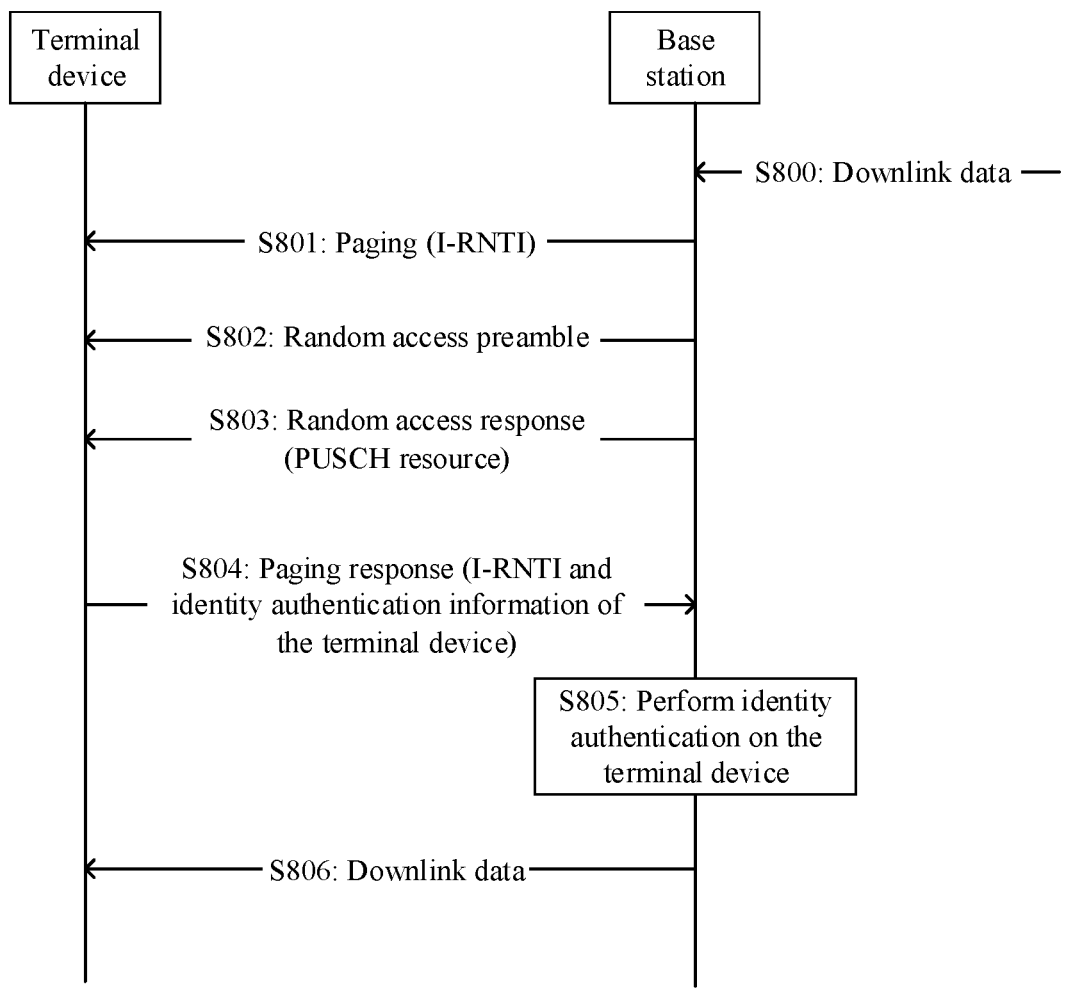
FIG. 7 is still another schematic diagram of early downlink data transmission according to an embodiment of this application.
Figure 8:
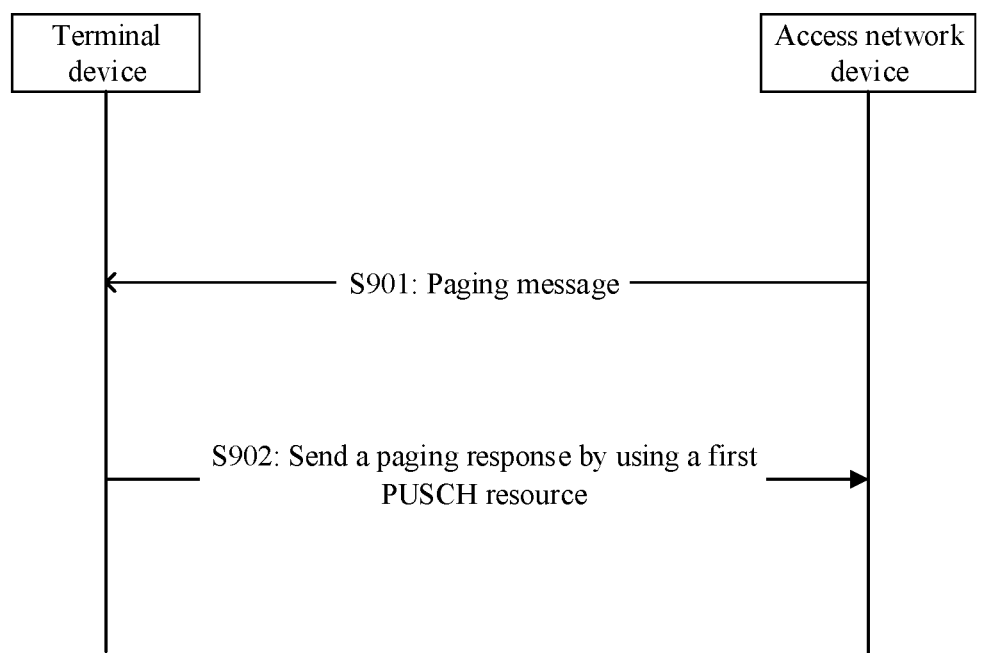
FIG. 8 is a schematic diagram of a communication method according to an embodiment of this application.

FIG. 7 shows a procedure of the foregoing early downlink data transmission method. In the procedure, an example in which an access network device is a base station is used for description. In addition, in the procedure shown in FIG. 7, early downlink data transmission of a terminal device in an inactive state is used as an example for description. As shown in FIG. 8, the procedure includes the following steps.

S800: The base station receives downlink data of the terminal device in the inactive state.

S801: The base station sends a paging message to the terminal device, where the paging message carries an early downlink data transmission indication and an identifier of the terminal device. For example, the identifier of the terminal device may be specifically an inactive radio network temporary identifier (I-RNTI).

S802: The paged terminal device finds that the paging message carries the identifier of the paged terminal device.

Optionally, the terminal device obtains and selects a random access preamble from a broadcast message, and sends a preamble request.

S803: The base station sends a random access response to the terminal device, where the random access response may include a PUSCH resource, and may further include a timing adjustment TA command and the like.

S804: The terminal device sends a paging response, where the paging response includes identity authentication information of the terminal device, the I-RNTI, and the like. The paging response may be an RRC message, and is sent by using the PUSCH resource carried in the random access response.

S805: The base station performs identity authentication on the terminal device, and performs S806 after the identity authentication of the terminal device succeeds.

S806: The base station sends the downlink data to the terminal device. Optionally, when sending the downlink data, the base station may further send an RRC connection release message to the terminal device, to notify the terminal device to keep in the inactive state.

In the foregoing solution, downlink data transmission is performed only after identity authentication is performed on the terminal device, so that a data transmission security problem is resolved. However, it can be learned from the foregoing descriptions that after receiving the paging message, the terminal device can perform downlink data transmission only after sending a four-step random access process (specifically, S802, S803, S804, and S806). A latency of the downlink data is large, and efficiency needs to be further improved.

Based on the foregoing descriptions, embodiments of this application provide a communication method and an apparatus. A principle of the method is that: A PUSCH resource for sending a paging response is preconfigured by a terminal device, and/or the PUSCH resource for sending a paging response is configured by using a paging message. In this way, an access network device can send the paging response to the terminal device earlier, and perform identity authentication earlier, to transmit downlink data as soon as possible, reduce a latency of the downlink data, and resolve a data transmission security problem.

As shown in FIG. 8, a procedure of a communication method is provided. An access network device in the procedure may be the RAN device 110 in FIG. 1. The access network device may use the network architecture shown in FIG. 2 or FIG. 3. A terminal device may be the terminal device 130 in FIG. 1. The procedure includes the following steps.

S901: The access network device sends a paging message to the terminal device. Correspondingly, the terminal device receives the paging message from the access network device. The paging message includes at least one of an identifier of the paged terminal device, a random access preamble, or an early downlink data transmission indication. When the paging message carries the identifier of the paged terminal, the paged UE determines a first PUSCH resource from preconfigured PUSCH resources. When the paging message carries the identifier of the paged terminal device and the random access preamble identifier, the paged UE determines, based on the random access preamble identifier, a first PUSCH resource corresponding to the random access preamble identifier. When the paging message carries the identifier of the paged terminal device and the early downlink data transmission indication, the paged UE preferably determines a first PUSCH resource from preconfigured PUSCH resources. S902: The terminal device sends a paging response to the access network device by using the first PUSCH resource. Correspondingly, the access network device receives the paging response from the access network device by using the first PUSCH resource, where the paging response carries the identifier and identity authentication information that are of the terminal device, and the identifier and the identity authentication information that are of the terminal device are used for identity authentication of the terminal device. Optionally, S902 may alternatively be described as that: The terminal device sends the paging response to the access network device on the first PUSCH resource based on the early downlink data transmission indication or a random access preamble. In this case, the random access preamble may be a dedicated random access preamble, and the dedicated random access preamble may indicate early downlink data transmission.

Optionally, after receiving the paging response, the access network device may perform identity authentication on the terminal device. After the identity authentication of the terminal device succeeds, the access network device sends downlink data to the terminal device. For example, an authentication process may include: The access network device obtains, based on the identifier of the terminal device, a parameter used for identity authentication, and generates identity authentication information based on the parameter. In addition, the access network device compares the identity authentication information generated by the access network device with the identity authentication information carried in S902. If the two pieces of identity authentication information match, it is considered that the identity authentication of the terminal device succeeds; otherwise, it is considered that the identity authentication of the terminal device fails. Alternatively, after receiving the paging response, the access network device may send the paging response to a core network device, and the core network device performs identity authentication on the terminal device. A process of the identity authentication performed by the core network device is similar to the process of the identity authentication performed by the access network device, and details are not described herein again.

In this embodiment of this application, the first PUSCH resource for sending the paging response in S902 may be preconfigured, may be determined based on the paging message in S901, or may be determined based on a preconfiguration and the paging message in S901. The following describes in detail how the terminal device determines the first PUSCH. Specifically, two solutions may be described. In the first solution, the network device may independently configure the first PUSCH resource for the terminal device. This may also be described as follows: The terminal device independently determines the first PUSCH resource. In the second solution, in addition to configuring the first PUSCH resource, the network device may further configure a random access preamble preamble and time-frequency domain resources of the random access preamble for the terminal device. In other words, the network device simultaneously configures the random access preamble, the time-frequency domain resources of the random access preamble, and the first PUSCH resource for the terminal device. The second solution may also be referred to as a two-step random access (RACH) configuration. Alternatively, this may be described as follows: The terminal device simultaneously determines the random access preamble, the time-frequency domain resources of the random access preamble, the first PUSCH. Implementation of the first solution includes but is not limited to the following several manners.

In a feasible implementation, the access network device may send first configuration information to the terminal device, where the first configuration information is used to configure the first PUSCH resource. Correspondingly, the terminal device receives the first configuration information from the access network device, and determines the first PUSCH resource based on the first configuration information. Configuration information of the first PUSCH resource may include at least one of a time domain resource, a frequency domain resource, and a demodulation reference signal (DMRS) of a PUSCH. For example, the configuration information of the first PUSCH resource includes the time domain resource and the frequency domain resource of the PUSCH, and the DMRS is agreed on in a protocol or preset by the UE. For example, the configuration information of the first PUSCH resource includes the frequency domain resource of the PUSCH, and the DMRS and the time domain resource are agreed on in a protocol or preset by the UE. For example, the configuration information of the first PUSCH resource includes the time domain resource of the PUSCH, and the DMRS and the frequency domain resource are agreed on in a protocol or preset by the UE. The first configuration information may be a broadcast message, a dedicated message (for example, an RRC reconfiguration message or an RRC release message), physical layer signaling (for example, a PDCCH command or PDCCH scheduling signaling), or the like. When the first configuration information is the broadcast message, the first PUSCH resource is preconfigured for the terminal device by using the broadcast message. A plurality of terminal devices share the first PUSCH resource, and a conflict may exist between different terminal devices. However, this manner is simple and easy to implement, and after a cell of the terminal device is changed, the first PUSCH resource does not need to be reallocated.

In another feasible implementation, the paging message in S901 may carry configuration information of the first PUSCH resource. The terminal device may determine the first PUSCH resource based on the paging message in S901. In this manner, the UE may directly obtain the first PUSCH resource based on the paging message, to avoid a process in which the UE requests a network to allocate a PUSCH resource, and reduce a latency.

In still another feasible implementation, the access network device may send second configuration information to the terminal device, where the second configuration information is used to configure at least one PUSCH resource. Correspondingly, the terminal device may receive the second configuration information from the access network device, and the terminal device may determine the at least one PUSCH resource based on the second configuration information. Further, the terminal device may determine the at least one PUSCH resource based on the paging message. The second configuration information may be a broadcast message, a dedicated message, physical layer signaling, or the like. This is not limited.

For example, as shown in Table 1, each of the at least one PUSCH resource configured based on the second configuration information corresponds to an index. The paging message in S901 may carry an index of the first PUSCH resource, and the terminal device may determine the first PUSCH resource based on the index of the PUSCH resource carried in the paging message. For example, if the index corresponding to the first PUSCH resource is a first index, the first index may be carried in S901, and the terminal device may determine, based on the first index, the first PUSCH resource from the at least one PUSCH resource configured based on the second configuration information.

TABLE 1

| Index | List of PUSCH resources configured based on second configuration information |
|---|---|
| Index 1 | First PUSCH resource |
| Index 2 | Second PUSCH resource |
| Index 3 | Third PUSCH resource |

Alternatively, for example, as shown in Table 2, each of the at least one PUSCH resource configured based on the second configuration information corresponds to an identifier of one terminal device. The paging message in S901 may carry an index of a paged terminal device, and the terminal device may determine the first PUSCH resource based on the identifier of the paged terminal device. For example, the identifier of the paged terminal device is referred to as an identifier of a first terminal device, and there is a correspondence between the identifier of the first terminal device and the first PUSCH resource. In this case, the terminal device may determine the first PUSCH resource based on the identifier of the first terminal device carried in the paging message. Because the paging message originally needs to carry the identifier of the terminal device, in this manner, the paging message has no additional overheads.

TABLE 2

| Identifier of a terminal device | List of PUSCH resources configured based on second configuration information |
|---|---|
| Identifier of a first terminal device | First PUSCH resource |
| Identifier of a second terminal device | Second PUSCH resource |
| Identifier of a third terminal device | Third PUSCH resource |

Alternatively, for example, as shown in Table 3, each of the at least one PUSCH resource configured based on the second configuration information corresponds to a random access preamble identifier. The paging message in S901 carries a random access preamble identifier. The terminal device may determine the first PUSCH resource based on the random access preamble identifier carried in the paging message. For example, if the paging message in S901 carries a first random access preamble in the following table 3, the terminal device determines the first PUSCH resource based on a correspondence that is between a random access preamble and a PUSCH resource and that is shown in the following Table 3. Then, step S902 is performed based on the first PUSCH resource. Because the paging message originally needs to carry the random access preamble identifier, in this manner, the paging message has no additional overheads.

TABLE 3

| Identifier of a terminal device | List of PUSCH resources configured based on second configuration information |
|---|---|
| First random access preamble identifier | First PUSCH resource |
| Second random access preamble identifier | Second PUSCH resource |
| Third random access preamble identifier | Third PUSCH resource |

Alternatively, the paging message in S901 may carry identifiers of a plurality of paged terminal devices. Each terminal device may determine, based on a ranking of the terminal device in the paging message, a PUSCH resource corresponding to the terminal device. For example, as shown in Table 4, three PUSCH resources are configured based on the second configuration information: a PUSCH resource 1, a PUSCH resource 2, and a PUSCH resource 3. The paging message carries identifiers of three terminal devices, that is, the current paging message is used to page the three terminal devices, and the paging message is used to carry identification locations of the three terminal devices, which are respectively a location 1, a location 2, and a location 3 in a time domain sequence. When an identifier of a current terminal device occupies the location 1 in the paging message in S901, it may be determined that the first PUSCH resource used by the current terminal device to send the paging response in S902 is the PUSCH resource 1. When the identifier of the current terminal device occupies the location 2 in the paging message in S901, it may be determined that the first PUSCH resource used by the current terminal device to send the paging response in S902 is the PUSCH resource 2. Similarly, when the identifier of the current terminal device occupies the location 3 in the paging message in S901, it may be determined that the first PUSCH resource used by the current terminal device to send the paging response in S902 is the PUSCH resource 3. Because the paging message originally needs to carry the identifier of the paged terminal device, the paging message has no additional overheads.

TABLE 4

| List of PUSCH resources configured based on second configuration information |
|---|
| PUSCH resource 1 |
| PUSCH resource 2 |
| PUSCH resource 3 |

Alternatively, the terminal device may determine, based on a sequence of receiving paging messages, a PUSCH resource used to send each paging response. The example in Table 3 is still used. The network device configures three PUSCH resources for the terminal device based on the second configuration information: the PUSCH resource 1, the PUSCH resource 2, and the PUSCH resource 3. When receiving the paging message for the first time, the terminal device may send the paging response in S902 on the PUSCH resource 1. In other words, the PUSCH resource 1 is the first PUSCH resource in S902. When receiving the paging message for the second time, the terminal device may send the paging response in S902 on the PUSCH resource 2. In other words, the PUSCH resource 2 is the first PUSCH resource in S902. Similarly, when receiving the paging message for the third time, the terminal device may send the paging response in S902 on the PUSCH resource 3. In other words, the PUSCH resource 3 is the first PUSCH resource in S902. When the configured PUSCH resources are used in sequence, the PUSCH resources are used again in sequence. For example, when receiving the paging message for the fifth time, the terminal device sends the paging response in S902 on the PUSCH resource 1 again. The rest may be deduced by analogy. In this manner, the paging message includes no indication information of the PUSCH resource, and the paging message has no additional overheads.

Alternatively, the access network device may send third configuration information to the terminal device, where the third configuration information is used to configure a part of time-frequency domain resources in the first PUSCH resource. Correspondingly, the terminal device may receive the third configuration information from the access network device, and the terminal device determines the part of the time-frequency domain resources in the first PUSCH resource based on the third configuration information. The paging message in S901 carries a remaining part of the time-frequency domain resources in the first PUSCH resource, and the terminal device may determine the remaining part of the time-frequency domain resources in the first PUSCH resource based on the paging message in S901. Compared with a manner in which the paging message carries all of the time-frequency domain resources in the first PUSCH resource, this manner can reduce overheads of the paging message. For example, the third configuration information indicates time domain resource information. The time domain resource information may be a periodicity and a start location. The paging message carries frequency domain resource information. For example, the third configuration information indicates the frequency domain resource information, and the paging message carries the time domain resource information. In the foregoing solution 1, the terminal device may further send the random access preamble to the access network device by using the time-frequency domain resources of the random access preamble. Alternatively, the terminal device first determines whether a timing advance (TA) is valid. If the timing advance is valid, the terminal device no longer sends the random access preamble to the access network device. If the TA is invalid, the terminal device sends the random access preamble again.

Optionally, the terminal device determines the random access preamble based on the random access preamble identifier in the paging message. The random access preamble identifier is allocated to the terminal device.

For the foregoing solution 1, the paging response in S902 may be transmitted by using a NAS message in a signaling bearer on a control plane. In this case, the identity authentication information carried in the paging response is generated based on a NAS security key of the terminal device.

Figure 9:
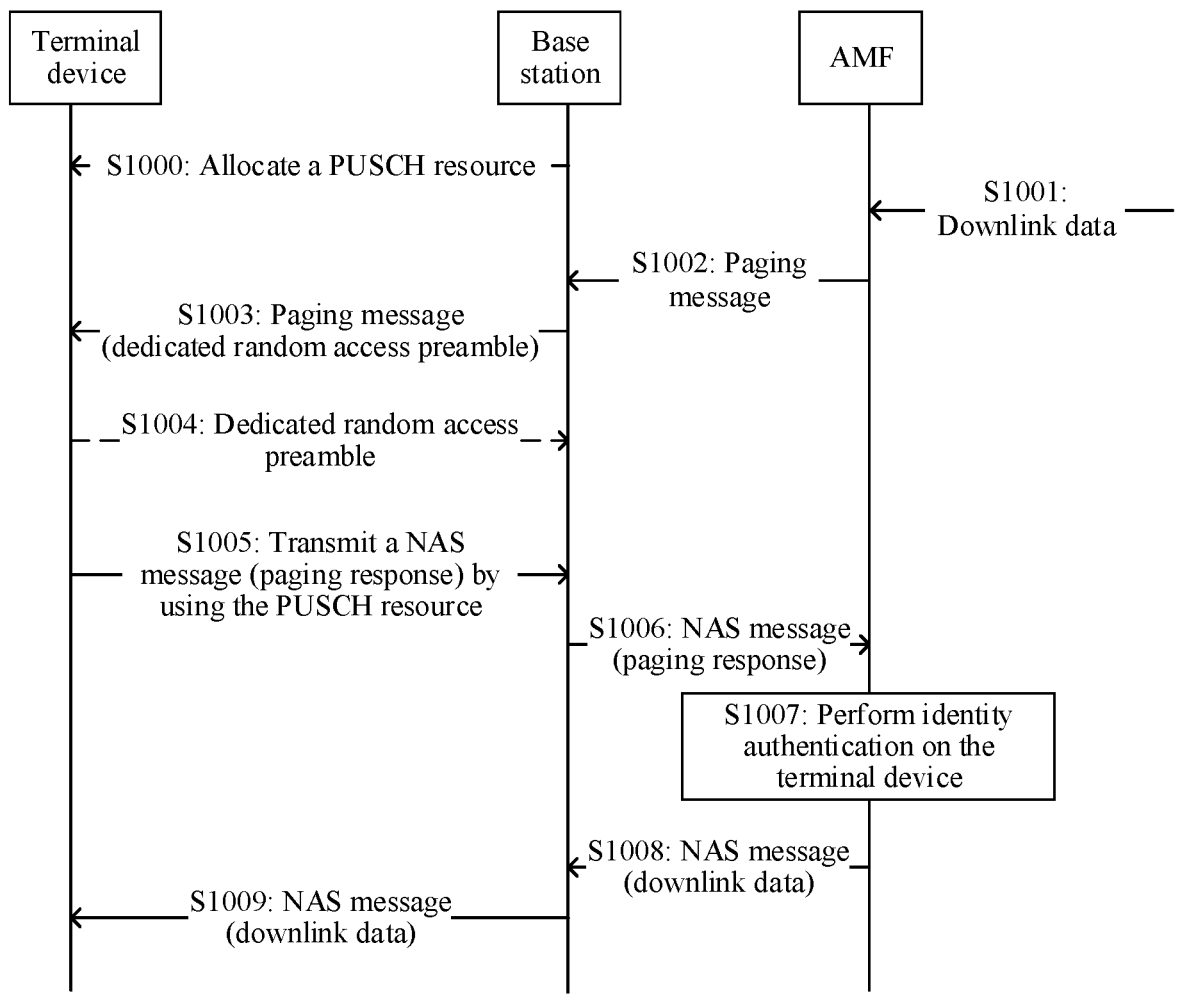
FIG. 9 is a schematic diagram of carrying early transmitted downlink data by using a control plane according to an embodiment of this application.

As shown in FIG. 9, a procedure of a communication method is provided. The procedure is specifically an example of transmitting the paging response by using the NAS message in the foregoing solution 1. In the procedure, early downlink data transmission of a terminal device in an idle state is used as an example for description. In the procedure, the terminal device may correspond to the terminal device in FIG. 8, a base station may correspond to the access network device in FIG. 8, an AMF is a network element in a core network device, and a PUSCH resource may correspond to the first PUSCH resource in FIG. 8. The procedure includes the following steps.

S1000: The base station allocates the PUSCH resource to the terminal device.

For example, the base station may allocate the PUSCH resource to the terminal device by using dedicated RRC signaling or PDCCH signaling. The RRC signaling may be an RRC reconfiguration message or an RRC connection release message. The PUSCH resource may be a PUSCH resource dedicated to the terminal device. Alternatively, the PUSCH resource may be a PUSCH resource shared by a plurality of terminal devices, and the shared PUSCH resource means that the PUSCH resource can be used by the plurality of terminal devices. Alternatively, the base station may configure the PUSCH resource for the terminal device by using a broadcast message, and the terminal device may obtain the PUSCH resource from the broadcast message.

S1001: The AMF receives downlink data.

S1002: The AMF sends a paging message to the base station, where the paging message carries an early downlink data transmission indication and an identifier of the paged terminal device, and the identifier of the terminal device may be an S-TMSI, an NG-5G-TMSI, or the like.

S1003: The base station sends a paging message to the terminal device, where the paging message carries preamble information and the identifier of the paged terminal device. Similarly, the identifier of the terminal device included in the paging message in S1003 may be the S-TMSI, the NG-5G-TMSI, or the like.

S1004: The terminal device sends a preamble to the base station.

Optionally, if a TA is invalid, the terminal device sends the preamble to the base station. If a TA is valid, the terminal device may not send the preamble to the base station.

S1005: The terminal device sends a NAS message to the base station by using the PUSCH resource, where the NAS message carries a paging response, and the paging response carries the identifier of the terminal device and identity authentication information of the terminal device.

S1006: The base station sends the NAS message to the AMF, where the NAS message carries the paging response, that is, carries the identifier of the terminal device and the identity authentication information of the terminal device.

S1007: The AMF performs identity authentication on the terminal device based on the identity authentication information carried in the paging response, and performs S1008 after the identity authentication of the terminal device succeeds.

For example, the AMF may obtain a NAS security key of the terminal device based on the identifier of the terminal device, and perform integrity and security verification on the NAS message based on the NAS security key.

S1008: The AMF sends a NAS message to the base station, where the NAS message carries the downlink data.

S1009: The base station sends the NAS message to the terminal device, where the NAS message carries the downlink data.

It can be learned from the above that, in this embodiment of this application, the network device preconfigures the PUSCH resource for the terminal device. Compared with the solution in FIG. 7 in which after the preamble is sent, the network device allocates, to the terminal device, the PUSCH resource used to transmit the paging response, this solution can simplify a random access process of the terminal device, and reduce a downlink data transmission latency.

In the procedure shown in FIG. 9, dashed lines represent optional steps. In addition, in the procedure shown in FIG. 9, an execution sequence of the foregoing steps S1000 to S10010 is not limited.

Alternatively, for the foregoing solution 1, the paging response in S902 may be transmitted by using access stratum RRC signaling. In this case, the identity authentication information carried in the paging response is generated based on one or more of the following parameters:

an access stratum key of the terminal device, a physical cell identifier of a source cell of the terminal device, a physical cell identifier of a target cell of the terminal device, and a source cell radio network temporary identifier (C-RNTI). A physical cell of the source cell is a cell in which the terminal device enters an inactive state or the idle state, the target cell is a cell in which the terminal device sends an RRC connection resume request or an RRC connection setup request, and the source C-RNTI is an identifier allocated to the cell in which the terminal device enters the inactive state or the idle state.

For example, the identity authentication information is generated based on the access stratum key of the terminal device, the physical cell identifier of the source cell of the terminal device, the physical cell identifier of the target cell of the terminal device, and the source cell radio network temporary identifier (C-RNTI).

Figure 10:
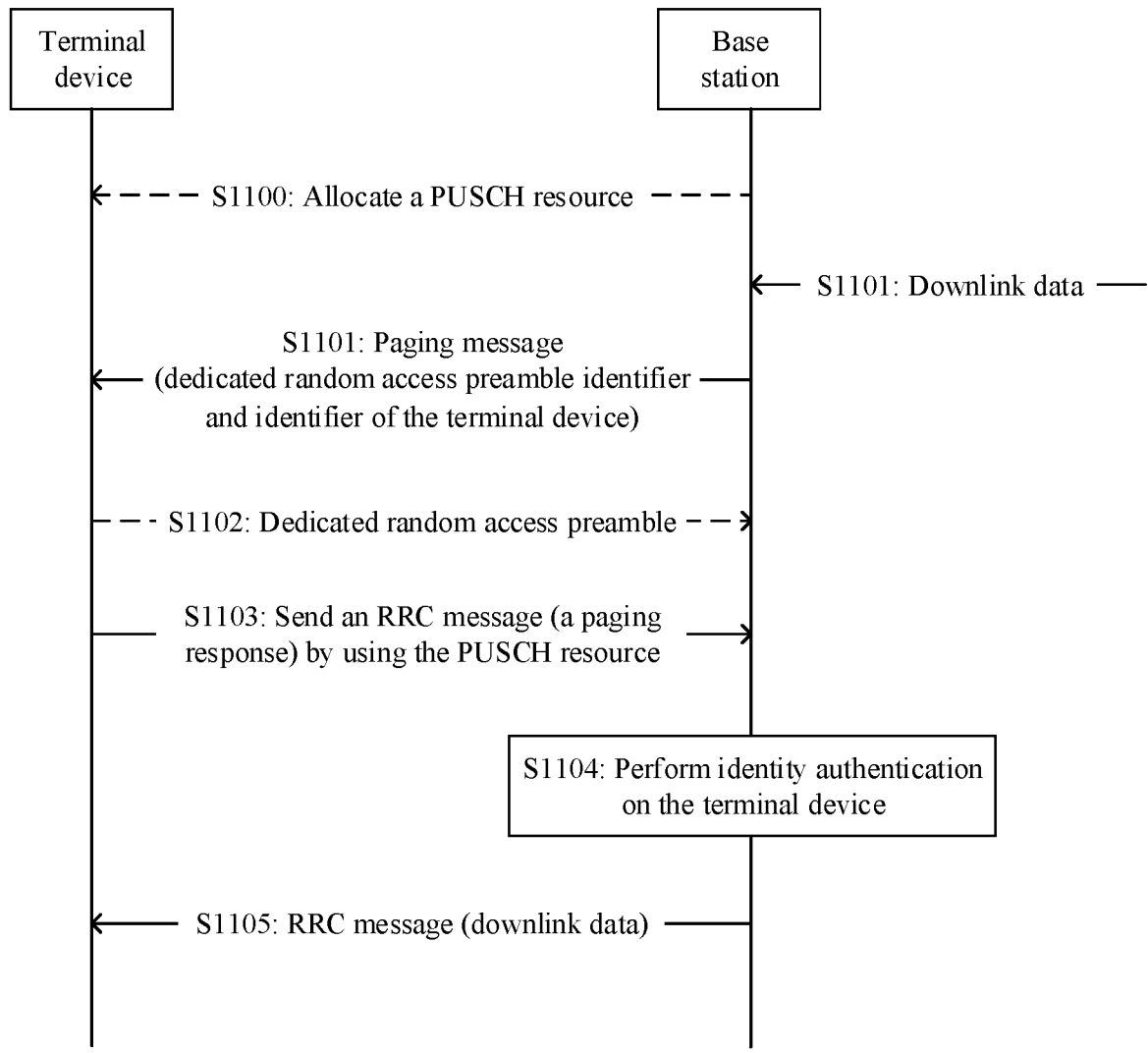
FIG. 10 is a schematic diagram of carrying early transmitted downlink data by using a user plane according to an embodiment of this application.

As shown in FIG. 10, a procedure of a communication method is provided. The procedure is specifically an example of transmitting the paging response by using an access stratum RRC signaling bearer in the foregoing solution 1. In the procedure, early downlink data transmission of a terminal device in an inactive state is used as an example for description. In the procedure, the terminal device may correspond to the terminal device in FIG. 8, a base station may correspond to the access network device in FIG. 8, and a PUSCH resource may correspond to the first PUSCH resource in FIG. 8. The procedure includes the following steps.

S1100: The base station allocates the PUSCH resource to the terminal device. For details, refer to the descriptions in S1000 in FIG. 10. Details are not described herein again.

S1101: The base station receives downlink data, and sends a paging message to the terminal device, where the paging message includes a preamble identifier and an identifier of the terminal device, and the identifier of the terminal device may include an identifier allocated by the base station to the terminal device, for example, may be a resume identifier Resume ID or an I-RNTI.

S1102: The terminal device obtains a preamble from the paging message, and sends the preamble to the base station. For example, the terminal device may send the preamble by using a PDCCH command. Optionally, if a TA is invalid, the terminal device may send the preamble to the base station. If the TA is valid, the terminal device may not send the preamble to the base station.

S1103: The terminal device sends an RRC message to the base station by using the PUSCH resource, where the RRC message (also referred to as RRC signaling) may be an RRC connection resume request message, an RRC connection setup request, or the like, the RRC message includes a paging response, and the paging response may include the identifier of the terminal device and identity authentication information of the terminal device.

S1104: The base station performs identity authentication on the terminal device, and performs S1105 after the identity authentication succeeds.

S1105: The base station sends the RRC message to the terminal device, where the RRC message may be a connection resume response or the like, and the RRC message carries the downlink data.

In this embodiment of this application, the paging response may be sent to the base station by using the preconfigured PUSCH resource. Compared with the solution in FIG. 8 in which after the preamble is sent, the network device allocates, to the terminal device, the PUSCH resource used to transmit the paging response, this solution can simplify a random access process of the terminal device, and reduce a downlink data transmission latency.

Implementation of the second solution includes but is not limited to the following several manners. In the following several manners, a manner of configuring the random access preamble, the time-frequency domain resources of the random access preamble, and the PUSCH resource for the terminal device may be referred to as a two-step RACH resource configuration process.

In a feasible implementation, the access network device may send fourth configuration information to the terminal device, where the fourth configuration information is used to configure a random access preamble, time-frequency domain resources of the random access preamble, and the first PUSCH resource. Correspondingly, the terminal device receives the fourth configuration information from the access network device, and the terminal device determines the first PUSCH resource based on the fourth configuration information. Then, in S902, the paging message is sent by using the first PUSCH resource. Optionally, the terminal device may further send the random access preamble to the access network device by using the time-frequency domain resources of the random access preamble. Correspondingly, the access network device receives the random access preamble from the terminal device by using the time-frequency domain resources of the random access preamble. The fourth configuration information may be a broadcast message, a dedicated message, physical layer signaling, or the like.

In another feasible implementation, the paging message in S901 may carry fifth configuration information, and the fifth configuration information is used to configure a random access preamble, time-frequency domain resources of the random access preamble, and the first PUSCH resource. The terminal device may determine the first PUSCH resource based on the fifth configuration information. Optionally, the terminal device may further determine the random access preamble and the time-frequency domain resources of the random access preamble based on the fifth configuration information, and send the random access preamble to the access network device by using the time-frequency domain resources of the random access preamble.

In still another feasible implementation, the access network device may send sixth configuration information to the terminal device, where the sixth configuration information is used to configure a random access preamble, time-frequency domain resources of the random access preamble, and a part of time-frequency domain resources in the first PUSCH resource. The paging message in S901 carries a remaining part of the time-frequency domain resources in the first PUSCH resource, and the terminal device may determine the remaining part of the time-frequency domain resources in the first PUSCH resource based on the paging message. Finally, the part of the time-frequency domain resources in the first PUSCH resource and the remaining part of the time-frequency domain resources in the first PUSCH resource may constitute the complete first PUSCH resource. Then, the terminal device may perform S902, that is, send a paging response to the access network device on the first PUSCH resource. Optionally, the terminal device may further send the random access preamble to the access network device by using the time-frequency domain resources of the random access preamble. Correspondingly, the access network device receives the random access preamble from the terminal device by using the time-frequency domain resources of the random access preamble.

In yet another feasible implementation, the access network device may send seventh configuration information to the terminal device, where the seventh configuration information is used to configure at least one random access configuration, and each random access configuration includes a random access preamble, time-frequency domain resources of the random access preamble, and time-frequency domain resources of the PUSCH. The terminal device determines a first random access configuration from the at least one random access configuration based on the paging message, where the first random access configuration includes the first PUSCH resource. The terminal device may determine the first PUSCH resource based on the first random access configuration.

For example, each of the at least one random access configuration corresponds to an index, the paging message includes a first index, the terminal device may determine the first random access configuration based on the first index, and there is a correspondence between the first index and the first random access configuration. Alternatively, each of the at least one random access configuration corresponds to an identifier of one terminal device, the paging message includes an identifier of a paged terminal device, and the terminal device may select the first random access configuration from the at least one random access configuration based on the identifier of the paged terminal device. There is a correspondence between the identifier of the paged terminal device and the first random access configuration. Alternatively, each of the at least one random access configuration corresponds to a random access preamble (or a random access preamble identifier), the paging message carries a first random access preamble identifier, the terminal device may determine the first random access configuration based on the first random access preamble identifier, and there is a correspondence between the first random access preamble and the first random access configuration.

In still yet another feasible implementation, the access network device may send seventh configuration information to the terminal device, where the seventh configuration information is used to configure at least one random access configuration, and each random access configuration includes a random access preamble, time-frequency domain resources of the random access preamble, and time-frequency domain resources of the PUSCH. The terminal device determines a first random access configuration from the at least one random access configuration based on PDCCH signaling scrambled by using a dedicated RNTI (for example, a C-RNTI), where the first random access configuration includes the first PUSCH resource. The terminal device may determine the first PUSCH resource based on the first random access configuration.

In the foregoing solution 2, the terminal device may further send the random access preamble to the access network device by using the time-frequency domain resources of the random access preamble. Alternatively, the terminal device first determines whether a timing advance (TA) is valid. If the timing advance is valid, the terminal device no longer sends the random access preamble to the access network device. If the TA is invalid, the terminal device sends the random access preamble again.

Specifically, for the foregoing solution 2, the paging response in S902 may be transmitted by using a NAS message in a signaling bearer on a control plane. In this case, the identity authentication information carried in the paging response is generated based on a NAS security key of the terminal device.

The terms such as "first", "second", and "$N^{th}$" in the first configuration information to $N^{th}$ configuration information do not have a limiting function, and are merely used to distinguish configuration information in different implementations. The first configuration information to the $N^{th}$ configuration information may be referred to as configuration information in respective embodiments. N is a positive integer greater than 1.

Figure 11:
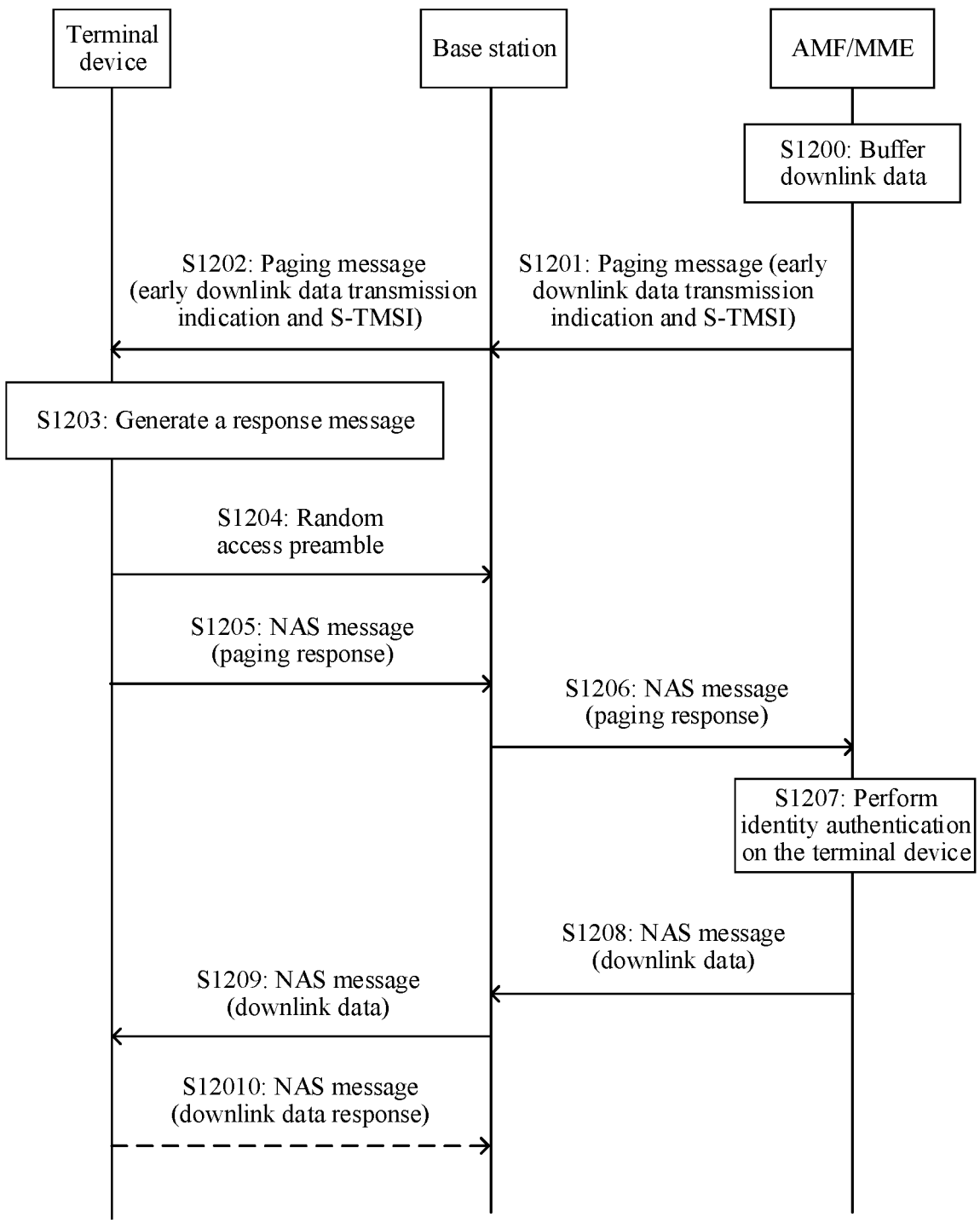
FIG. 11 is a schematic diagram of carrying early transmitted downlink data by using a control plane according to an embodiment of this application.

As shown in FIG. 11, a procedure of a communication method is provided. The procedure is specifically an example of transmitting the paging response by using the NAS message in the foregoing solution 2. In the procedure, early downlink data transmission of a terminal device in an idle state is used as an example for description. In the procedure, the terminal device may correspond to the terminal device in FIG. 8, a base station may correspond to the access network device in FIG. 8, an AMF/MME is a network element in a core network device, and a two-step random access channel (RACH) resource may correspond to the random access configuration in the foregoing solution 2. The procedure includes the following steps.

S1200: The AMF/MME buffers downlink data.

S1201: The AMF/MME sends a paging message to the base station, where the paging message includes an early downlink data transmission indication and an identifier of the paged terminal device.

S1202: The base station sends the paging message to the terminal device, where the paging message includes the early downlink data transmission indication and the identifier of the paged terminal device.

S1203: When the paged terminal device finds that the paging message carries the identifier of the paged terminal device and that the paging message includes the early downlink data transmission indication, the terminal device generates a paging response. Integrity protection is performed on the paging response by using a NAS key, and the paging response includes the identifier of the terminal device allocated by a core network.

S1204: The terminal device sends a preamble to the base station.

S1205: The terminal device sends a NAS message to the base station by using the two-step RACH resource, where the NAS message carries the paging response. Configuration information of the two-step RACH resource includes the preamble, time-frequency domain resources of the preamble, PUSCH time-frequency domain resources, a demodulation reference signal (DMRS), and the like. In S1205, the terminal device may specifically send the NAS message to the base station by using the PUSCH time-frequency domain resources in the two-step RACH resource. For details about a configuration manner of the two-step RACH resource, refer to the descriptions in the foregoing solution 2. Details are not described herein again.

After receiving the paging response, the base station may send the paging response to a core network element, for example, the AMF/MME. The core network element verifies the NAS message of the terminal device by using a security key of the terminal device. After the verification succeeds, the core network element stores the downlink data in the NAS message, and sends the NAS message to the base station. The base station sends the downlink data to the terminal device. Alternatively, the foregoing process may be described as follows:

S1206: The base station sends the NAS message to the AMF/MME, where the NAS message carries the paging response.

S1207: The AMF/MME performs identity authentication on the terminal device, and performs S1208 after the identity authentication succeeds.

S1208: The AMF/MME sends a NAS message to the base station, where the NAS message includes the downlink data.

S1209: The base station sends the NAS message to the terminal device.

S12010: The terminal device sends a NAS message to the base station, where the NAS message includes a downlink data response. For example, if the terminal device correctly receives the downlink data, the downlink data response carries an acknowledgment (ACK); otherwise, the downlink data response carries a negative acknowledgment (NACK).

Alternatively, for the foregoing solution 2, the paging response in S902 may be transmitted by using access stratum RRC signaling. In this case, the identity authentication information carried in the paging response is generated based on at least one or more of the following parameters:

an access stratum key of the terminal device, a physical cell identifier of a source cell of the terminal device, a physical cell identifier of a target cell of the terminal device, and a C-RNTI.

Figure 12:
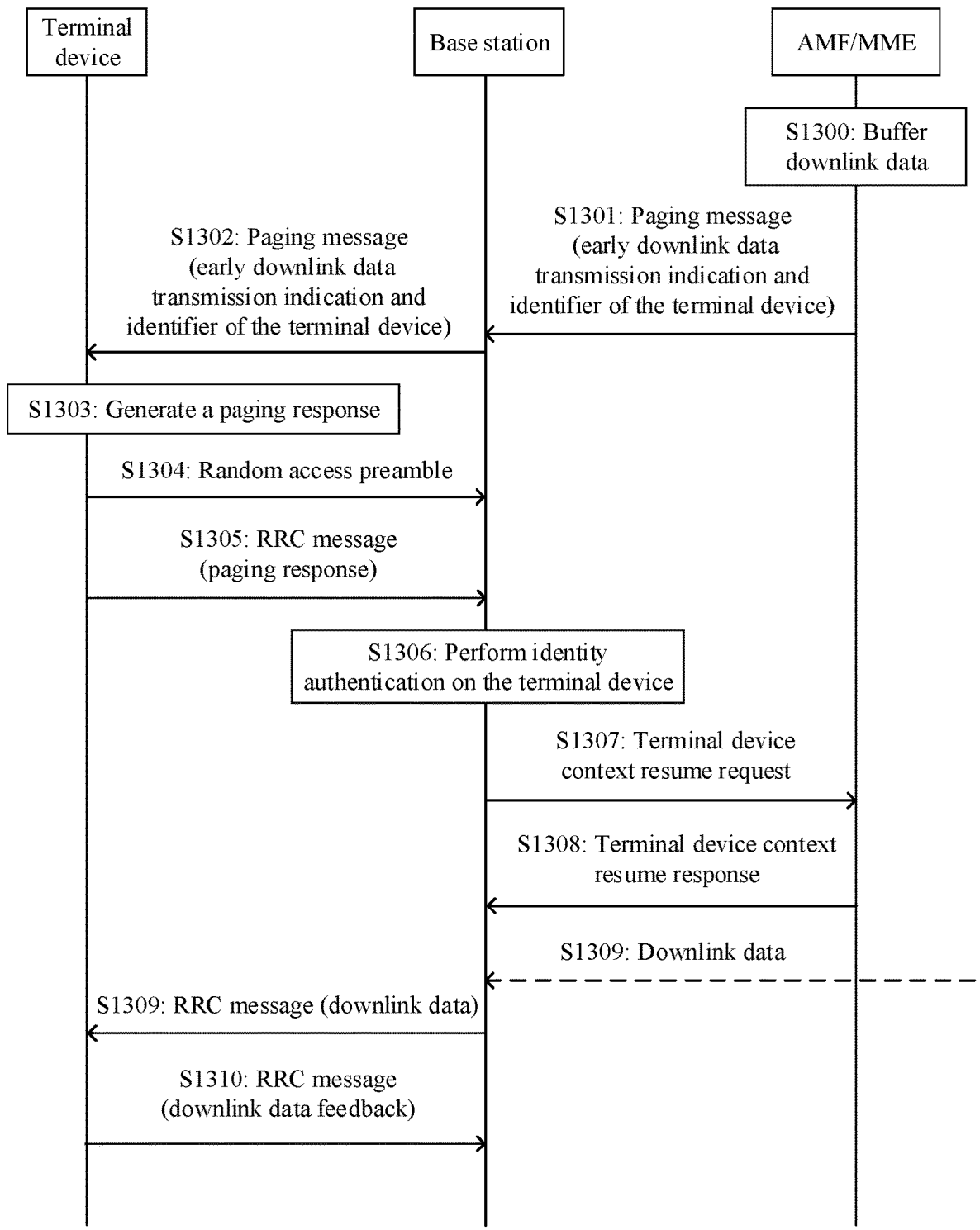
FIG. 12 is a schematic diagram of carrying early transmitted downlink data by using a user plane according to an embodiment of this application.

As shown in FIG. 12, a procedure of a communication method is provided. The procedure is specifically an example of transmitting the paging response by using the access stratum RRC signaling in the foregoing solution 2. In the procedure, early downlink data transmission of a terminal device in an idle state is used as an example for description. In the procedure, the terminal device may correspond to the terminal device in FIG. 8, a base station may correspond to the access network device in FIG. 8, an AMF/MME is a network element in a core network device, and a two-step random access channel (RACH) resource may correspond to the random access configuration in the foregoing solution 2. The procedure includes the following steps.

S1300: The AMF/MME buffers downlink data.

S1301: The AMF/MME sends a paging message to the base station, where the paging message includes an early downlink data transmission indication and an identifier of the paged terminal device, and the identifier of the paged terminal device may be an identifier allocated to the terminal device by a core network, for example, an S-TMSI or an NG-5G-S-TMSI.

S1302: The base station sends the paging message to the terminal device, where the paging message includes the early downlink data transmission indication and the identifier of the paged terminal device.

S1303: When the paged terminal device finds that the paging message carries the identifier of the paged terminal device and that the paging message includes the early downlink data transmission indication, the terminal device generates a paging response. The paging response is an access stratum RRC message including identity authentication information of the terminal device. For example, the RRC message may be an RRC connection resume request message.

S1304: The terminal device sends a preamble to the base station.

S1305: The terminal device sends the paging response to the base station by using the two-step RACH resource. Alternatively, this may be described as follows: The terminal device sends the RRC message to the base station by using the two-step RACH resource, where the RRC message carries the paging response, and the RRC message may be specifically an RRC resume request or the like. Specifically, the terminal device sends the paging response, the RRC resume request, or the like to the base station by using a PUSCH resource in the two-step RACH resource.

S1306: After receiving the paging response, the base station may parse the paging response to obtain the identity authentication information, and verify the identity information of the terminal device by using a security key of the terminal device. After successfully performing identity authentication on the terminal device, the base station performs S1307.

S1307: The base station sends a context resume request of the terminal device to a core network element (for example, an AMF/MME). The context resume request of the terminal device may indicate that a suspended RRC connection of the terminal device is resumed or that the terminal device needs to perform access for early data transmission.

S1308: The core network element (for example, the AMF/MME) sends a context resume response message to the base station. In this case, a dedicated channel between the base station and a core network user plane node (for example, an SMF or an S-GW) is resumed.

S1309: The base station receives the downlink data, and sends an RRC connection release message to the terminal device, where the RRC connection release message carries the downlink data.

S1310: The terminal device sends a downlink data feedback to the base station. For example, if the terminal device correctly receives the downlink data, the downlink data feedback is an ACK; otherwise, the downlink data feedback is a NACK.

It can be learned from above that, in this embodiment of this application, the terminal device may send the paging response by using the PUSCH resource in the preconfigured two-step RACH resource. Compared with the method in FIG. 7 in which after the terminal device sends the preamble, the base station allocates, to the terminal device, the PUSCH resource used to send the paging response, this method can simplify a random access process, and reduce a downlink data latency.

Figure 13:
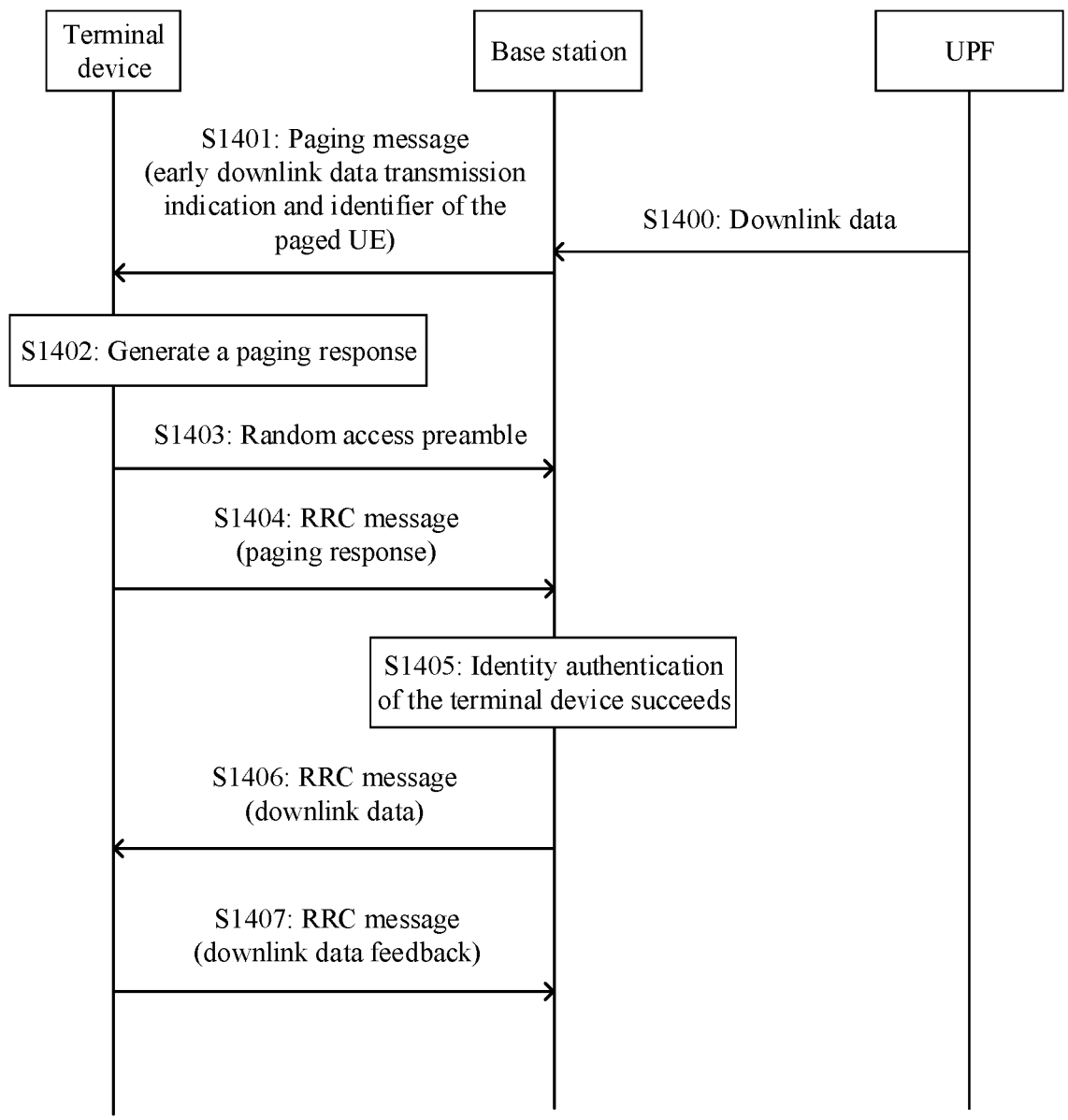
FIG. 13 is a schematic diagram of carrying early transmitted downlink data by using a user plane according to an embodiment of this application.

As shown in FIG. 13, a procedure of a communication method is provided. The procedure is specifically an example of transmitting the paging response by using a user plane bearer in the foregoing solution 2. In the procedure, early downlink data transmission of a terminal device in an inactive state is used as an example for description. In the procedure, the terminal device may correspond to the terminal device in FIG. 8, a base station may correspond to the access network device in FIG. 8, a UPF may be a network element in a core network device, and a two-step RACH resource may correspond to the random access configuration in the foregoing solution 2. The procedure includes the following steps.

S1400: The UPF sends downlink data to the base station.

S1401: The base station sends a paging message to the terminal device, where the paging message carries an early downlink data transmission indication and an identifier of the paged terminal device, and the identifier of the paged terminal device may be an identifier allocated to the terminal device by the base station, for example, a Resume ID or an I-RNTI.

S1402: When the paged terminal device finds that the paging message carries the identifier of the paged terminal device and that the paging message includes the early downlink data transmission indication, the terminal device generates a response message. The response message includes identity authentication information of the terminal device, and the identity authentication information of the terminal device is generated based on one or more of the following parameters: an access stratum key of the terminal device, a physical cell identifier of a source cell, a cell identifier of a target cell, and a source C-RNTI.

S1403: The terminal device sends a preamble to the base station. Specifically, the terminal device may obtain the preamble and time-frequency domain resources of the preamble from the two-step RACH resource, and then send the preamble to the base station by using the time-frequency domain resources of the preamble.

S1404: The terminal device sends an RRC message to the base station by using the two-step RACH resource, where the RRC message may be an RRC resume request message, and the RRC message carries a paging response. Specifically, the terminal device may send, to the terminal device by using a PUSCH resource in the two-step RACH configuration, the paging response or the RRC message carrying the paging response.

S1405: The base station performs identity authentication on the terminal device, and performs S1405 after the authentication succeeds.

S1406: The base station sends the RRC message to the terminal device, where the RRC message carries the downlink data, and the RRC message may be an RRC connection release message.

S1407: The terminal device sends an RRC message to the base station, where the RRC message includes a downlink data feedback. For example, if the terminal device correctly receives the downlink data, the downlink data feedback is an ACK; otherwise, the downlink data feedback is a NACK.

It can be learned from above that, in this embodiment of this application, the terminal device may send the paging response by using the PUSCH resource in the preconfigured two-step RACH resource. Compared with the method in FIG. 7 in which after the terminal device sends the preamble, the base station allocates, to the terminal device, the PUSCH resource used to send the paging response, this method can simplify a random access process, and reduce a downlink data latency.

Figure 23:
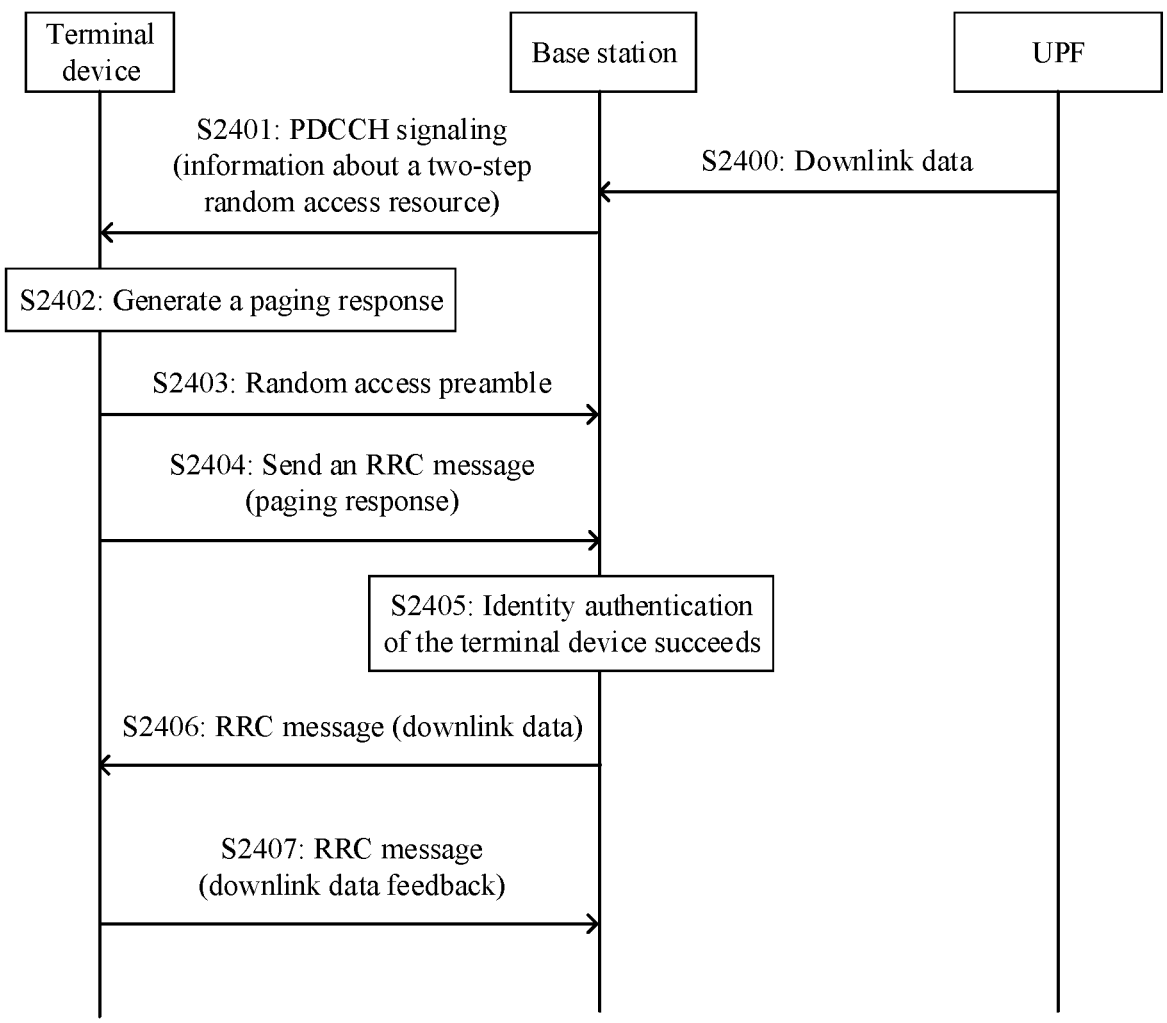
FIG. 23 is a schematic diagram of carrying early transmitted downlink data by using a user plane according to an embodiment of this application.

As shown in FIG. 23, a procedure of a communication method is provided. The procedure is specifically an example of transmitting the response by using the PUSCH in the foregoing solution 2. In the procedure, early downlink data transmission of a terminal device in an inactive state is used as an example for description. In the procedure, the terminal device may correspond to the terminal device in FIG. 8, a base station may correspond to the access network device in FIG. 8, a UPF may be a network element in a core network device, and a two-step RACH resource may correspond to the random access configuration in the foregoing solution 2. The procedure includes the following steps.

S2400: The UPF sends downlink data to the base station.

S2401: The base station sends PDCCH signaling to the terminal device, to indicate information about a two-step random access resource. A PDCCH is scrambled by using an identifier of the terminal device, and the identifier of the terminal device may be an identifier allocated to the terminal device by the base station, for example, a Resume ID, an I-RNTI, a C-RNTI, or an X-RNTI. The indication information of the two-step random access resource may be a configuration ID or a preamble identifier of the two-step random access resource. The X-RNTI may be a C-RNTI, or may be a newly defined RNTI. The X-RNTI may be a terminal identifier similar to the C-RNTI, and is used to scramble the PDCCH in the inactive state. A length of the X-RNTI may be the same as a length of the C-RNTI. The X-RNTI may be a dedicated identifier of the UE.

S2402: The scheduled terminal device generates a response message, where the response message includes identity authentication information of the terminal device, and the identity authentication information of the terminal device is generated based on one or more of the following parameters: an access stratum key of the terminal device, a physical cell identifier of a source cell, a cell identifier of a target cell, and a source C-RNTI.

S2403: The terminal device sends a preamble to the base station. Specifically, the terminal device may obtain the preamble and time-frequency domain resources of the preamble from the two-step RACH resource, and then send the preamble to the base station by using the time-frequency domain resources of the preamble.

S2404: The terminal device sends an RRC message to the base station by using the two-step RACH resource, where the RRC message may be an RRC resume request message, and the RRC message carries a paging response. Specifically, the terminal device may send, to the terminal device by using a PUSCH resource in the two-step RACH configuration, the paging response or the RRC message carrying the paging response.

S2405: The base station performs identity authentication on the terminal device, and performs S2406 after the authentication succeeds.

S2406: The base station sends the RRC message to the terminal device, where the RRC message carries the downlink data, and the RRC message may be an RRC connection release message.

S2407: The terminal device sends an RRC message to the base station, where the RRC message includes a downlink data feedback. For example, if the terminal device correctly receives the downlink data, the downlink data feedback is an ACK; otherwise, the downlink data feedback is a NACK.

It can be learned from above that, in this embodiment of this application, the terminal device may send a response of the terminal device by using the PUSCH resource in the preconfigured two-step RACH resource. Compared with the method in FIG. 8 in which after the terminal device sends the preamble, the base station allocates, to the terminal device, the PUSCH resource used to send the response, this method can simplify a random access process, and reduce a downlink data latency.

It can be learned from above that, in this embodiment of this application, the terminal device may send the response by using the PUSCH resource in the preconfigured two-step RACH resource. Compared with the method in FIG. 8 in which after the terminal device sends the preamble, the base station allocates, to the terminal device, the PUSCH resource used to send the response, this method can simplify a random access process, and reduce a downlink data latency.

Optionally, the procedure shown in FIG. 8 may further include: The access network device sends the downlink data to the terminal device. Alternatively, this may be described as follows: The access network device sends a random access preamble response to the terminal device, where the random access preamble response carries the downlink data. Correspondingly, the terminal device receives the downlink data from the access network device. Alternatively, this may be described as follows: The terminal device receives the random access preamble response from the access network device. Specifically, the downlink data may be transmitted by using a media access control protocol data unit (MAC PDU). The MAC PDU includes one or more MAC subPDUs. Some MAC subPDUs each include two parts: a MAC subheader and a payload. Some MAC subPDUs each may include only a MAC subheader.

Figure 14:
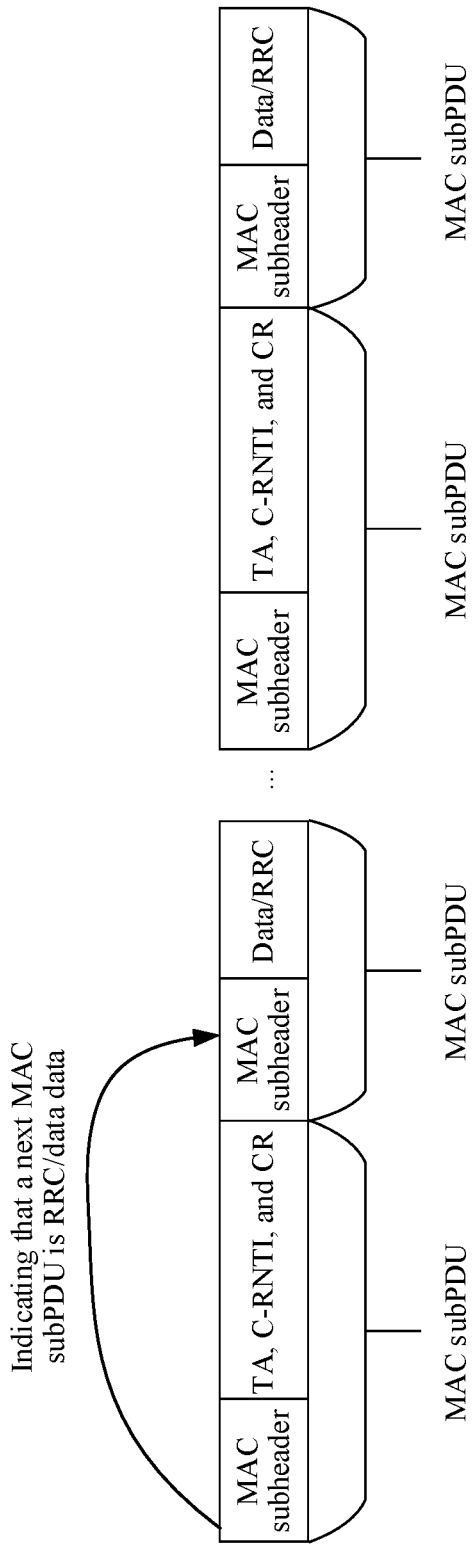
FIG. 14 is a schematic diagram of a MAC subPDU according to an embodiment of this application.

In an example, there may be two types of MAC subPDUs based on different content carried in payloads. As shown in FIG. 14, a payload part of a first-type MAC subPDU includes a TA command, a C-RNTI, and terminal device contention resolution (CR) information.

A payload part of a second-type MAC subPDU includes an RRC connection release message, data, or the like. Further, still refer to FIG. 14. A MAC subheader part of the first-type MAC subPDU may indicate that the payload part of the second-type MAC sub-PDCH carries the RRC, the data, or the like.

Figure 15:
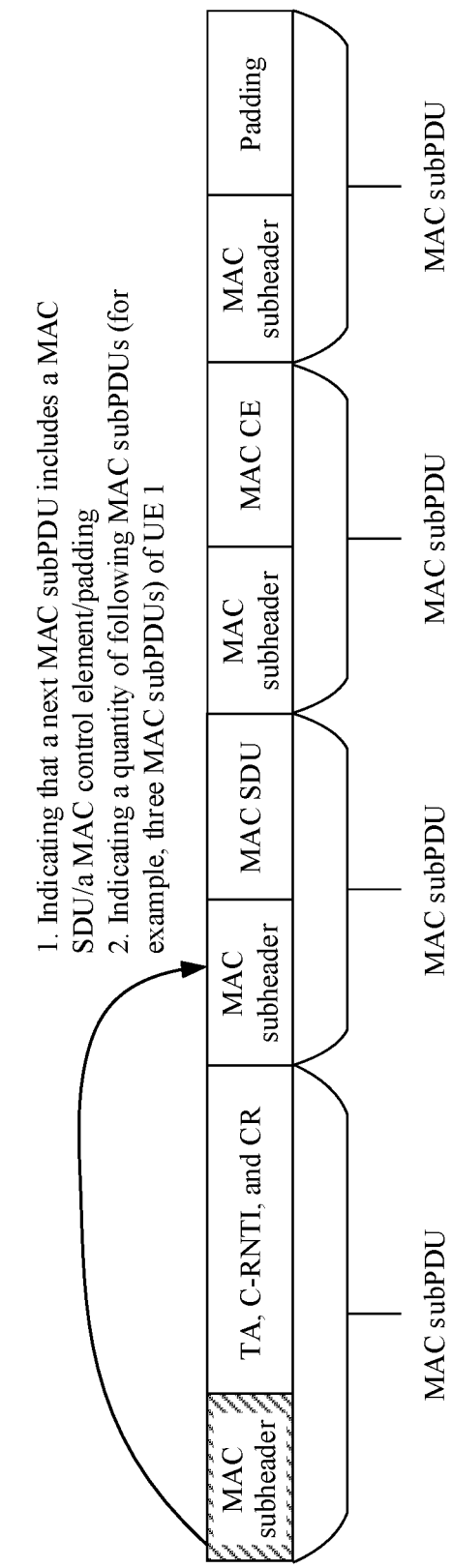
FIG. 15 is another schematic diagram of a MAC subPDU according to an embodiment of this application.

In another example, there may be four types of MAC subPDUs based on different content carried in payloads. As shown in FIG. 15, a payload part of a first-type MAC subPDU may include a TA, a C-RNTI, and CR information. A payload part of a second-type MAC subPDU may include a MAC service data unit (SDU). A payload part of a third-type MAC subPDU may include a MAC control element (CE). A payload part of a fourth-type MAC subPDU may include padding. Still refer to FIG. 15. A MAC subheader part of the first-type MAC subPDU may include at least one piece of the following indication information, where for the MAC subheader part of the first-type MAC sub-PDCU, refer to a part filled with slashes in FIG. 15:

indication information indicating that a payload part of a next MAC subPDU adjacent to the first-type MAC subPDU includes a MAC SDU, a MAC CE, or padding; and indication information indicating that a MAC SDU of a next MAC subPDU adjacent to the first-type MAC subPDU carries data or RRC signaling.

Assuming that the first-type MAC subPDU is sent to a terminal device 1, a MAC subheader part of the first-type MAC subPDU may further indicate a quantity of MAC subPDUs following the first-type MAC subPDU that are sent to the terminal device 1, and may indicate the quantity being 0.

Figure 16A:
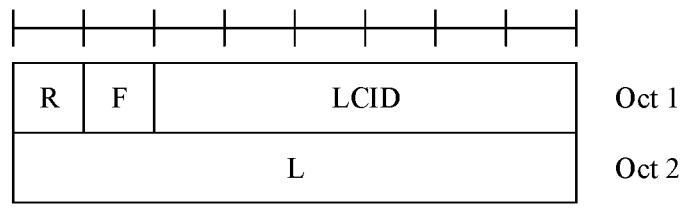
FIG. 16A, FIG. 16B, and FIG. 16C are schematic diagrams of MAC subheader formats according to an embodiment of this application.
Figure 16B:
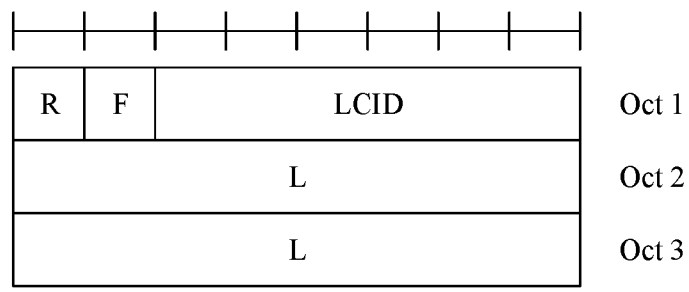
Figure 16C:
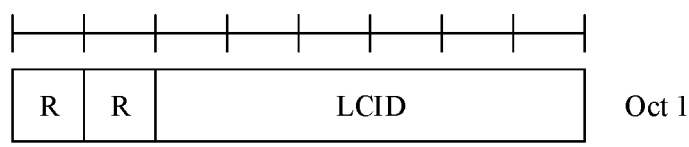

As shown in FIG. 16A to FIG. 16C, three MAC subheader formats of the second-type MAC subPDU are provided. In the format of each MAC subheader, an R field is a reserved field, and a value of the R field is 0. An F field is used to indicate whether an L field exists, and the L field may be used to indicate a length of a payload. A logical channel identifier (LC ID) may determine whether the payload of the MAC subPDU is a MAC SDU, a MAC CE, padding, or the like.

An embodiment of this application further provides an unlicensed channel access method. For ease of understanding, current unlicensed channel access is first described.

In an unlicensed scenario, each communication device (for example, a terminal device or a network device) may contend for using a resource on an unlicensed frequency band by using a listen before talk (LBT) (or referred to as a detection before sending) mechanism.

The LBT is usually performed at a granularity of a channel (for example, 20 MHz). Before sending a signal (for example, a data signal) on a channel (for example, denoted as a first channel), the communication device may first detect whether the first channel is idle. For example, the communication device detects whether a nearby communication device is occupying the first channel to send a signal. The detection process may be referred to as a clear channel assessment (CCA) process or a channel access process. Currently, the following two detection processes are supported:

A first channel access type may also be referred to as a first channel access process or a rollback-based channel access process. Specifically, the communication device may perform the foregoing LBT on the unlicensed channel, and may use the unlicensed channel for a period of time only after detecting that the unlicensed channel is idle. The time is referred to as channel occupancy time (COT). This process is also referred to as an LBT type 4. Alternatively, the communication device may perform the LBT on the unlicensed channel, randomly select a value A from a contention window, and determine, only after detecting at least A idle slots, that the channel access process is completed. An idle slot refers to a slot in which a capability energy of energy detection is lower than a specific threshold.

A second channel access type may also be referred to as a second channel access process. A terminal can use COT only when a network device shares the COT with the terminal device. This process is also referred to as an LBT type 2. The second channel access process: Detection is performed for fixed duration, and if an energy is lower than a threshold, it is considered that the channel is idle.

The base station performs the first channel access process, and sends a paging only after the channel access process is completed. The terminal device performs the first channel access process after receiving the paging message, and sends a random access preamble only after the channel access process is completed.

Based on the foregoing descriptions, an unlicensed channel access method and an apparatus are provided. A principle of the method is that: When a base station sends a paging message to a terminal device, the paging message may indicate unlicensed channel access. For example, the paging message indicates the terminal device to perform unlicensed channel access of a first channel access type, or the paging message indicates the terminal device to perform unlicensed channel access of a second channel access type. Compared with the foregoing solution in which the terminal device performs, after receiving the paging message, the unlicensed channel access by using only the first channel access type, this solution enables the terminal device to flexibly perform unlicensed channel execution. In addition, because channel access duration of the second channel access type is usually less than channel access duration of the first channel access type, channel access duration of the terminal device can be reduced by using the method in this application.

Figure 17:
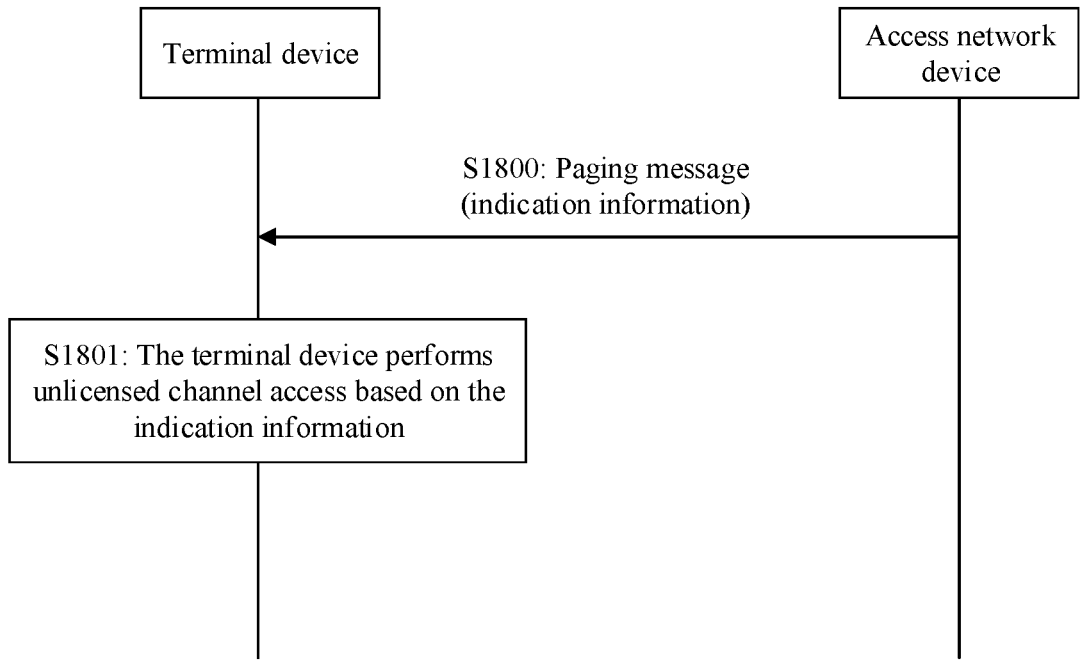
FIG. 17 is a schematic diagram of an unlicensed channel access method according to an embodiment of this application.

As shown in FIG. 17, a procedure of an unlicensed channel access method is provided. An access network device in the procedure may be the RAN 110 in FIG. 1, and the access network device may use the network architecture shown in FIG. 2 or FIG. 3. A terminal device may be the terminal device 130 in FIG. 1. The procedure includes the following steps.

S1800: The access network device sends a paging message to the terminal device, where the paging message carries indication information. Correspondingly, the access network device receives the paging message from the terminal device. Optionally, the paging message may be replaced with PDCCH signaling, for example, a PDCCH scrambled by using an X-RNTI. The X-RNTI may be a C-RNTI, or may be a newly defined RNTI. The X-RNTI may be a terminal identifier similar to the C-RNTI, and is used to scramble the PDCCH in an inactive state. A length of the X-RNTI may be the same as a length of the C-RNTI. The X-RNTI may be a dedicated identifier of the UE.

S1801: The terminal device performs unlicensed channel access based on the indication information.

For example, the indication information may indicate an unlicensed channel access type. For example, when the indication information indicates a first channel access type, the terminal device may perform unlicensed channel access of the first channel access type. When the indication information indicates a second channel access type, the terminal device may perform unlicensed channel access of the second channel access type. Alternatively, the indication information may indicate occupiable duration of an unlicensed channel. When the occupiable duration of the unlicensed channel is greater than or equal to first duration, the terminal device performs unlicensed channel access of the second channel access type; when the occupiable duration of the unlicensed channel is less than the first duration, the terminal device performs unlicensed channel access of the first channel access type.

In the foregoing embodiment, when the occupiable duration of the unlicensed channel is equal to the first duration, the terminal device performs unlicensed channel access of the second channel access type. In another embodiment, when the occupiable duration of the unlicensed channel is equal to the first duration, the terminal device performs unlicensed channel access of the first channel access type.

The terminal device in the procedure in FIG. 17 may be in an RRC idle state, the inactive state, or even an RRC connected state or the like. This is not limited.

Optionally, the procedure in FIG. 17 may further include: The access network device determines the occupiable duration of the unlicensed channel. In addition, the access network device determines indication information in the paging message based on the occupiable duration of the unlicensed channel. For example, when the occupiable duration of the unlicensed channel is greater than or equal to second duration, the access network device may determine that the indication information is used to indicate the second channel access type. Otherwise, the access network device may determine that the indication information is used to indicate the first channel access type. Alternatively, the indication information may directly indicate the occupiable duration of the unlicensed channel.

In the foregoing embodiment, when the occupiable duration of the unlicensed channel is equal to the second duration, the indication information is used to indicate the second channel access type. In another embodiment, when the occupiable duration of the unlicensed channel is equal to the second duration, the indication information is used to indicate the first channel access type.

In addition, the terms "first" and "second" in the first duration and the second duration are merely for ease of distinguishing and description, and do not limit the duration. Specifically, the first duration may be equal to or may be different from the second duration. In addition, when separate descriptions are provided from an access network device side and a terminal device side, the first duration and the second duration may be both referred to as duration.

Figure 18:
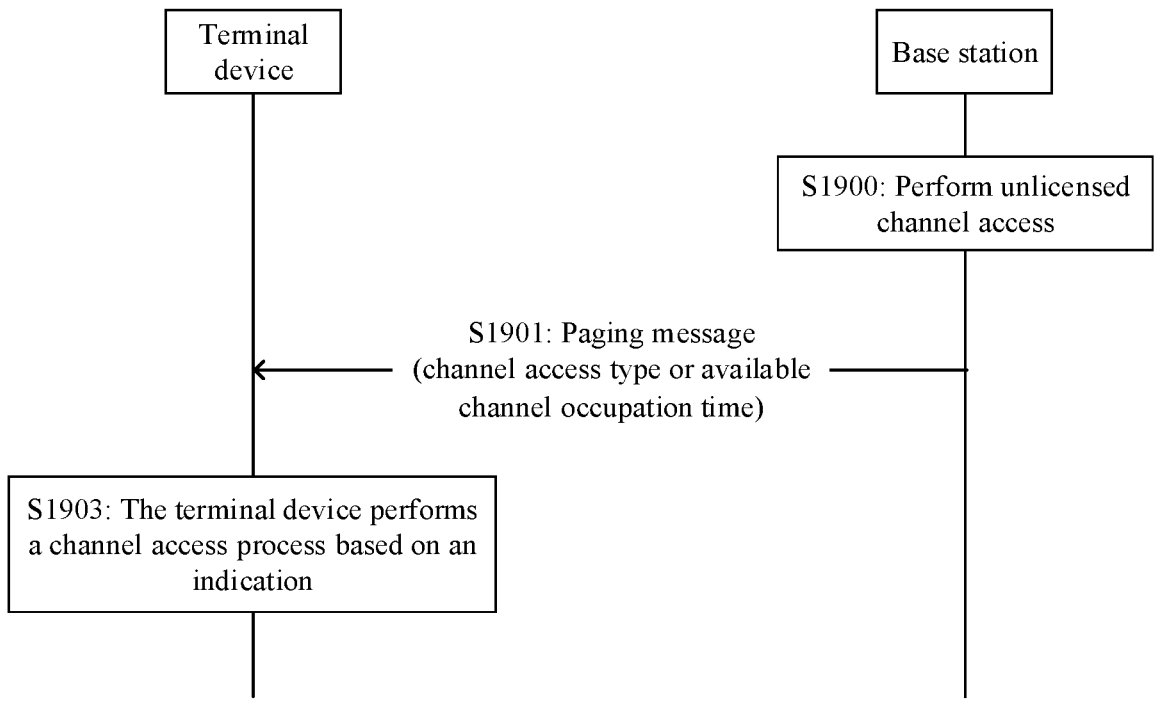
FIG. 18 is another schematic diagram of an unlicensed channel access method according to an embodiment of this application.

As shown in FIG. 18, a procedure of an unlicensed channel access method is provided. The procedure may be a specific example of the procedure in FIG. 17. A base station in the procedure may correspond to the access network device in the procedure shown in FIG. 17, and a terminal device may correspond to the terminal device in the procedure shown in FIG. 17. The procedure includes the following steps.

S1900: The base station performs unlicensed channel access.

S1901: The base station sends a paging message to the terminal device, where the paging message carries indication information of a channel access type or channel occupation time. Optionally, the paging message may be replaced with PDCCH signaling,

S1903: The terminal device performs a channel access process based on the indication. Optionally, the terminal device may be in an idle state, an inactive state, or the like. This is not limited.

Specifically, in an unlicensed scenario, the base station may first perform the channel access process. After the channel access process is completed, if remaining effective channel occupancy time is long, the base station may indicate the terminal device to perform access by using a second channel access process type. If remaining effective channel occupancy time is short or not long, the base station may indicate the terminal device to perform access by using a first channel access process type. Alternatively, after completing the channel access process, the base station may directly notify the terminal device of the remaining effective channel occupancy time. Correspondingly, the terminal device may determine, based on the time, whether to perform the access process by using the first channel access process or the second channel access process. For example, if the time is less than a predefined threshold, the first channel access process is performed. Alternatively, if the time is less than a predefined threshold, the second channel access process is performed. Alternatively, the terminal device may directly perform an uplink sending operation without performing channel access in the remaining effective channel occupancy time. For example, the terminal device may send a paging response to the network device. It may be understood that, in addition to sending the foregoing indication by using the paging message, that is, including the indication in the paging message, the terminal device may further send the indication by using a PDCCH, that is, include the indication in the PDCCH.

Further, if the base station indicates the channel access type of the terminal device by using the indication information, the following two representation manners may be used: A bit value is used to indicate the first channel access process type or the second channel access process type. For example, 0 is used to indicate the first channel access process type, and 1 is used to indicate the second channel access process type. Alternatively, enumerated values of the two types are used to indicate the first channel access process type and the second channel access process type. For example, a first value is used to indicate the first channel access process type, and a second value is used to indicate the second channel access process type. It should be noted that if the second channel access process type is indicated, the terminal device may perform channel access in the second channel access process. In this case, channel detection of the terminal device is performed for fixed duration, and if an energy is lower than a threshold, it is considered that a channel is idle.

In this embodiment of this application, the base station indicates, in the paging message or the downlink PDCCH, a channel access process to be used by the terminal device, so that the terminal device has an opportunity to perform the second channel access process. This reduces a latency of the channel access process, and the paging response is sent earlier, to further implement early downlink data transmission.

An embodiment of this application further provides an application scenario: When a terminal device in an inactive state sends uplink data (for example, a paging response) by using a preconfigured PUSCH resource, if the terminal device does not pre-establish a configured downlink beam pair relationship with an access network device, and there are a plurality of synchronization signal blocks (SSBs) in a cell, the terminal device cannot determine an SSB on which a PDCCH used to send a response (that is, downlink data) to the uplink data is received.

In view of this, two solutions are provided. Solution 1: A many-to-one or one-to-one correspondence between a PUSCH resource and an SSB is configured. After determining, based on the mapping relationship, to send the uplink data on a PUSCH resource, the terminal device monitors a PDCCH on an SSB corresponding to the PUSCH resource.

Solution 2: There is no correspondence between a PUSCH resource and an SSB. After selecting a downlink SSB, the terminal device indicates an identifier of the selected SSB when sending data on a PUSCH resource, and then monitors a PDCCH on the SSB.

Figure 19:
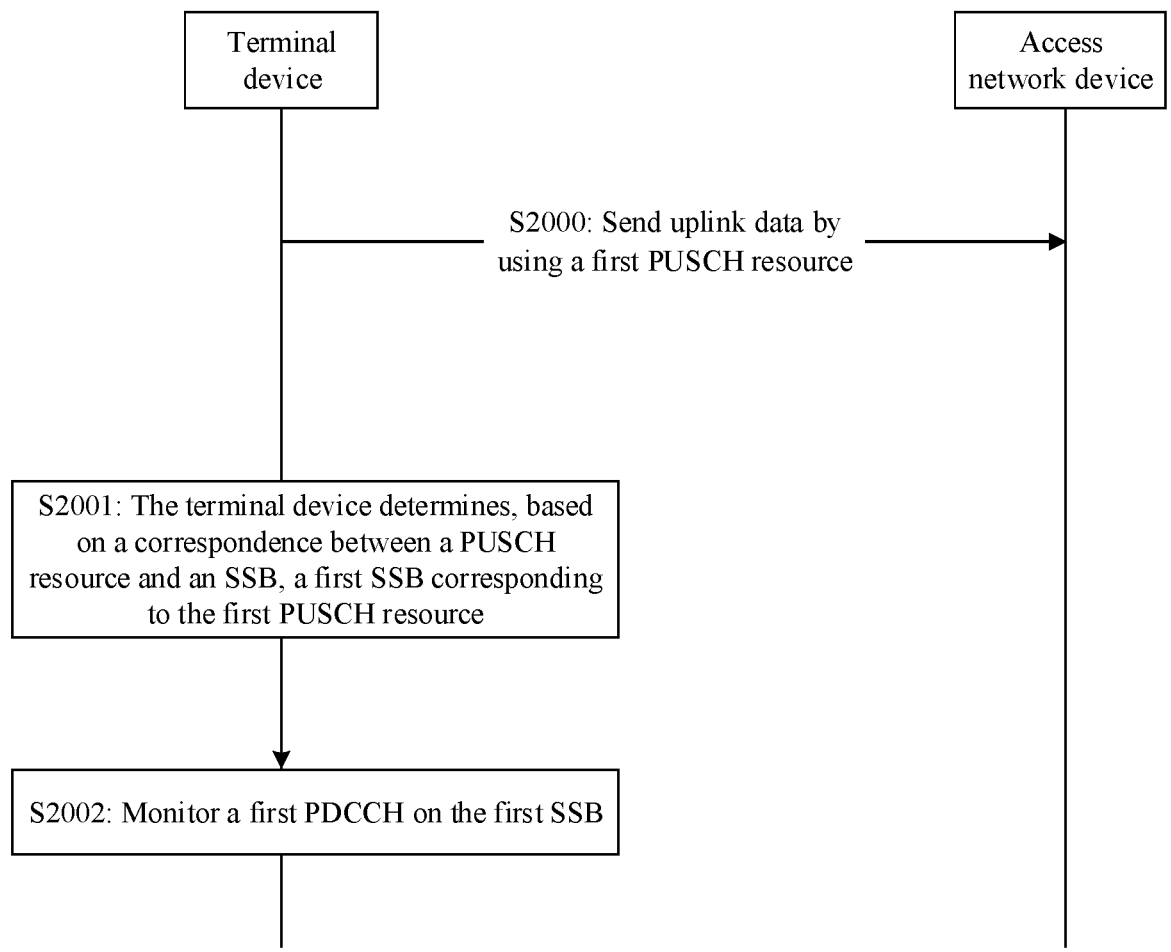
FIG. 19 is a schematic diagram of a communication method according to an embodiment of this application.

For the foregoing solution 1, as shown in FIG. 19, a flowchart of a communication method is provided. An access network device in the flowchart may be the RAN 110 in FIG. 1, and the access network device may use the network architecture shown in FIG. 2 or FIG. 3. A terminal device may be the terminal device 130 in FIG. 1. The procedure includes the following steps.

S2000: The terminal device sends uplink data to the access network device by using a first PUSCH resource. Correspondingly, the access network device receives the uplink data from the terminal device by using the first PUSCH resource.

S2001: The terminal device determines, based on a correspondence between a PUSCH resource and an SSB, a first SSB corresponding to the first PUSCH resource.

For example, the correspondence between the PUSCH resource and the SSB may be preconfigured. The access network device may send configuration information to the terminal device. The correspondence between the PUSCH resource and the SSB may be configured based on the configuration information. Correspondingly, the terminal device may receive the configuration information from the access network device.

A PUSCH time domain resource, a PUSCH frequency domain resource, DMRS information, or the like included in a preconfigured PUSCH resource may have a mapping relationship with the SSB. This is not limited.

The terminal device may configure a correspondence between the first PUSCH resource and an SSB ID by using an RRC dedicated message or a broadcast message.

S2002: The terminal device monitors a PDCCH on the first SSB.

Figure 20:
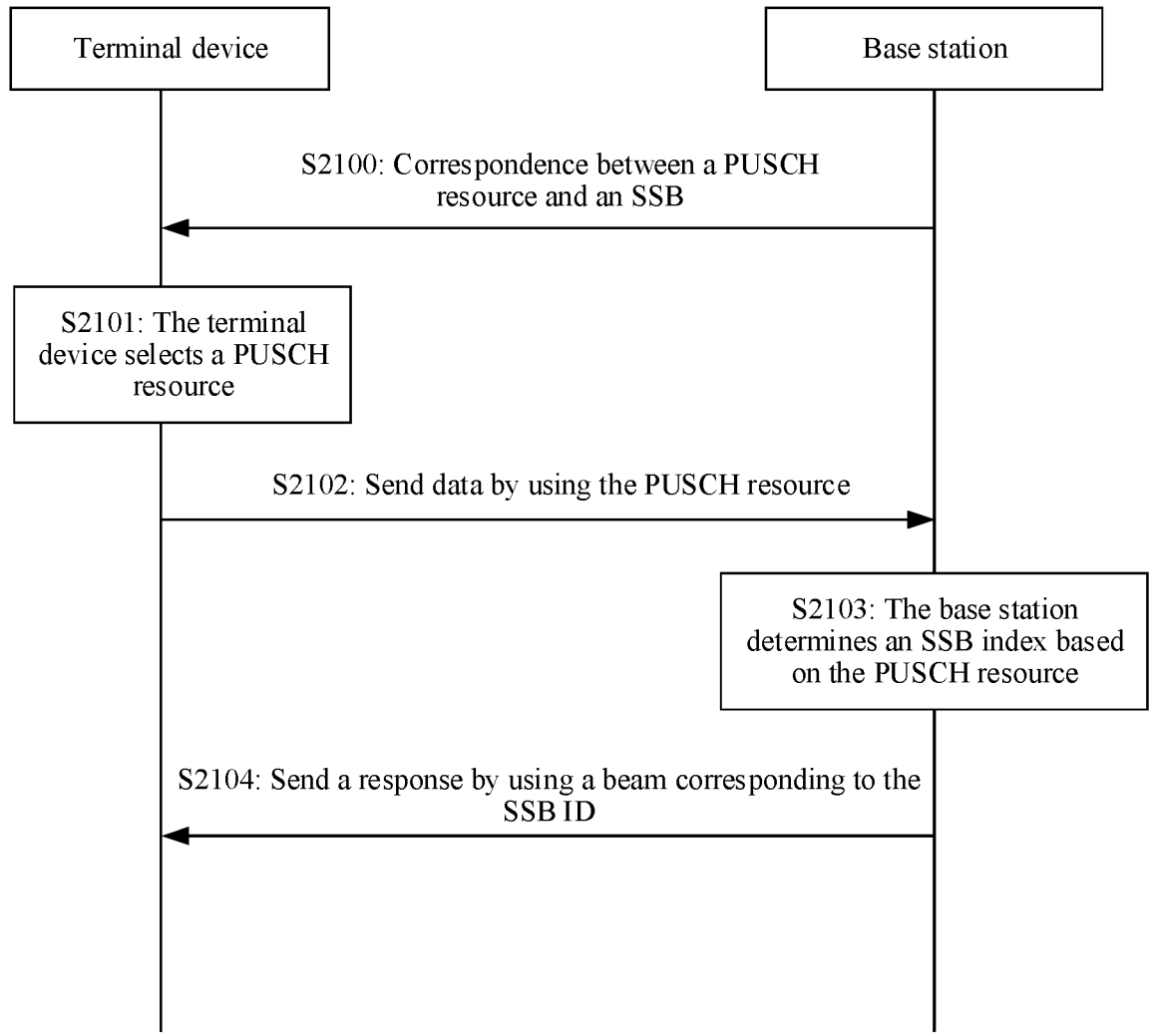
FIG. 20 is a schematic diagram of a communication method according to an embodiment of this application.

Optionally, the terminal device in the procedure in FIG. 20 may be in an RRC idle state, an inactive state, or even an RRC connected state or the like. This is not limited.

In this embodiment of this application, the terminal device may preconfigure the correspondence between the PUSCH resource and the SSB, monitor the PDCCH, and receive downlink data.

As shown in FIG. 20, a procedure of a communication method is provided. The procedure may be an example of the procedure shown in FIG. 19. In the procedure, a terminal device may be the terminal device in FIG. 19, and a base station may be the access network device in FIG. 19. The procedure includes the following steps.

S2100: The terminal device receives a preconfigured mapping relationship between a PUSCH resource and an SSB from broadcast information.

A PUSCH time domain resource, a PUSCH frequency domain resource, DMRS information, or the like included in the preconfigured PUSCH resource may have a mapping relationship with the SSB. This is not limited.

S2101: When uplink data of the terminal device arrives, the terminal device selects a resource from a PUSCH resource list in a broadcast message.

For example, the terminal device may select an SSB that is in an SSB set satisfying a first threshold and that has a preconfigured PUSCH resource. Alternatively, the terminal device selects an SSB that is in an SSB set satisfying a second threshold (a first threshold) and that has a preconfigured PUSCH resource. Alternatively, the terminal device selects an SSB that has a highest RSRP in an SSB set satisfying a first threshold and that has a preconfigured PUSCH resource.

S2102: The terminal device sends data by using the selected preconfigured PUSCH resource. The base station determines, based on the time domain resource, the frequency domain resource, or the DMRS information of the preconfigured PUSCH, the SSB selected by the terminal device.

After sending the data, the terminal device starts a timer, and monitors, within the timer, a PDCCH of an SSB corresponding to the PUSCH resource.

S2103: The base station detects that the terminal device sends the data on the PUSCH resource, and determines a corresponding SSB index based on the correspondence between the PUSCH resource and the SSB or based on a correspondence between an RRC dedicated message and the SSB.

S2104: The base station sends the PDCCH in a PDCCH search space corresponding to the SSB. Optionally, the base station may indicate a PDSCH resource on the PDCCH, and send response information on the PDSCH resource. The base station may indicate ACK or NACK information on the PDCCH.

Figure 21:
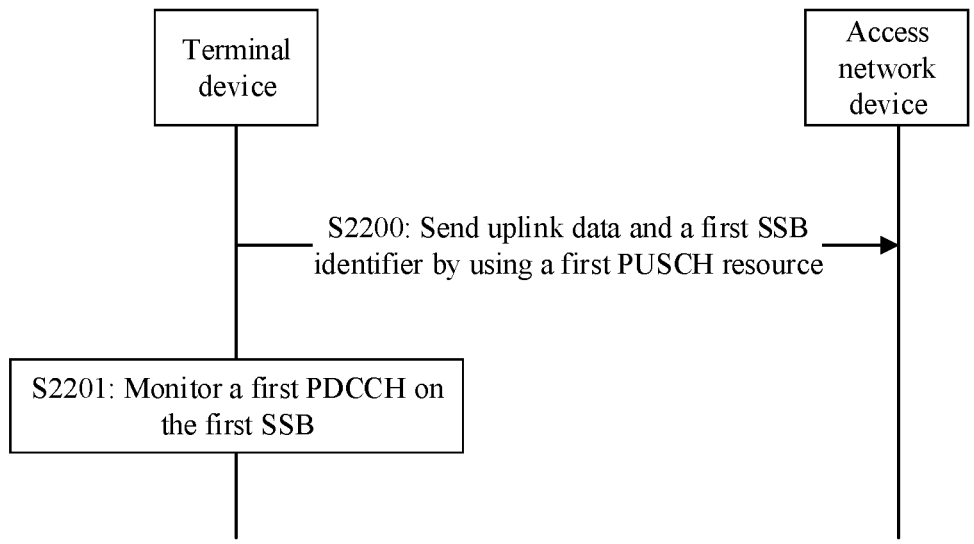
FIG. 21 is a schematic diagram of a communication method according to an embodiment of this application.

For the foregoing solution 1, as shown in FIG. 21, a flowchart of a communication method is provided. An access network device in the flowchart may be the RAN 110 in FIG. 1, and the access network device may use the network architecture shown in FIG. 2 or FIG. 3. A terminal device may be the terminal device 130 in FIG. 1. The procedure includes the following steps.

S2200: The terminal device sends uplink data and a first SSB identifier to the access network device by using a first PUSCH resource. Correspondingly, the access network device receives the uplink data and the first SSB identifier from the terminal device.

S2201: The terminal device monitors the PDCCH on the first SSB.

Optionally, before S2200, the procedure may further include: The access network device sends indication information to the terminal device, where the indication information is used to indicate that the terminal device needs to report the SSB ID. After receiving the indication information, the terminal device performs S2200.

Figure 22:
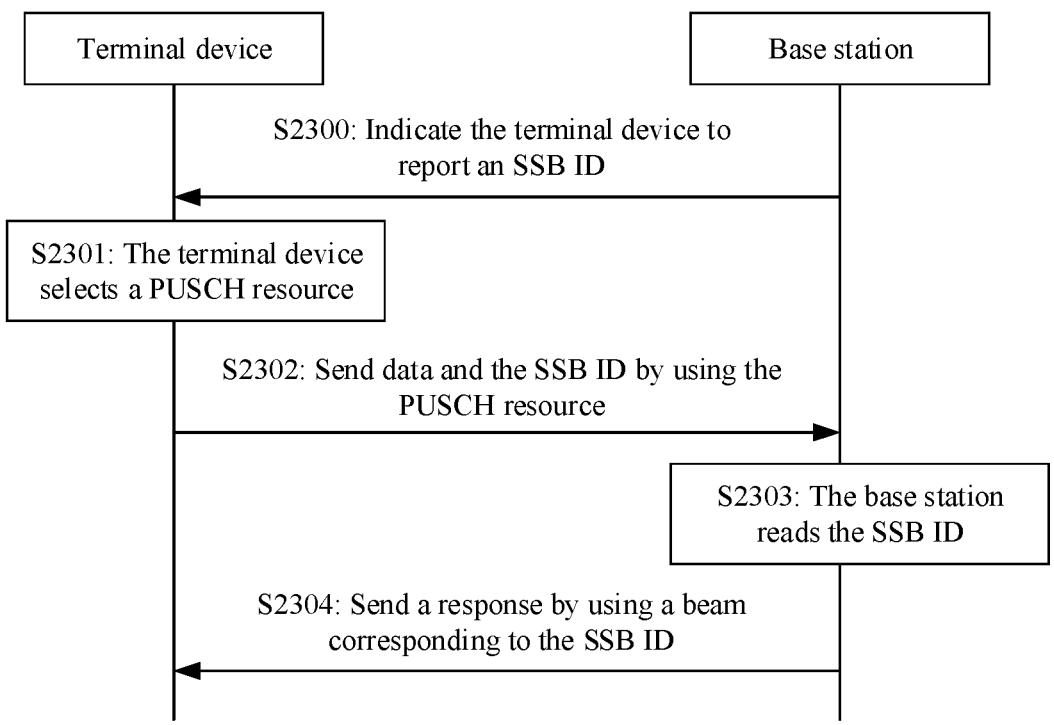
FIG. 22 is a schematic diagram of a communication method according to an embodiment of this application.

As shown in FIG. 22, a procedure of a communication method is provided. The procedure may be an example of the procedure shown in FIG. 21. In the procedure, a terminal device may be the terminal device in FIG. 21, and a base station may be the access network device in FIG. 21. The procedure includes the following steps.

S2300: The terminal device receives indication information from broadcast information, where the indication information is used to indicate the terminal device in an inactive state to report the SSB ID when transmitting data by using the preconfigured PUSCH resource. After sending the data on the PUSCH resource, the terminal device determines an SSB in which a PDCCH needs to be monitored. If a network does not indicate the terminal device to report the SSB ID, the terminal device receives feedback by using an SSB (for example, an SSB 1) predefined in a protocol.

S2301: When uplink data of the terminal device arrives, the terminal device selects a PUSCH resource.

Specifically, the terminal device selects an SSB that is in an SSB set satisfying a first threshold and that has a preconfigured PUSCH resource. Alternatively, the terminal device selects an SSB that is in an SSB set satisfying a second threshold (a first threshold) and that has a preconfigured PUSCH resource. Alternatively, the terminal device selects an SSB that has a highest RSRP in an SSB set satisfying a first threshold and that has a preconfigured PUSCH resource.

The first threshold and the second threshold may be configured by the network for the terminal device, or may be agreed on in the protocol.

S2302: The terminal device sends data and the SSB ID by using the selected PUSCH resource.

For example, the SSB ID is indicated in an RRC resume Req st/MAC CE/UCI part in PUSCH data/PUCCH.

After sending the data, the terminal device starts a timer, and monitors, within the timer, a PDCCH of the SSB.

S2303: The base station reads the SSB ID.

S2304: The base station detects that the terminal device sends the data on the PUSCH resource, determines a corresponding SSB, and sends the PDCCH in a PDCCH search space corresponding to the SSB. Optionally, the base station may indicate the PDSCH resource on the PDCCH, and send response information on the PDSCH resource. The base station may indicate ACK or NACK information on the PDCCH.

It can be learned from above that, when sending the data on the preconfigured PUSCH, the terminal device maps or explicitly indicates the SSB ID, and monitors the PDCCH of the SSB, to help the network determine a proper PDCCH of an SSB on which a scheduling response is to be sent to the terminal device.

The foregoing mainly describes the solutions provided in embodiments of this application from a perspective of the communication apparatus. It may be understood that, to implement the foregoing functions, the communication apparatus may include corresponding hardware structures and/or software modules for performing the functions. A person skilled in the art should be easily aware that, in combination with units and algorithm steps of the examples described in the embodiments disclosed in this specification, the embodiments of this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

An embodiment of this application further provides an apparatus configured to implement any one of the foregoing methods. For example, an apparatus is provided, and includes units (or means) configured to implement the steps performed by the terminal device in any one of the foregoing methods. For another example, another apparatus is further provided, and includes units (or means) configured to implement the steps performed by the access network device in any one of the foregoing methods.

The method provided in embodiments of this application is described above in detail with reference to FIG. 4 and FIG. 23. An apparatus provided in embodiments of this application is described below in detail with reference to FIG. 24 to FIG. 27. It should be understood that the descriptions of the apparatus embodiments correspond to the descriptions of the method embodiments. Therefore, for content that is not described in detail, refer to the descriptions in the foregoing method embodiments.

Figure 24:
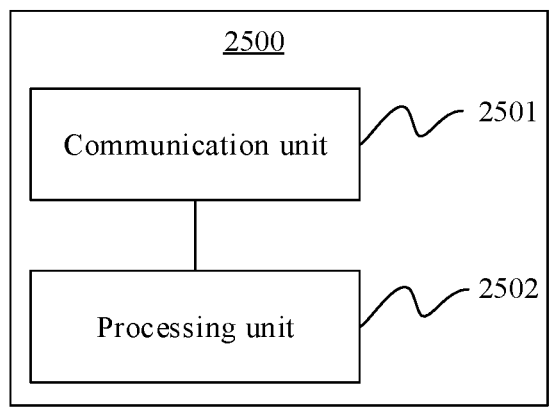
FIG. 24 is a schematic diagram of a structure of an apparatus according to an embodiment of this application.

FIG. 24 is a schematic block diagram of an apparatus 2500 according to an embodiment of this application, and the apparatus 2500 is configured to perform the functions of the access network device or the terminal device in the foregoing method. For example, the apparatus may be a software module or a chip system. The chip system may include a chip, or may include a chip and another discrete device. The apparatus 2500 includes a communication unit 2501, and may further include a processing unit 2502. The communication unit 2501 may communicate with the outside. The processing unit 2502 is configured to perform processing, for example, control the communication unit 2501 to receive a paging message, or send a paging response. The communication unit 2501 may also be referred to as a communication interface, a transceiver unit, an input/output interface, or the like. For example, the communication unit 2501 may include a sending unit and/or a receiving unit, respectively configured to perform the sending or receiving steps of the terminal device or the access network device in the foregoing procedures in FIG. 5 to FIG. 24.

In an example, the apparatus 2500 may implement the steps performed by the terminal device in the foregoing procedure in FIG. 8, and the apparatus 2500 may be the terminal device, or a chip or a circuit configured in the terminal device. The communication unit 2501 is configured to perform sending/receiving-related operations on the terminal device side in the foregoing method embodiments, and the processing unit 2502 is configured to perform processing-related operations on the terminal device side in the foregoing method embodiments.

For example, the communication unit 2501 is configured to: receive a paging message from the access network device, and send a paging response to the access network device by using a first PUSCH resource. The processing unit 2502 is configured to: process the paging message, generate a paging response, or the like. The first PUSCH resource is preconfigured, or the first PUSCH resource is determined based on the paging message, or the first PUSCH resource is determined based on a preconfiguration and the paging message, the paging response carries an identifier and identity authentication information that are of the terminal device, and the identifier and the identity authentication information that are of the terminal device are used for identity authentication of the terminal device.

Optionally, the first PUSCH resource is preconfigured. The communication unit 2501 is further configured to receive first configuration information from the access network device, where the first configuration information is used to configure the first PUSCH resource. The processing unit 2502 is further configured to determine the first PUSCH resource based on the first configuration information.

Optionally, the first PUSCH resource is determined based on the paging message, and the paging message carries configuration information of the first PUSCH resource. The processing unit 2502 is further configured to determine the first PUSCH resource based on the configuration information of the first PUSCH resource carried in the paging message.

Optionally, the first PUSCH resource is determined based on a preconfiguration and the paging message. The communication unit 2501 is further configured to receive second configuration information from the access network device, where the second configuration information is used to configure at least one PUSCH resource. The processing unit 2502 is further configured to determine the first PUSCH resource based on the paging message.

Optionally, each of the at least one PUSCH resource corresponds to an index, and the paging message carries a first index. When determining the first PUSCH resource based on the paging message, the processing unit 2502 is specifically configured to: select the first PUSCH resource from the at least one PUSCH resource based on the first index, where the first PUSCH resource corresponds to the first index.

Optionally, each of the at least one PUSCH resource corresponds to an identifier of one terminal device, and the paging message carries an identifier of a paged terminal device. When determining the first PUSCH resource based on the paging message, the processing unit 2502 is specifically configured to: select the first PUSCH resource from the at least one PUSCH resource based on the identifier of the paged terminal device carried in the paging message, where the first PUSCH resource corresponds to the identifier of the paged terminal device.

Optionally, each of the at least one PUSCH resource corresponds to a random access preamble identifier, and the paging message carries a first random access preamble identifier. When determining the first PUSCH resource based on the paging message, the processing unit 2502 is specifically configured to: select the first PUSCH resource from the at least one PUSCH resource based on the first random access preamble identifier, where the first PUSCH resource corresponds to the first random access preamble identifier.

Optionally, the first PUSCH resource is determined based on the preconfiguration and the paging message. The communication unit 2501 is further configured to receive third configuration information from the access network device, where the third configuration information is used to configure a part of time-frequency domain resources in the first PUSCH resource, and the paging message carries a remaining part of the time-frequency domain resources in the first PUSCH resource. The processing unit 2502 is further configured to: determine the remaining part of the time-frequency domain resources in the first PUSCH resource based on the paging message, and determine the first PUSCH resource based on the part of the time-frequency domain resources in the first PUSCH resource and the remaining part of the time-frequency domain resources in the first PUSCH resource.

Optionally, the first PUSCH resource is preconfigured. The communication unit 2501 is further configured to receive fourth configuration information from the access network device, where the fourth configuration information is used to configure a random access preamble, time-frequency domain resources of the random access preamble, and the first PUSCH resource. The processing unit 2502 is further configured to determine the first PUSCH resource based on the fourth configuration information.

Optionally, the first PUSCH resource is determined based on the paging message, the paging message carries fifth configuration information, and the fifth configuration information is used to configure a random access preamble, time-frequency domain resources of the random access preamble, and the first PUSCH resource. The processing unit 2502 is further configured to determine the first PUSCH resource based on the fifth configuration information carried in the paging message.

Optionally, the first PUSCH resource is determined based on the preconfiguration and the paging message. The communication unit 2501 is further configured to receive sixth configuration information from the access network device, where the sixth configuration information is used to configure a random access preamble, time-frequency domain resources of the random access preamble, and a part of time-frequency domain resources in the first PUSCH resource, and the paging message carries a remaining part of the time-frequency domain resources in the first PUSCH resource. The processing unit 2502 is further configured to: determine the remaining part of the time-frequency domain resources in the first PUSCH resource based on the paging message, and determine the first PUSCH resource based on the part of the time-frequency domain resources in the first PUSCH resource and the remaining part of the time-frequency domain resources in the first PUSCH resource.

Optionally, the first PUSCH resource is determined based on the preconfiguration and the paging message. The communication unit 2501 is further configured to receive seventh configuration information from the access network device, where the seventh configuration information is used to configure at least one random access configuration, and each random access configuration includes a random access preamble, time-frequency domain resources of the random access preamble, and time-frequency domain resources of the PUSCH. The processing unit 2502 is further configured to: determine a first random access configuration from the at least one random access configuration based on the paging message, where the first random access configuration includes the first PUSCH resource, and determine the first PUSCH resource based on the first random access configuration.

Optionally, each of the at least one random access configuration corresponds to an index, the paging message carries a first index. When determining the first random access configuration from the at least one random access configuration based on the paging message, the processing unit 2502 is specifically configured to select the first random access configuration from the at least one random access configuration based on the first index, where the first random access configuration corresponds to the first index.

Optionally, each of the at least one random access configuration corresponds to an identifier of one terminal device, and the paging message carries an identifier of a paged terminal device. When determining the first random access configuration from the at least one random access configuration based on the identifier of the paged terminal device, the processing unit 2502 is specifically configured to select the first random access configuration from the at least one random access configuration based on the identifier of the paged terminal device, where the first random access configuration corresponds to the identifier of the paged terminal device.

Optionally, each of the at least one random access configuration corresponds to a random access preamble identifier, and the paging message carries a first random access preamble identifier. When determining the first random access configuration from the at least one random access configuration based on the paging message, the processing unit 2502 is specifically configured to select the first random access configuration from the at least one random access configuration based on the first random access preamble identifier, where the first random access configuration corresponds to the first random access preamble identifier.

Optionally, the communication unit 2501 is further configured to: send the random access preamble to the access network device by using the time-frequency domain resources of the random access preamble; or when a timing advance TA is invalid, send the random access preamble to the access network device by using the time-frequency domain resources of the random access preamble.

Optionally, the communications unit 2501 is further configured to receive a response message of the random access preamble from the access network device, where the response message of the random access preamble includes downlink data.

Optionally, the paging message includes an early downlink data transmission indication or a random access preamble identifier. When sending a paging response to the access network device by using the first PUSCH resource, the communication unit 2501 is specifically configured to send the paging response to the access network device on the first PUSCH resource based on the early downlink data transmission indication or the random access preamble identifier.

Optionally, the paging response is a non-access stratum NAS message, and the identity authentication information of the terminal device is generated based on a NAS security key of the terminal device.

Optionally, the paging response is a radio resource control RRC message, and the identity authentication information of the terminal device is generated based on one or more of the following parameters:

an access stratum key of the terminal device, a physical cell identifier of a source cell of the terminal device, a physical cell identifier of a target cell of the terminal device, and a source cell radio network temporary identifier C-RNTI.

In an example, the apparatus 2500 may implement the steps performed by the access network device in the foregoing procedure in FIG. 8, and the apparatus 2500 may be the access network device, or a chip or a circuit configured in the access network device. The communication unit 2501 is configured to perform sending/receiving-related operations on the access network device side in the foregoing method, and the processing unit 2502 is configured to perform processing-related operations on the access network device side in the foregoing method embodiments.

For example, the communication unit 2501 is configured to: send a paging message to a terminal device, and receive a paging response from the terminal device by using a first PUSCH resource. The processing unit 2502 is configured to: process the paging message, generate a paging response, and the like. The first PUSCH resource is preconfigured, or the first PUSCH resource is determined based on the paging message, or the first PUSCH resource is determined based on a preconfiguration and the paging message, the paging response carries an identifier and identity authentication information that are of the terminal device, and the identifier and the identity authentication information that are of the terminal device are used for identity authentication of the terminal device.

Optionally, the first PUSCH resource is preconfigured. The communication unit 2501 is further configured to send first configuration information to the terminal device, where the first configuration information is used to configure the first PUSCH resource.

Optionally, the first PUSCH resource is determined based on the paging message, and the paging message carries configuration information of the first PUSCH resource.

Optionally, the first PUSCH resource is determined based on a preconfiguration and the paging message. The communication unit 2501 is further configured to send second configuration information to the terminal device, where the second configuration information is used to configure at least one PUSCH resource.

Optionally, each of the at least one PUSCH resource corresponds to an index, the paging message carries a first index, and the first index corresponds to the first PUSCH resource.

Optionally, each of the at least one PUSCH resource corresponds to an identifier of one terminal device, the paging message carries an identifier of a paged terminal device, and the identifier of the paged terminal device corresponds to the first PUSCH resource.

Optionally, each of the at least one PUSCH resource corresponds to a random access preamble identifier, the paging message carries a first random access preamble identifier, and the first random access preamble identifier corresponds to the first PUSCH resource.

Optionally, the first PUSCH resource is determined based on a preconfiguration and the paging message. The communication unit 2501 is further configured to send third configuration information to the terminal device, where the third configuration information is used to configure a part of time-frequency domain resources in the first PUSCH resource.

The paging message carries a remaining part of the time-frequency domain resources in the first PUSCH resource, and the first PUSCH resource includes the part of the time-frequency domain resources in the first PUSCH resource and the remaining part of the time-frequency domain resources in the first PUSCH resource.

Optionally, the first PUSCH resource is preconfigured. The communication unit 2501 is further configured to send fourth configuration information to the terminal device, where the fourth configuration information is used to configure a random access preamble, time-frequency domain resources of the random access preamble, and the first PUSCH resource.

Optionally, the first PUSCH resource is determined based on the paging message, the paging message carries fifth configuration information, and the fifth configuration information is used to configure a random access preamble, time-frequency domain resources of the random access preamble, and the first PUSCH resource.

Optionally, the first PUSCH resource is determined based on the preconfiguration and the paging message. The communication unit 2501 is further configured to send sixth configuration information to the terminal device, where the sixth configuration information is used to configure a random access preamble, time-frequency domain resources of the random access preamble, and a part of time-frequency domain resources of the first PUSCH resource.

The paging message carries a remaining part of the time-frequency domain resources in the first PUSCH resource, and the first PUSCH resource includes the part of the time-frequency domain resources in the first PUSCH resource and the remaining part of the time-frequency domain resources in the first PUSCH resource.

Optionally, the first PUSCH resource is determined based on the preconfiguration and the paging message. The communication unit 2501 is further configured to send seventh configuration information to the terminal device, where the seventh configuration information is used to configure at least one random access configuration, and each random access configuration includes a random access preamble, time-frequency domain resources of the random access preamble, and time-frequency domain resources of the PUSCH.

Optionally, each of the at least one random access configuration corresponds to an index, the paging message carries a first index, the first index corresponds to the first random access configuration, and the first random access configuration includes the first PUSCH resource.

Optionally, each of the at least one random access configuration corresponds to an identifier of one terminal device, the paging message carries an identifier of a paged terminal device, the identifier of the paged terminal device corresponds to the first random access configuration, and the first random access configuration includes the first PUSCH resource.

Optionally, each of the at least one random access configuration corresponds to a random access preamble identifier, the paging message carries a first random access preamble identifier, the first random access preamble identifier corresponds to the first random access configuration, and the first random access configuration includes the first PUSCH resource.

Optionally, the communication unit 2501 is further configured to receive the random access preamble from the terminal device by using the time-frequency domain resources of the random access preamble.

Optionally, the communication unit 2501 is further configured to send a response message of the random access preamble to the terminal device, where the response message of the random access preamble includes downlink data.

Optionally, the paging message includes an early downlink data transmission indication or a random access preamble identifier. When receiving a paging response from the terminal device by using the first PUSCH resource, the communication unit 2501 is specifically configured to:
receive the paging response from the terminal device on the first PUSCH resource based on the early downlink data transmission indication or the random access preamble identifier.

Optionally, the paging response is a non-access stratum NAS message, and the identity authentication information of the terminal device is generated based on a NAS security key of the terminal device. Alternatively, the paging response is a radio resource control RRC message, and the identity authentication information of the terminal device is generated based on one or more of the following parameters:
an access stratum key of the terminal device, a physical cell identifier of a source cell of the terminal device, a physical cell identifier of a target cell of the terminal device, and a source cell radio network temporary identifier C-RNTI.

In an example, the apparatus 2500 may implement the steps of the terminal device in the foregoing procedure in FIG. 17. The apparatus 2500 may be a terminal device, or a chip or a circuit configured in the terminal device. The communication unit 2501 is configured to perform sending/receiving-related operations on the terminal device side in the foregoing method, and the processing unit 2502 is configured to perform processing-related operations on the terminal device side in the foregoing method embodiments.

For example, the communication unit 2501 is configured to receive a paging message from an access network device, where the paging message includes indication information. The processing unit 2502 is configured to perform unlicensed channel access based on the indication information.

Optionally, the indication information is used to indicate an unlicensed channel access type. When performing unlicensed channel access based on the indication information, the processing unit 2502 is specifically configured to:
when the indication information is used to indicate a first channel access type, perform unlicensed channel access of the first channel access type; or when the indication information is used to indicate a second channel access type, perform unlicensed channel access of the second channel access type.

Optionally, the indication information is used to indicate occupiable duration of the unlicensed channel. When performing unlicensed channel access based on the indication information, the processing unit 2502 is specifically configured to:
when the occupiable duration of the unlicensed channel is greater than or equal to first duration, perform unlicensed channel access of the second channel access type; or when the occupiable duration of the unlicensed channel is less than the first duration, perform unlicensed channel access of the first channel access type.

Optionally, the terminal device is in a radio resource control RRC idle state, or the terminal device is in an inactive state.

In an example, the apparatus 2500 may implement the steps of the access network device in the foregoing procedure in FIG. 17. The apparatus 2500 may be an access network device, or a chip or a circuit configured in the access network device. The communication unit 2501 is configured to perform sending/receiving-related operations on the access network device side in the foregoing method, and the processing unit 2502 is configured to perform processing-related operations on the access network device side in the foregoing method embodiments.

For example, the processing unit 2502 is configured to: determine the occupiable duration of the unlicensed channel, and determine the indication information based on the occupiable duration of the unlicensed channel. The communication unit 2502 is configured to send a paging message to the terminal device, where the paging message carries indication information and the like.

Optionally, when determining indication information based on the occupiable duration of the unlicensed channel, the processing unit 2502 is specifically configured to: when the occupiable duration of the unlicensed channel is greater than or equal to second duration, determine that the indication information is a second channel access type; or when the occupiable duration of the unlicensed channel is less than the second duration, determine that the indication information is a first channel access type. Alternatively, the indication information may be used to indicate the occupiable duration of the unlicensed channel.

In an example, the apparatus 2500 may implement the steps performed by the terminal device in the foregoing procedure in FIG. 19, and the apparatus 2500 may be the terminal device, or a chip or a circuit configured in the terminal device. The communication unit 2501 is configured to perform sending/receiving-related operations on the terminal device side in the foregoing method embodiments, and the processing unit 2502 is configured to perform processing-related operations on the terminal device side in the foregoing method embodiments.

For example, the communication unit 2501 is configured to send uplink data to the access network device by using the first PUSCH resource. The processing unit 2502 is configured to determine, based on a correspondence between a PUSCH resource and a synchronization signal block SSB, a first SSB corresponding to the first PUSCH resource. The processing unit 2502 is further configured to monitor a PDCCH on the first SSB.

Optionally, the communication unit 2501 is further configured to receive configuration information from the access network device, where the configuration information is used to configure the correspondence between the PUSCH resource and the SSB.

In an example, the apparatus 2500 may implement the steps performed by the access network device in the foregoing procedure in FIG. 19, and the apparatus 2500 may be the access network device, or a chip or a circuit configured in the access network device. The communication unit 2501 is configured to perform sending/receiving-related operations on the access network device side in the foregoing method, and the processing unit 2502 is configured to perform processing-related operations on the access network device side in the foregoing method embodiments.

For example, the communication unit 2501 is configured to receive uplink data from a terminal device by using a first PUSCH resource. The processing unit 2502 is configured to determine, based on a correspondence between a PUSCH resource and a synchronization signal block SSB, a first SSB corresponding to the first PUSCH resource. The communication unit 2501 is further configured to send a PDCCH on the first SSB.

Optionally, the communication unit 2501 is further configured to send configuration information to the terminal device, where the configuration information is used to configure the correspondence between the PUSCH resource and the SSB.

In an example, the apparatus 2500 may implement the steps performed by the terminal device in the foregoing procedure in FIG. 21, and the apparatus 2500 may be the terminal device, or a chip or a circuit configured in the terminal device. The communication unit 2501 is configured to perform sending/receiving-related operations on the terminal device side in the foregoing method embodiments, and the processing unit 2502 is configured to perform processing-related operations on the terminal device side in the foregoing method embodiments.

For example, the processing unit 2502 determines a first SSB; the communication unit 2501 is configured to send uplink data and an identifier of the first SSB to the access network device by using a first PUSCH resource; and the processing unit 2502 is configured to monitor a PDCCH on the first SSB.

Optionally, the communication unit 2501 is further configured to receive indication information from the access network device, where the indication information is used to indicate that the terminal device needs to report an identifier of the SSB.

In an example, the apparatus 2500 may implement the steps performed by the access network device in the foregoing procedure in FIG. 21, and the apparatus 2500 may be the access network device, or a chip or a circuit configured in the access network device. The communication unit 2501 is configured to perform sending/receiving-related operations on the access network device side in the foregoing method, and the processing unit 2502 is configured to perform processing-related operations on the access network device side in the foregoing method embodiments.

For example, the communication unit 2501 is configured to: receive uplink data and an identifier of a first synchronization signal block SSB from a terminal device by using a first PUSCH; and send a physical downlink control channel PDCCH to the terminal device on the first SSB. The processing unit 2502 is configured to process the uplink data.

Optionally, the communication unit 2501 is further configured to send indication information to the terminal device, where the indication information is used to indicate that the terminal device needs to report an identifier of the SSB.

It should be understood that division of the foregoing apparatus into the units is merely logical function division. In an actual implementation, all or some of the units may be integrated into a physical entity, or may be physically separate. In addition, all the units in the apparatus may be implemented in a form of software invoked by a processing element, or may be implemented in a form of hardware; or some units may be implemented in a form of software invoked by a processing element, and some units may be implemented in a form of hardware. For example, each unit may be an independently disposed processing element, or may be integrated into a chip of the apparatus for implementation. Alternatively, each unit may be stored in a memory in a form of a program to be invoked by a processing element of the apparatus to perform a function of the unit. In addition, all or some of the units may be integrated together, or may be implemented independently. The processing element herein may also be referred to as a processor, and may be an integrated circuit having a signal processing capability. In an implementation process, the steps in the foregoing method or the foregoing units may be implemented by using a hardware integrated logic circuit in the processor element, or may be implemented in a form of software invoked by the processing element.

For example, a unit in any one of the foregoing apparatuses may be one or more integrated circuits configured to implement the foregoing method, for example, one or more application-specific integrated circuits (ASICs), one or more microprocessors (DSPs), one or more field programmable gate arrays (FPGAs), or a combination of at least two of the integrated circuits. For another example, when the unit in the apparatus may be implemented in a form of scheduling a program by a processing element, the processing element may be a general-purpose processor, for example, a central processing unit (CPU) or another processor that can invoke the program. For still another example, the units may be integrated and implemented in a form of a system-on-a-chip (SOC).

The foregoing receiving unit is an interface circuit of the apparatus, and is configured to receive a signal from another apparatus. For example, when the apparatus is implemented in a manner of a chip, the receiving unit is an interface circuit that is of the chip and that is configured to receive a signal from another chip or apparatus. The foregoing sending unit is an interface circuit of the apparatus, and is configured to send a signal to another apparatus. For example, when the apparatus is implemented in a manner of a chip, the sending unit is an interface circuit that is of the chip and that is configured to send a signal from another chip or apparatus.

Figure 25:
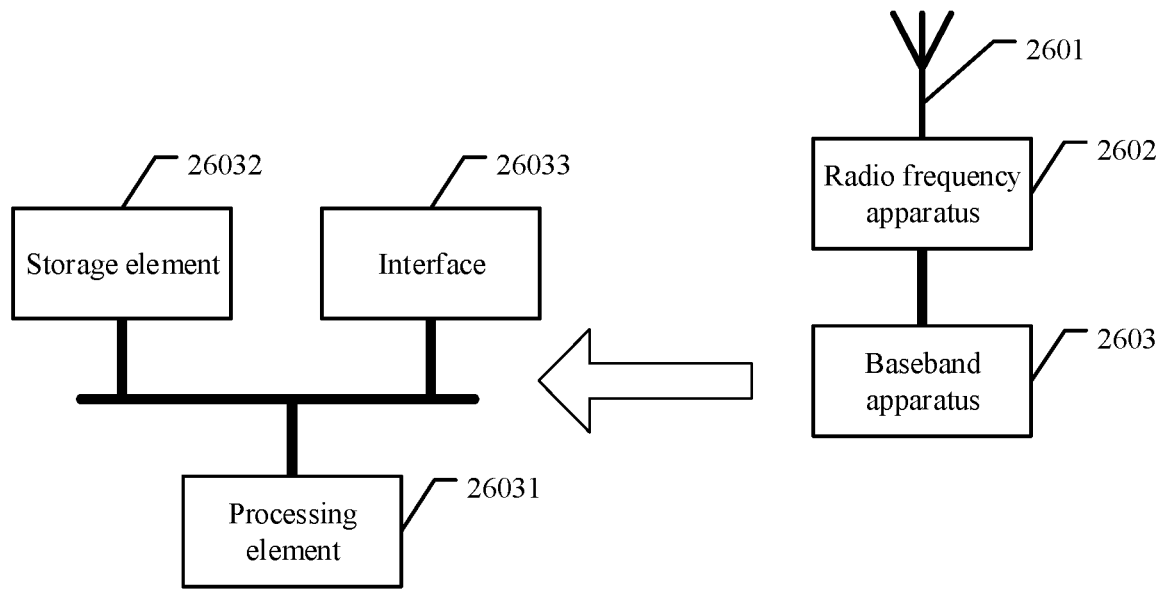
FIG. 25 is a schematic diagram of a structure of a network device according to an embodiment of this application.

FIG. 25 is a schematic diagram of a structure of a network device according to an embodiment of this application. The network device is configured to implement operations related to the access network device in the foregoing embodiments. As shown in FIG. 25, the network device includes an antenna 2601, a radio frequency apparatus 2602, and a baseband apparatus 2603. The antenna 2601 is connected to the radio frequency apparatus 2602. In an uplink direction, the radio frequency apparatus 2602 receives, by using the antenna 2601, information sent by a terminal device, and sends the information, sent by the terminal device, to the baseband apparatus 2603 for processing. In a downlink direction, the baseband apparatus 2603 processes information from the terminal device and sends processed information to the radio frequency apparatus 2602, and the radio frequency apparatus 2602 processes the information from the terminal device and then sends processed information to the terminal device by using the antenna 2601.

The baseband apparatus 2603 may include one or more processing elements 26031, for example, include a main control CPU and another integrated circuit. In addition, the baseband apparatus 2603 may further include a storage element 260326 and an interface circuit 26033. The storage element 260326 is configured to store a program and data. The interface circuit 26033 is configured to exchange information with the radio frequency apparatus 2602, and the interface is, for example, a common public radio interface (CPRI). The foregoing apparatus used in the network device may be located in the baseband apparatus 2603. For example, the foregoing apparatus used in the network device may be a chip in the baseband apparatus 2603. The chip includes at least one processing element and an interface circuit. The processing element is configured to perform steps in any method performed by the access network device in the procedures shown in FIG. 4 to FIG. 23, and the interface circuit is configured to communicate with another apparatus. In an implementation, the units of the network device for implementing the steps in the methods shown in FIG. 4 to FIG. 23 may be implemented in a form of scheduling a program by the processing element. For example, the apparatus used in the network device includes a processing element and a storage element. The processing element invokes a program stored in the storage element, to perform the methods performed by the access network device in the method embodiments shown in FIG. 4 to FIG. 23. The storage element may be a storage element on the same chip as the processing element, that is, an on-chip storage element; or may be a storage element that is on a different chip from the processing element, that is, an off-chip storage element.

In another implementation, the units of the network device for implementing steps in the methods shown in FIG. 4 to FIG. 23 may be configured as one or more processing elements. These processing elements are disposed on the baseband apparatus. The processing element herein may be an integrated circuit, for example, one or more ASICs, one or more DSPs, one or more FPGAs, or a combination of these types of integrated circuits. These integrated circuits may be integrated together to form a chip.

Units of the network device for implementing the steps in the foregoing method may be integrated together, and implemented in a form of a system-on-a-chip (SOC). For example, the baseband apparatus includes the SOC chip, configured to implement the methods shown in FIG. 4 to FIG. 23. At least one processing element and storage element may be integrated into the chip, and a processing element invokes a program stored in a storage element to implement the foregoing methods performed by the access network device. Alternatively, at least one integrated circuit may be integrated into the chip, to implement the foregoing methods performed by the access network device. Alternatively, with reference to the foregoing implementations, functions of some units may be implemented by invoking a program by the processing element, and functions of some units may be implemented by the integrated circuit.

It can be learned that the foregoing apparatus used in the network device may include at least one processing element and an interface circuit. The at least one processing element is configured to perform any one of the methods performed by the access network device provided in the embodiments shown in FIG. 4 to FIG. 23. The processing element may perform, in a first manner, to be specific, by invoking the program stored in the storage element, some or all steps performed by the access network device; or may perform, in a second manner, to be specific, by using a hardware integrated logic circuit in the processor element in combination with instructions, some or all steps performed by the access network device; or may certainly perform, by combining the first manner and the second manner, some or all steps performed by the network device.

As described above, the processing element herein may be a general-purpose processor, for example, a CPU, or may be one or more integrated circuits, for example, one or more ASICs, one or more microprocessors DSPs, or one or more FPGAs, or a combination of at least two of these types of integrated circuits, configured to implement the foregoing methods. The storage element may be one memory, or may be a general term of a plurality of storage elements.

Figure 26:
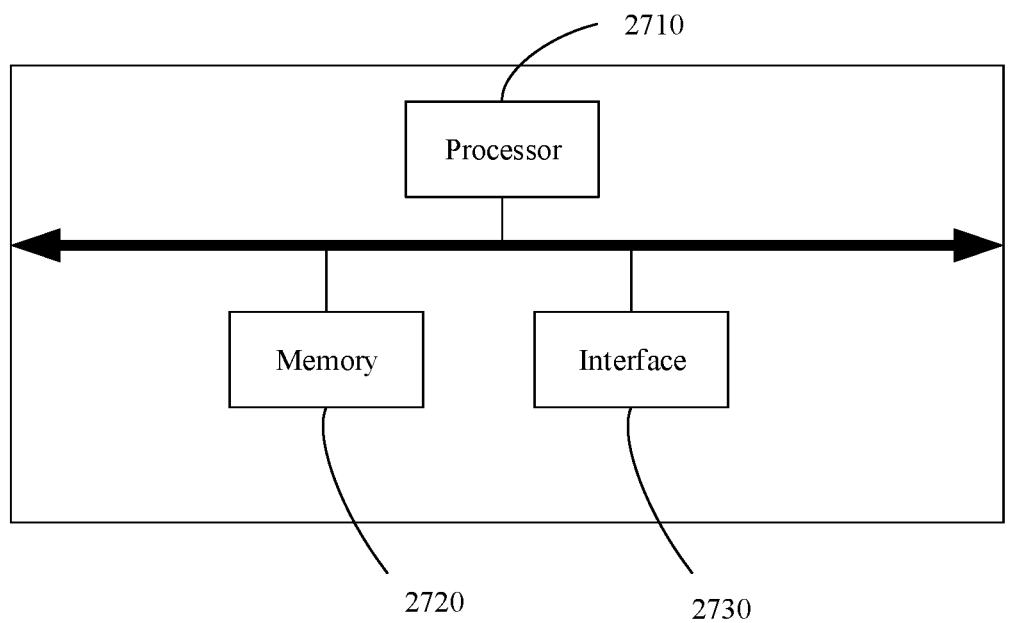
FIG. 26 is another schematic diagram of a structure of a network device according to an embodiment of this application.

FIG. 26 is a second schematic diagram of a structure of a network device according to an embodiment of this application. The network device includes a processor 2710, a memory 2720, and an interface 2730. The processor 2710, the memory 2720, and the interface 2730 are in signal connection. The network device may be the access network device in the procedures shown in FIG. 4 to FIG. 23, and is configured to implement the operations shown in FIG. 4 to FIG. 23 in the foregoing method embodiments.

The apparatus 2500 shown in FIG. 24 may be located in the network device, and functions of units may be implemented by the processor 2710 by invoking a program stored in the memory 2720. That is, the apparatus 2500 shown in FIG. 24 may include a memory and a processor. The memory is configured to store a program, and the program is invoked by the processor to perform the methods in the method embodiments shown in FIG. 4 to FIG. 23. The processor herein may be an integrated circuit having a signal processing capability, for example, a CPU. Alternatively, the functions of the units shown in FIG. 25 may be implemented by one or more integrated circuits, for example, one or more ASICs, one or more microprocessors DSPs, or one or more FPGAs, or a combination of at least two of these types of integrated circuits, configured to implement the methods shown in FIG. 4 to FIG. 23. Alternatively, the foregoing implementations may be combined.

Figure 27:
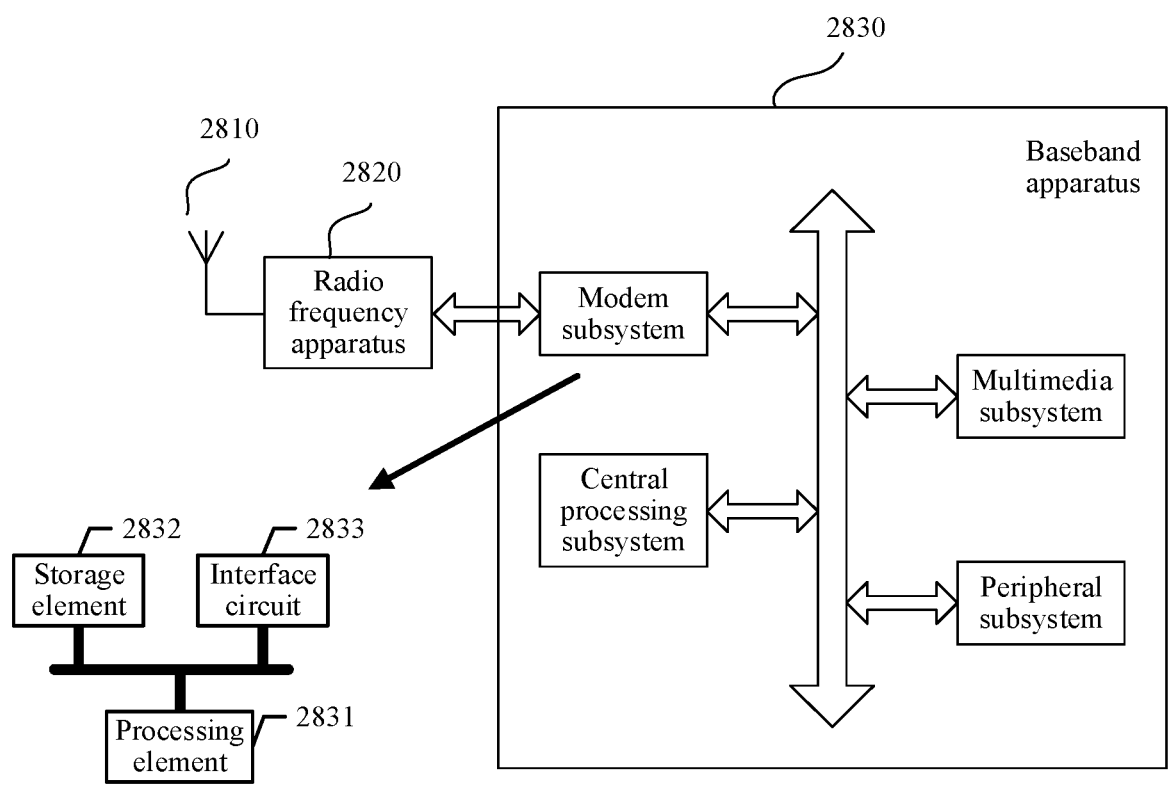
FIG. 27 is a schematic diagram of a structure of a terminal device according to an embodiment of this application.

FIG. 27 is a schematic diagram of a structure of a terminal device according to an embodiment of this application. The terminal device may be the terminal device in the embodiments shown in FIG. 4 to FIG. 23, and is configured to implement operations of the terminal device in the embodiments shown in FIG. 4 to FIG. 23. As shown in FIG. 27, the terminal device includes an antenna 2810, a radio frequency apparatus 2820, and a signal processing part 2830. The antenna 2810 is connected to the radio frequency apparatus 2820. In a downlink direction, the radio frequency apparatus 2820 receives, through the antenna 2810, information sent by a network device, and sends, to the signal processing part 2830 for processing, the information sent by the network device. In an uplink direction, the signal processing part 2830 processes information of the terminal device, and sends the information of the terminal device to the radio frequency apparatus 2820. The radio frequency apparatus 2820 processes the information of the terminal device, and then sends processed information to the network device through the antenna 2810.

The signal processing part 2830 may include a modem subsystem, configured to process data at each communication protocol layer. The signal processing part 2830 may further include a central processing subsystem, configured to process an operating system and an application layer that are of the terminal device. In addition, the signal processing part 2830 may further include another subsystem, for example, a multimedia subsystem, or a peripheral subsystem. The multimedia subsystem is configured to control a camera or a screen display of the terminal device. The peripheral subsystem is configured to connect to another device. The modem subsystem may be a chip that is separately disposed.

Optionally, the foregoing apparatus used in the terminal device may be located in the modem subsystem.

The modem subsystem may include one or more processing elements 2831, for example, include a main control CPU and another integrated circuit. In addition, the modem subsystem may further include a storage element 2832 and an interface circuit 2833. The storage element 2832 is configured to store data and a program. However, a program used to perform the methods performed by the terminal device in the methods shown in FIG. 4 to FIG. 23 may not be stored in the storage element 2832, but is stored in a memory outside the modem subsystem, and is loaded and used by the modem subsystem when to be used. The interface circuit 2833 is configured to communicate with another subsystem. The foregoing apparatus used in the terminal device may be located in the modem subsystem, and the modem subsystem may be implemented by using a chip. The chip includes at least one processing element and an interface circuit. The processing element is configured to perform the steps of any one of the methods performed by the terminal device in the methods shown in FIG. 4 to FIG. 23. The interface circuit is configured to communicate with another apparatus. In an implementation, units of the terminal device for implementing the steps in the foregoing methods may be implemented in a form of scheduling a program by a processing element. For example, the apparatus used in the terminal device includes a processing element and a storage element. The processing element invokes a program stored in the storage element, to perform the methods performed by the terminal device in the method embodiments shown in FIG. 4 to FIG. 23. The storage element may be a storage element located on a same chip as the processing element, namely, an on-chip storage element.

In another implementation, a program used to perform the methods performed by the terminal device in the methods shown in FIG. 4 to FIG. 23 may be in a storage element that is on a different chip from the processing unit, that is, an off-chip storage element. In this case, the processing element invokes or loads the program from the off-chip storage element to the on-chip storage element, to invoke and perform the methods performed by the terminal device in the method embodiments shown in FIG. 4 to FIG. 23.

In still another implementation, units of the terminal device for implementing the steps in the methods shown in FIG. 4 to FIG. 23 may be configured as one or more processing elements. These processing elements are disposed in the modem subsystem. The processing element herein may be an integrated circuit, for example, one or more ASICs, one or more DSPs, one or more FPGAs, or a combination of these types of integrated circuits. These integrated circuits may be integrated together to form a chip.

Units of the terminal device for implementing the steps in the methods shown in FIG. 4 to FIG. 23 may be integrated together, and implemented in a form of a system-on-a-chip (SOC). The SOC chip is configured to implement the methods shown in FIG. 4 to FIG. 23. At least one processing element and storage element may be integrated into the chip, and a processing element invokes a program stored in a storage element to implement the foregoing methods performed by the terminal device. Alternatively, at least one integrated circuit may be integrated into the chip, to implement the methods performed by the terminal device in the procedures shown in FIG. 4 to FIG. 23. Alternatively, with reference to the foregoing implementations, functions of some units may be implemented by invoking a program by the processing element, and functions of some units may be implemented by the integrated circuit.

It can be learned that the foregoing apparatus used in the terminal device may include at least one processing element and an interface circuit. The at least one processing element is configured to perform any one of the methods performed by the terminal device provided in the method embodiments shown in FIG. 4 to FIG. 23. The processing element may perform, in a first manner, to be specific, by invoking the program stored in the storage element, some or all steps performed by the terminal device; or may perform, in a second manner, to be specific, by using a hardware integrated logic circuit in the processor element in combination with instructions, some or all steps performed by the terminal device; or may certainly perform, by combining the first manner and the second manner, some or all steps performed by the terminal device.

As described above, the processing element herein may be a general-purpose processor, for example, a CPU, or may be one or more integrated circuits, for example, one or more ASICs, one or more microprocessors DSPs, or one or more FPGAs, or a combination of at least two of these types of integrated circuits, configured to implement the foregoing methods. The storage element may be one memory, or may be a general term of a plurality of storage elements.

Further, an embodiment of this application further provides an apparatus, including units configured to implement the steps in the procedure shown in FIG. 8, FIG. 17, FIG. 19, or FIG. 21. Alternatively, the apparatus includes at least one processor and an interface circuit, where the at least one processor is configured to: communicate with another apparatus through the interface, and perform the method of the steps in the procedure shown in FIG. 8, FIG. 17, FIG. 19, or FIG. 21. Alternatively, the apparatus includes a processor, configured to invoke the program stored in the memory, to perform the method of the steps in the procedure shown in FIG. 8, FIG. 17, FIG. 19, or FIG. 21. An embodiment of this application further provides a computer-readable storage medium including a program. When the program is run by a processor, the method of the steps in the procedure shown in FIG. 8, FIG. 17, FIG. 19, or FIG. 21 is performed.

In this embodiment of this application, the processor may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in embodiments of this application. The general-purpose processor may be a microprocessor, any conventional processor, or the like. The steps of the method disclosed with reference to this embodiment of this application may be directly performed by a hardware processor, or may be performed by using a combination of hardware in the processor and a software module.

In this embodiment of this application, the memory may be a non-volatile memory, such as a hard disk drive (HDD) or a solid-state drive (SSD), or may be a volatile memory, such as a random-access memory (RAM). The memory is any other medium that can carry or store expected program code in a form of an instruction structure or a data structure and that can be accessed by a computer, but is not limited thereto. The memory in this embodiment of this application may alternatively be a circuit or any other apparatus that can implement a storage function, and is configured to store program instructions and/or data.

All or some of the methods in embodiments of this application may be implemented through software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of procedures or functions according to embodiments of the present disclosure are generated. The computer may be a general-purpose computer, a dedicated computer, a computer network, a network device, user equipment, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, an SSD (solid state disk)), or the like.

It is clear that a person skilled in the art can make various modifications and variations to this application without departing from the scope of this application. In this way, this application is intended to cover these modifications and variations of this application provided that they fall within the scope of the claims of this application and equivalent technologies thereof.

In embodiments of this application, "at least one" means one or more, and "a plurality of" means two or more. The term "and/or" describes an association relationship between associated objects and represents that three relationships may exist. For example, A and/or B may represent the following cases: Only A exists, both A and B exist, and only B exists, where A and B may be singular or plural. The character "/" usually indicates an "or" relationship between the associated objects. "At least one item (piece) of the following" or a similar expression thereof refers to any combination of these items, including any combination of singular items (pieces) or plural items (pieces). For example, at least one item (piece) of a, b, or c may represent: a, b, c, a and b, a and c, b and c, or a, b, and c, where a, b, and c may be singular or plural.

What is claimed is:

1. A communication method, comprising:
receiving, by a terminal device, a paging message from an access network device, wherein the paging message comprises an early downlink data transmission indication and an inactive radio network temporary identify (I-RNTI) that identifies the terminal device is in an inactive state;
sending, by the terminal device, a paging response to the access network device by using a first physical uplink shared channel (PUSCH) resource, wherein the first PUSCH resource is preconfigured, or the first PUSCH resource is determined based on the paging message, or the first PUSCH resource is determined based on a preconfiguration and the paging message, and wherein the paging response carries the I-RNTI and identity authentication information that are of the terminal device, and the I-RNTI and the identity authentication information that are of the terminal device are used for identity authentication of the terminal device; and
receiving, by the terminal device, downlink data corresponding to the early downlink data transmission indication.

2. The method according to claim 1, wherein the first PUSCH resource is preconfigured, and the method further comprises:
receiving, by the terminal device, first configuration information from the access network device, wherein the first configuration information is used to configure the first PUSCH resource; and
determining, by the terminal device, the first PUSCH resource based on the first configuration information.

3. The method according to claim 1, wherein the first PUSCH resource is determined based on the paging message, the paging message carries configuration information of the first PUSCH resource, and the method further comprises:
determining, by the terminal device, the first PUSCH resource based on the configuration information of the first PUSCH resource carried in the paging message.

4. The method according to claim 1, wherein the first PUSCH resource is determined based on the preconfiguration and the paging message, and the method further comprises:
receiving, by the terminal device, second configuration information from the access network device, wherein the second configuration information is used to configure at least one PUSCH resource; and
determining, by the terminal device, the first PUSCH resource based on the paging message.

5. The method according to claim 4, wherein each PUSCH resource of the at least one PUSCH resource corresponds to an index, the paging message carries a first index, and the determining, by the terminal device, the first PUSCH resource based on the paging message comprises:
selecting, by the terminal device, the first PUSCH resource from the at least one PUSCH resource based on the first index, wherein the first PUSCH resource corresponds to the first index.

6. The method according to claim 4, wherein each PUSCH resource of the at least one PUSCH resource corresponds to an identifier of one terminal device, the paging message carries an identifier of a paged terminal device, and the determining, by the terminal device, the first PUSCH resource based on the paging message comprises:
selecting, by the terminal device, the first PUSCH resource from the at least one PUSCH resource based on the identifier of the paged terminal device carried in the paging message, wherein the first PUSCH resource corresponds to the identifier of the paged terminal device.

7. The method according to claim 4, wherein each PUSCH resource of the at least one PUSCH resource corresponds to a random access preamble identifier, the paging message carries a first random access preamble identifier, and the determining, by the terminal device, the first PUSCH resource based on the paging message comprises:
selecting, by the terminal device, the first PUSCH resource from the at least one PUSCH resource based on the first random access preamble identifier, wherein the first PUSCH resource corresponds to the first random access preamble identifier.

8. The method according to claim 1, wherein the receiving, by the terminal device, the downlink data corresponding to the early downlink data transmission indication comprises:

receiving, by the terminal device, the downlink data corresponding to the early downlink data transmission indication and a radio resource control (RRC) connection release message, wherein the RRC connection release message is used to notify the terminal device to keep in the inactive state.

9. An apparatus, comprising:
at least one processor; and
a memory storing instructions for execution by the at least one processor, wherein, when executed, the instructions cause the apparatus to perform operations comprising:
receiving a paging message from an access network device, wherein the paging message comprises an early downlink data transmission indication and an inactive radio network temporary identify (I-RNTI) that identifies the terminal device is in an inactive state;
sending a paging response to the access network device by using a first physical uplink shared channel (PUSCH) resource; and
receiving downlink data corresponding to the early downlink data transmission indication,
wherein the first PUSCH resource is preconfigured, or the first PUSCH resource is determined based on the paging message, or the first PUSCH resource is determined based on a preconfiguration and the paging message; and
wherein the paging response carries the I-RNTI and identity authentication information that are of the apparatus, and the I-RNTI and the identity authentication information that are of the apparatus are used for identity authentication of the apparatus.

10. The apparatus according to claim 9, wherein the first PUSCH resource is preconfigured, and the instructions, when executed, further cause the apparatus to perform operations comprising:
receiving first configuration information from the access network device, wherein the first configuration information is used to configure the first PUSCH resource; and
determining the first PUSCH resource based on the first configuration information.

11. The apparatus according to claim 9, wherein the first PUSCH resource is determined based on the paging message, the paging message carries configuration information of the first PUSCH resource, and the instructions, when executed, further cause the apparatus to perform operations comprising:
determining the first PUSCH resource based on the configuration information of the first PUSCH resource carried in the paging message.

12. The apparatus according to claim 9, wherein the first PUSCH resource is determined based on the preconfiguration and the paging message, and the instructions, when executed, further cause the apparatus to perform operations comprising:
receiving second configuration information from the access network device, wherein the second configuration information is used to configure at least one PUSCH resource; and
determining the first PUSCH resource based on the paging message.

13. The apparatus according to claim 12, wherein each PUSCH resource of the at least one PUSCH resource corresponds to an index, the paging message carries a first index, and the determining the first PUSCH resource based on the paging message comprises:
selecting the first PUSCH resource from the at least one PUSCH resource based on the first index, wherein the first PUSCH resource corresponds to the first index.

14. The apparatus according to claim 12, wherein each PUSCH resource of the at least one PUSCH resource corresponds to an identifier of one terminal device, the paging message carries an identifier of a paged terminal device, and the determining the first PUSCH resource based on the paging message comprises:
selecting the first PUSCH resource from the at least one PUSCH resource based on the identifier of the paged terminal device carried in the paging message, wherein the first PUSCH resource corresponds to the identifier of the paged terminal device.

15. The apparatus according to claim 12, wherein each PUSCH resource of the at least one PUSCH resource corresponds to a random access preamble identifier, the paging message carries a first random access preamble identifier, and the determining the first PUSCH resource based on the paging message comprises:
selecting the first PUSCH resource from the at least one PUSCH resource based on the first random access preamble identifier, wherein the first PUSCH resource corresponds to the first random access preamble identifier.

16. The apparatus according to claim 9, wherein the receiving the downlink data corresponding to the early downlink data transmission indication comprises:
receiving the downlink data corresponding to the early downlink data transmission indication and a radio resource control (RRC) connection release message, wherein the RRC connection release message is used to notify the terminal device to keep in the inactive state.

17. A communication method, comprising:
sending, by an access network device, a paging message to a terminal device, wherein the paging message comprises an early downlink data transmission indication and an inactive radio network temporary identify (I-RNTI) that identifies the terminal device is in an inactive state; and
receiving, by the access network device, a paging response from the terminal device on a first physical uplink shared channel (PUSCH) resource; and
sending, by the access network device, downlink data corresponding to the early downlink data transmission indication;
wherein the first PUSCH resource is preconfigured, or the first PUSCH resource is determined based on the paging message, or the first PUSCH resource is determined based on a preconfiguration and the paging message; and
wherein the paging response carries the I-RNTI and identity authentication information that are of the terminal device, and the I-RNTI and the identity authentication information that are of the terminal device are used for identity authentication of the terminal device.

18. The method according to claim 17, wherein the first PUSCH resource is preconfigured, and the method further comprises:
sending, by the access network device, first configuration information to the terminal device, wherein the first configuration information is used to configure the first PUSCH resource.

19. The method according to claim 17, wherein the first PUSCH resource is determined based on the paging message, and the paging message carries configuration information of the first PUSCH resource.

20. The method according to claim 17, wherein the first PUSCH resource is determined based on the preconfiguration and the paging message, and the method further comprises:
   sending, by the access network device, second configuration information to the terminal device, wherein the second configuration information is used to configure at least one PUSCH resource.

21. The method according to claim 20, wherein each PUSCH resource of the at least one PUSCH resource corresponds to an index, the paging message carries a first index, and the first index corresponds to the first PUSCH resource.

22. The method according to claim 20, wherein each PUSCH resource of the at least one PUSCH resource corresponds to an identifier of one terminal device, the paging message carries an identifier of a paged terminal device, and the identifier of the paged terminal device corresponds to the first PUSCH resource.

23. The method according to claim 17, wherein the sending, by the access network device, the downlink data corresponding to the early downlink data transmission indication comprises:
   sending, by the access network device, the downlink data corresponding to the early downlink data transmission indication and a radio resource control (RRC) connection release message, wherein the RRC connection release message is used to notify the terminal device to keep in the inactive state.

* * * * *